United States Patent
Rouxel

(10) Patent No.: US 11,957,088 B2
(45) Date of Patent: Apr. 16, 2024

(54) PLANT GROWTH CONTAINER

(71) Applicant: Gardyn Inc., Bethesda, MD (US)

(72) Inventor: Francois-Xavier Rouxel, Bethesda, MD (US)

(73) Assignee: Gardyn Inc., Bethesda, MD (US)

(*) Notice: Subject to any disclaimer, the term of this patent is extended or adjusted under 35 U.S.C. 154(b) by 77 days.

(21) Appl. No.: 17/283,501

(22) PCT Filed: Oct. 7, 2019

(86) PCT No.: PCT/US2019/055046
§ 371 (c)(1),
(2) Date: Apr. 7, 2021

(87) PCT Pub. No.: WO2020/076729
PCT Pub. Date: Apr. 16, 2020

(65) Prior Publication Data
US 2021/0392834 A1 Dec. 23, 2021

Related U.S. Application Data

(60) Provisional application No. 62/811,284, filed on Feb. 27, 2019, provisional application No. 62/742,771, (Continued)

(51) Int. Cl.
*A01G 31/06* (2006.01)
*A01G 9/02* (2018.01)
*A01G 31/00* (2018.01)

(52) U.S. Cl.
CPC ............ *A01G 31/06* (2013.01); *A01G 9/022* (2013.01); *A01G 2031/006* (2013.01)

(58) Field of Classification Search
CPC .. A01G 31/06; A01G 9/022; A01G 2031/006; A01G 31/02; A01G 9/023
See application file for complete search history.

(56) References Cited

U.S. PATENT DOCUMENTS

| 262,335 A | 8/1882 | Wagner |
| D26,849 S | 3/1897 | Bell |

(Continued)

FOREIGN PATENT DOCUMENTS

| AU | 2016342076 A1 | 5/2018 |
| CA | 2488178 A1 | 2/2006 |

(Continued)

OTHER PUBLICATIONS

Gardyn, Date Available Sep. 11, 2019, Facebook, Site Visited on Apr. 17, 2023: https://www.facebook.com/gardyntech/photos/a.64797 4665726912/658611871329858 (Year: 2019).

(Continued)

*Primary Examiner* — Monica L Perry
*Assistant Examiner* — Spencer T Callaway
(74) *Attorney, Agent, or Firm* — Knobbe, Martens, Olson & Bear, LLP

(57) ABSTRACT

A plant-growing container (500) can include a lower portion (506) and a wall (502) extending upwardly from the lower portion (506). The wall (502) can include a first aperture (512). The plant-growing container (500) can further include an orifice (510) formed by an upper portion (504) of the wall (502) and configured to receive a removable seed receptacle. The plant-growing container (500) can further include a reservoir provided by a lower portion (506) of the wall (502). The container (500) can be configured to be removably inserted into a port of a module of a plant-growing system, wherein the reservoir can be configured to receive a first volume of fluid from a fluid that is circulated through the plant-growing system.

15 Claims, 32 Drawing Sheets

Related U.S. Application Data filed on Oct. 8, 2018, provisional application No. 62/742,755, filed on Oct. 8, 2018, provisional application No. 62/742,750, filed on Oct. 8, 2018, provisional application No. 62/742,740, filed on Oct. 8, 2018, provisional application No. 62/742,803, filed on Oct. 8, 2018, provisional application No. 62/742,761, filed on Oct. 8, 2018.

(56) References Cited

U.S. PATENT DOCUMENTS

| | | | |
|---|---|---|---|
| 1,204,367 A | 11/1916 | Lord | |
| D138,786 S | 9/1944 | Thienhaus | |
| 2,830,405 A | 4/1958 | Nydegger | |
| D187,807 S | 5/1960 | Manfredi | |
| D241,454 S | 9/1976 | Craft, III | |
| 4,160,342 A | 7/1979 | Dryer | |
| 4,270,309 A | 6/1981 | Baumann | |
| D282,534 S | 2/1986 | Morgan et al. | |
| 4,622,777 A | 11/1986 | Greene, Jr. | |
| D322,769 S | 12/1991 | Gingras et al. | |
| D362,780 S | 10/1995 | Hampshire | |
| 5,761,848 A | 6/1998 | Manlove | |
| D428,829 S | 8/2000 | Grosfillex | |
| D439,545 S | 3/2001 | Grosfillex | |
| 6,230,437 B1 | 5/2001 | Wolverton et al. | |
| 6,477,805 B2 | 11/2002 | Ware | |
| 6,615,542 B2 | 9/2003 | Ware | |
| 6,625,929 B1 | 9/2003 | Lawson et al. | |
| D512,255 S | 12/2005 | Snell | |
| 7,055,282 B2 | 6/2006 | Bryan, III | |
| D635,486 S | 4/2011 | Bodum | |
| 7,954,277 B2 * | 6/2011 | Cooley | A01G 9/021 47/65.5 |
| D653,162 S | 1/2012 | Moore et al. | |
| 8,549,788 B2 | 10/2013 | Bryan, III | |
| D706,671 S | 6/2014 | Thuma et al. | |
| D715,182 S | 10/2014 | Nomura et al. | |
| D716,179 S | 10/2014 | King et al. | |
| D742,052 S | 10/2015 | Dorman | |
| 9,185,853 B1 | 11/2015 | Ascherman et al. | |
| D752,478 S | 3/2016 | Cudmore et al. | |
| D758,917 S | 6/2016 | Smith | |
| D760,622 S | 7/2016 | Ogden | |
| 9,439,362 B2 | 9/2016 | Fisher | |
| D771,520 S | 11/2016 | Bryan, III | |
| D781,069 S | 3/2017 | Marshall et al. | |
| 9,622,427 B2 | 4/2017 | Wagner | |
| D792,807 S | 7/2017 | Bryan, III | |
| D796,378 S | 9/2017 | Storey | |
| D797,508 S | 9/2017 | Gobrecht | |
| D809,964 S | 2/2018 | Harshman et al. | |
| 9,968,039 B2 | 5/2018 | Graber | |
| 10,136,594 B2 | 11/2018 | Blank | |
| D870,592 S | 12/2019 | Addison | |
| 10,524,434 B2 | 1/2020 | Buuren et al. | |
| D875,598 S | 2/2020 | Pettigrew | |
| D877,649 S | 3/2020 | Pettigrew | |
| D882,020 S | 4/2020 | Burrow et al. | |
| D882,027 S | 4/2020 | Burrow et al. | |
| D882,032 S | 4/2020 | Burrow et al. | |
| D882,033 S | 4/2020 | Burrow et al. | |
| D888,603 S | 6/2020 | Tong | |
| D922,249 S | 6/2021 | Rouxel | |
| D990,366 S | 6/2023 | Rouxel | |
| 2007/0251144 A1 | 11/2007 | Cooley | |
| 2010/0132255 A1 | 6/2010 | Webber | |
| 2010/0146855 A1* | 6/2010 | Ma | A01G 9/025 47/82 |
| 2011/0258928 A1 | 10/2011 | Adams | |
| 2013/0118074 A1* | 5/2013 | Fulbrook | A01G 31/02 47/62 N |
| 2014/0000162 A1 | 1/2014 | Blank | |
| 2014/0083009 A1* | 3/2014 | Panopoulos | A01G 31/06 47/62 R |
| 2014/0373444 A1* | 12/2014 | Nelson | A01G 9/02 47/79 |
| 2016/0029572 A1 | 2/2016 | Stott et al. | |
| 2016/0174470 A1 | 6/2016 | Shaffer et al. | |
| 2017/0055473 A1* | 3/2017 | Baker | A01G 31/06 |
| 2017/0105372 A1 | 4/2017 | Bryan, III | |
| 2019/0200541 A1 | 7/2019 | Park | |
| 2019/0269081 A1* | 9/2019 | Whitworth | A01G 31/06 |
| 2019/0269083 A1* | 9/2019 | Klein | A01G 31/06 |

FOREIGN PATENT DOCUMENTS

| | | |
|---|---|---|
| CA | 3002644 A1 | 4/2017 |
| CN | 108283141 A | 7/2018 |
| EM | 007460951-0007 | 12/2019 |
| EP | 2734034 B1 | 6/2018 |
| EP | 3197263 A4 | 6/2018 |
| GB | 9007460951 | 12/2019 |
| JP | 2018531028 A | 10/2018 |
| WO | WO 2016/147195 | 9/2016 |
| WO | WO 2016/162856 | 10/2016 |
| WO | WO2017069803 A1 | 4/2017 |

OTHER PUBLICATIONS

Lapond Square Hydroponic Net Pots Pods, Date Available Jun. 11, 2019, Amazon, Site Visited on Apr. 17, 2023: https://www.amazon.com/LAPON-D-1-00-Pack-Hydroponic-Slotted-Hydroponics/dp/B07STYSGZ3?th=1 (Year: 2019).

International Search Report and Written Opinion issued in PCT Application No. PCT/US2019/055046, dated Mar. 26, 2020, in 22 pages.

* cited by examiner

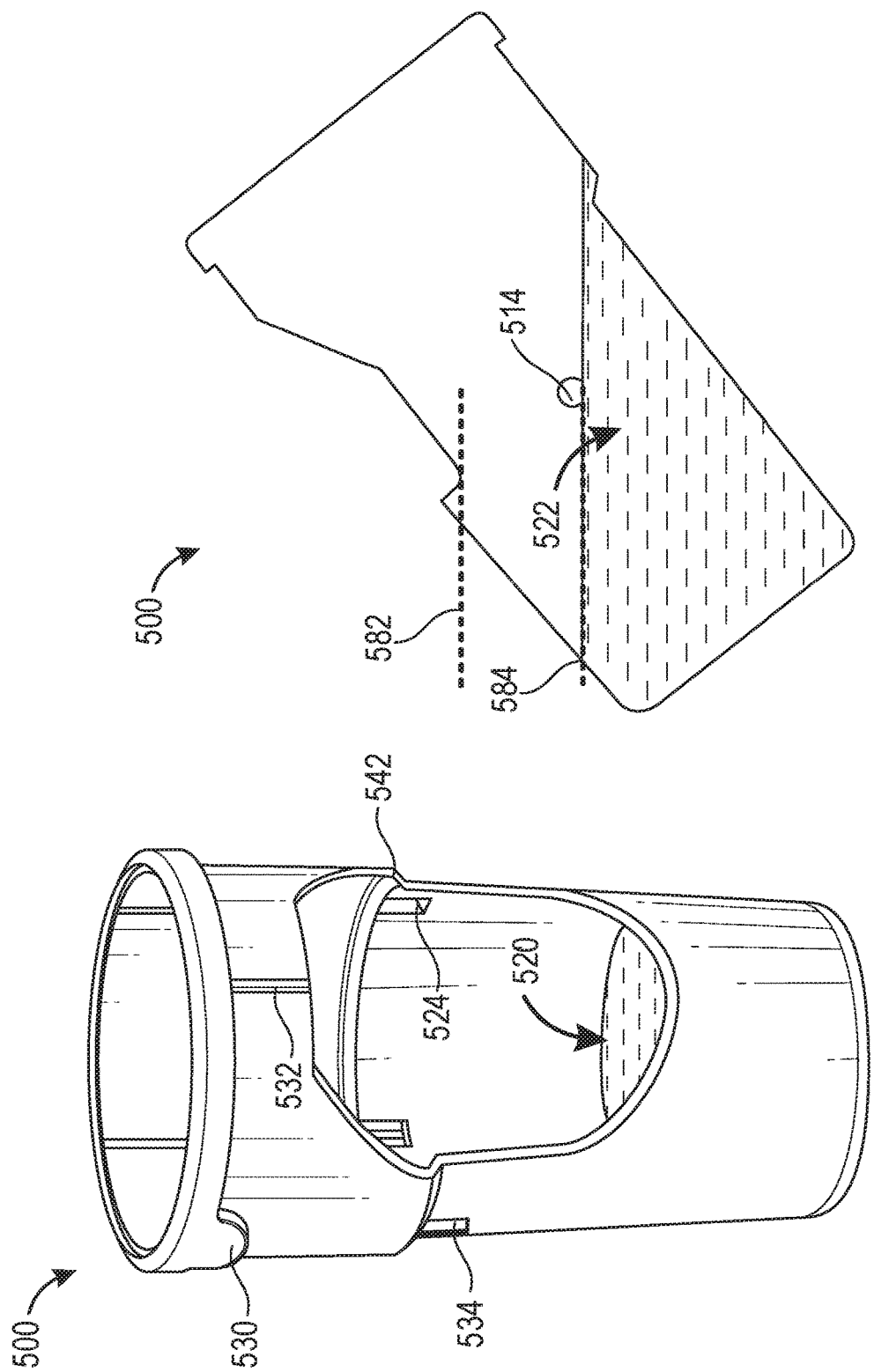

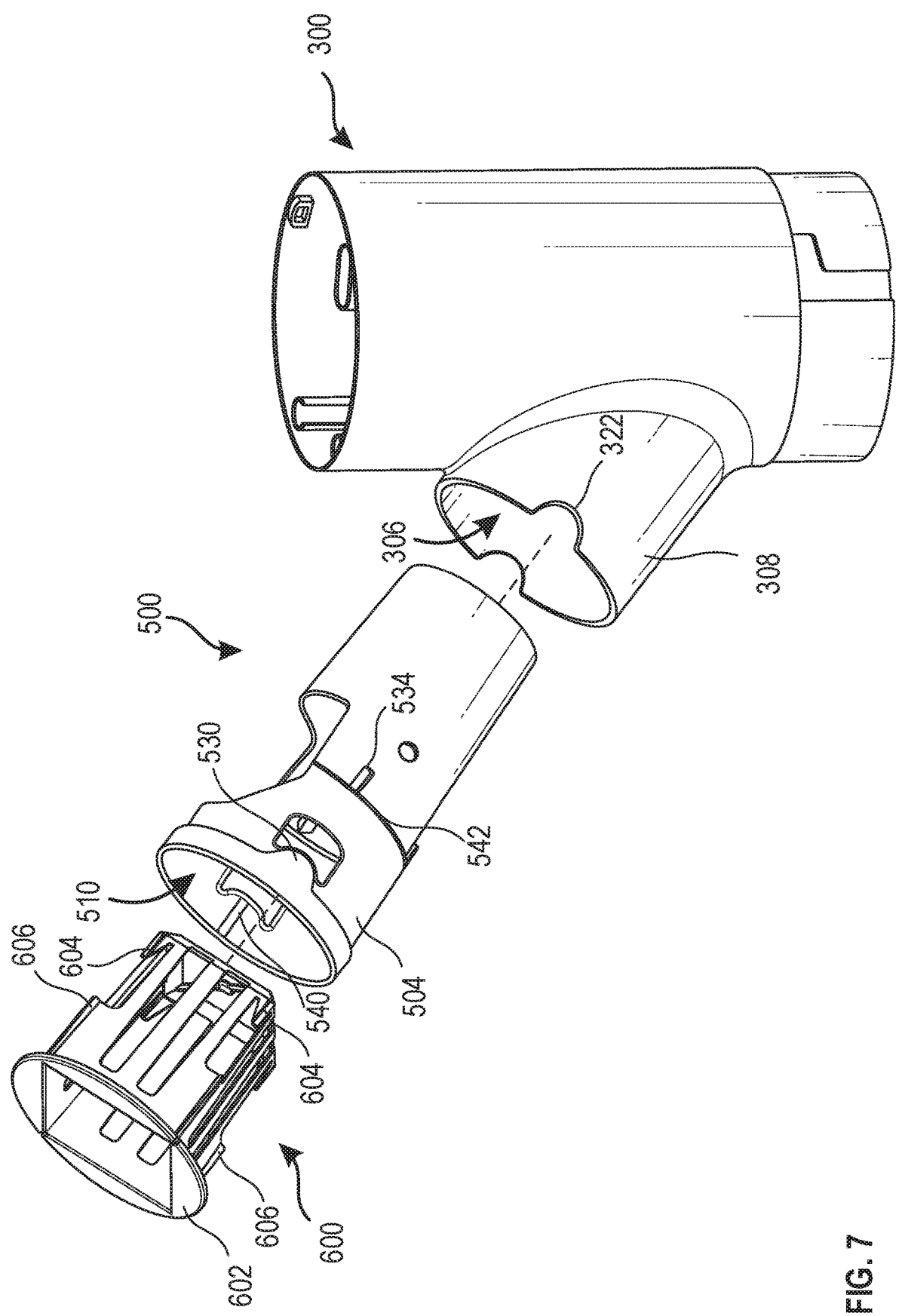

PLANT GROWTH CONTAINER

CROSS-REFERENCE TO RELATED APPLICATIONS

Any and all applications for which a foreign or domestic priority claim is identified in the Application Data Sheet as filed with the present application are incorporated by reference under 37 CFR 1.57 and made a part of this specification in their entireties and for all purposes.

FIELD

The present disclose generally relates to horticultural methods and systems. More particularly, in several embodiments, the present disclosure relates to modular produce-growing systems in which plants grow without soil.

BACKGROUND

New techniques have been developed for growing plants without soil by utilizing mineral nutrient solutions in a water solvent. These techniques can provide a means of indoor cultivation; however, they give rise to technical challenges relating to efficient utilization of energy and water.

SUMMARY

The systems, methods, and devices of this disclosure each have several innovative aspects, no single one of which is solely responsible for the all of the desirable attributes disclosed herein.

The present disclosure describes example systems and methods relating to a plant-growing system. One or more embodiments disclose a plant-growing container. The plant-growing container can include a lower portion and a wall extending upwardly from the lower portion. The wall can include a first aperture. The plant-growing container can further include an orifice formed by an upper portion of the wall and configured to receive a removable seed receptacle. The plant-growing container can further include a reservoir provided by a lower portion of the wall. The container can be configured to be removably inserted into a port of a module of a plant-growing system. The reservoir can be configured to receive a first volume of fluid from a fluid that is circulated through the plant-growing system.

The plant-growing container of any of the preceding paragraphs may also include any combination of the following features described in this paragraph, among other features described herein. In some cases, during circulation of the fluid through the plant-growing system, the reservoir can be configured to receive the first volume of fluid via the first aperture. In some cases, during circulation of the fluid through the plant-growing system, the first aperture can be configured to allow fluid to exit the plant-growing container through the first aperture in response to the reservoir receiving a first threshold amount of fluid that is greater than the first volume of fluid. The wall can include a second aperture. The second aperture can be configured to reduce an amount of fluid in the container to a second threshold amount of fluid. In some cases, during circulation of the fluid through the plant-growing system, at least some of the fluid exits the plant-growing container through the second aperture responsive to the reservoir holding greater than the second threshold amount of fluid.

The plant-growing container of any of the preceding paragraphs may also include any combination of the following features described in this paragraph, among other features described herein. The second threshold amount of fluid can be a smaller volume than the first threshold amount of fluid. The container can be configured to be removably inserted into the port at an angle. The plant-growing container can further can include an engagement portion configured to mate with an engagement portion of at least one of the removable seed receptacle or a module.

One or more embodiments disclose a module. The module can include a wall defining a portion of an internal space within the module. The module can further include a shelf extending inwardly from the wall. The shelf can include a first aperture, The shelf can be configured to receive a fluid during circulation of the fluid through the plant-growing system. The first aperture can be positioned in the shelf so that at least a portion of the fluid passes through the first aperture. The module can further include a port extending radially outward from the wall at an angle relative to a vertical axis of the wall. The port can include an orifice configured to receive a plant-growing container. The plant-growing container can include a reservoir. The port can be configured to engage the plant-growing container so that at least a portion of the plant-growing container protrudes into the internal space of the module. The module can further include an upper engagement portion configured to engage with one or more of a lower engagement portion of a second module and/or an engagement portion of a cap. The module can further include a lower engagement portion configured to engage with one or more of an upper engagement portion of a third module and/or a base connector of a fluid storage and distribution system.

The module of any of the preceding paragraphs may also include any combination of the following features described in this paragraph, among other features described herein. The shelf can include a contoured portion configured to direct fluid on the shelf toward the first aperture. The first aperture can be positioned within the shelf such that when fluid flows through the first aperture. The fluid can be received by the plant-growing container through a hole in the plant-growing container. The port can be configured to direct the reservoir of the plant-growing container at a position below the aperture such that the reservoir collects fluid that passes through the first aperture. The port can include an engagement portion configured to engage with a coinciding engagement portion of the plant-growing container. In some cases, engagement of the engagement portion of the port with the engagement portion of the plant-growing container restricts rotational movement of the plant-growing container within the orifice. The upper engagement portion of the module can be identical to the upper engagement portion of the third module. The lower engagement portion of the module can be identical to the lower engagement portion of the second module. The wall can extend circumferentially around the internal space of the module and provides an upwardly facing aperture defined by the upper engagement portion and a downwardly facing aperture defined by the lower engagement portion.

One or more embodiments disclose a seed receptacle. The seed receptacle can include an upper portion having an exterior shape and an interior shape. The seed receptacle can further include a lower portion. The lower portion can include a wall defining a cavity within the seed receptacle, and an engagement portion configured to engage with an engagement portion of a plant-growing container. The wall of the lower portion can define the interior shape of the upper portion.

The seed receptacle of any of the preceding paragraphs may also include any combination of the following features described in this paragraph, among other features described herein. The wall can be porous. The cavity can be configured to store a plant medium can include a seed. The wall can restrict rotational movement of the plant medium within the cavity. The interior shape of the upper portion can be different from the exterior shape of the upper portion. The engagement portion of the seed receptacle can include a protrusion and the engagement portion of the plant-growing container can include a cavity configured to receive the protrusion. The engagement portion of the seed receptacle can be configured to protrude through a portion of the plant-growing container when the seed receptacle is coupled with the plant-growing container. The upper portion of the seed receptacle can be configured to align and/or be level with a portion of the plant-growing container when the seed receptacle is coupled with the plant-growing container. The engagement portion of the seed receptacle can be configured to exert an outward pressure on an interior of the plant-growing container. The engagement portion of the plant-growing container can be configured to exert an inward pressure on an exterior of the seed receptacle. In some cases, engagement of the engagement portion of the seed receptacle with the engagement portion of the plant-growing container restricts rotational movement of the seed receptacle within the plant-growing container.

One or more embodiments disclose a fluid distribution system. The fluid distribution system can include a base. The base can include a chamber. The fluid distribution system can further include a lid configured to cover at least a portion of the chamber. The fluid distribution system can further include an elongate member extending through an aperture of the lid. The elongate member can include a first end on a chamber-facing side of the lid and a second end on a non-chamber-facing second side of the lid, wherein the first end can be configured to couple to a pump. The second end can include a handle. In some cases, movement of the handle moves the pump relative to the chamber.

The fluid distribution system of any of the preceding paragraphs may also include any combination of the following features described in this paragraph, among other features described herein. An elevation of the handle can raise the pump relative to the chamber. A longitude axis of the elongate member can be parallel to a vertical axis. In some cases, in a first configuration of the elongate member, the handle of the elongate member is located in a recess of the non-chamber-facing side of the lid and the pump is located in the chamber. In some cases, in a second configuration of the elongate member, the handle of the elongate member is located in an elevated location relative to the lid and the pump is located in a recess of the chamber-facing side of the lid. The lid can include a first engagement portion. The first engagement portion can be configured to engage with a second engagement portion of a planting column. The fluid distribution system can further include the pump. The pump can be configured to pump fluid from the chamber to the plant column. The lid can include a first engagement portion. The first engagement portion can be configured to engage with a second engagement portion of the base.

One or more embodiments disclose a plant-growing system. The plant-growing system can include a chamber configured to hold a fluid. The plant-growing system can further include at least an uppermost module and a lower module. The uppermost module can be coupled to the lower module to form at least a portion of a planting column. The planting column can be coupled to a lid of the chamber. Each of the uppermost module and the lower module can include a port configured to receive a removable plant-growing container that includes a reservoir. The plant-growing system can further include a pump that can be configured to circulate the fluid through the plant-growing system. In some cases, at least some of the fluid is supplied to the planting column. In some cases, at least some of the fluid is captured in the reservoir of at least one of the plurality of modules.

The plant-growing system of any of the preceding paragraphs may also include any combination of the following features described in this paragraph, among other features described herein. The uppermost module can include a lower engagement portion and an upper engagement portion. The lower engagement portion of the uppermost module can be configured to engage with an upper engagement portion of the lower module. The lower engagement portion of the uppermost module can include one or more engagement features and the upper engagement portion of the lower module can include one or more coinciding engagement features. The planting column can further include a cap coupled to the uppermost module. The pump can be configured to pump the fluid to the uppermost module in the planting column. The plant-growing system can include a first removable plant-growing container and a second removable plant-growing container provided in the uppermost module and the lower module, respectively. A first volume of fluid from the fluid can be captured by a reservoir of the first removable plant-growing container. A second volume of fluid from the fluid can be captured by a reservoir of the second removable plant-growing container. At least some of the fluid can flow from the uppermost module to the lower module. The uppermost module and the lower module can be part of a first plurality of modules. The planting column can be a first planting column. The plant-growing system further can include a second plurality of modules forming at least a portion of a second planting column. The second planting column can be coupled to the chamber. Each module of the second plurality of modules can include a port configured to receive a removable plant-growing container that includes a reservoir. At least some of the fluid can be supplied to the second planting column.

One or more embodiments disclose a plant-growing system. The plant-growing system can include a chamber configured to hold fluid. The plant-growing system can further include a plurality of modules forming at least a portion of a planting column. The planting column can be coupled to the chamber. Each module of the plurality of modules can include a planting port configured to include a plant. The plant-growing system can further include a pump configured to pump the fluid from the chamber to the planting column. The plant-growing system can further include a light source configured to emit light. The plant-growing system can further include one or more processors configured to control the pump according to a pump schedule and control the light source according to a lighting schedule. The one or more processors can be further configured to receive sensor data corresponding to the plant-growing system. The sensor data can include at least one of temperature data, pH data, humidity data, water level data, optical data, or electrical conductivity data. The one or more processors can be further configured to receive imaging data. The imaging data can include an image of at least a portion of a first plant residing in a first module of the plurality of modules. The one or more processors can be further configured to estimate a harvest date for the first plant based at least in part on the pump schedule, lighting schedule, the sensor data, and/or the imaging data.

The plant-growing system of any of the preceding paragraphs may also include any combination of the following features described in this paragraph, among other features described herein. The harvest date can correspond to at least one of a date by which the plant will be ready to harvest, a date by which the plant will be safe to consume, a date by will the plant will be ripe, a date by which at least a portion of one or more leaves of the plant change color, or a date by which at least a portion of the plant satisfies a threshold size. The pump schedule can indicate at least one of a frequency at which the pump should operate, a duration of time over which the pump should operate, or a speed at which the pump should operate. The lighting schedule can indicate at least one of a frequency at which the light source should operate, a duration of time over which the light source should operate, or an intensity at which the light source should operate. The one or more processors can be further configured to adjust at least a portion of at least one of the pump schedule or the lighting schedule.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

These drawings and the associated description herein are provided to illustrate specific embodiments and are not intended to be limiting.

FIG. 5D illustrates a perspective view of an example of an upright plant-growing container.

FIG. 5E illustrates a cross sectional side view of an example of an angled plant-growing container.

FIG. 7 illustrates an exploded perspective view of an example module, an example plant-growing container, and an example seed receptacle.

DETAILED DESCRIPTION

Plant-growing systems and methods described elsewhere herein can provide modular (e.g., "plug-n-play" modules, plant-growing containers, or seed receptacles) systems, devices, and techniques for growing plants. The systems and devices can be configured for indoor or outdoor use and can facilitate the growth of fresh, high-quality produce, even if an individual using the system or methods may have little to no gardening experience or skills. A variety of modular plant-growing systems and plant-growing devices are described below to illustrate various examples that may be employed to achieve one or more desired improvements. These examples are only illustrative and not intended in any way to restrict the general inventions presented and the various aspects and features of these inventions. Furthermore, the phraseology and terminology used herein is for the purpose of description and should not be regarded as limiting. No features, structure, or step disclosed herein is essential or indispensable.

System Overview

Figure 1A:
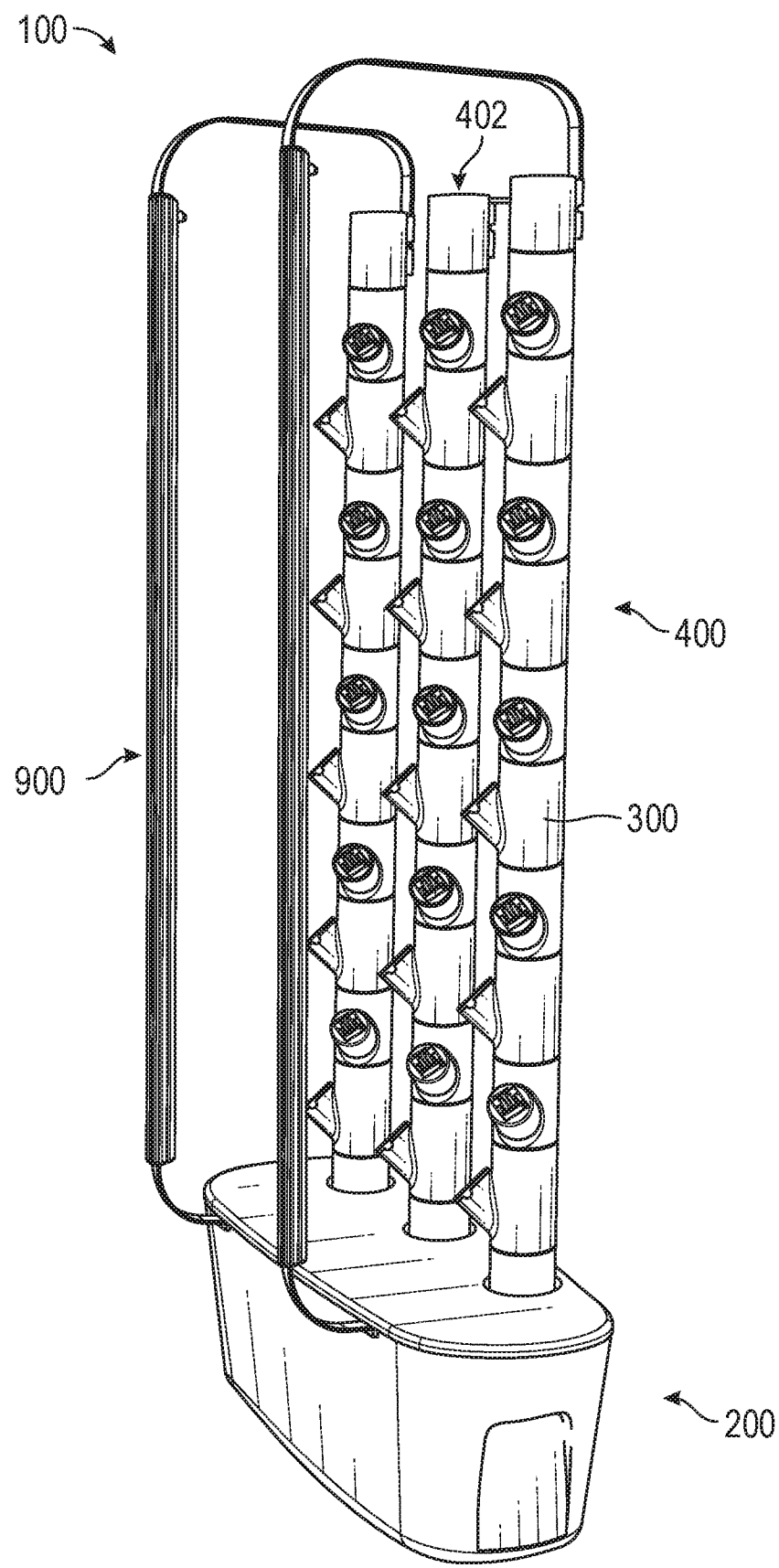
FIGS. 1A-1D illustrate perspective views of example plant-growing systems, in accordance with example embodiments.
Figure 1B:
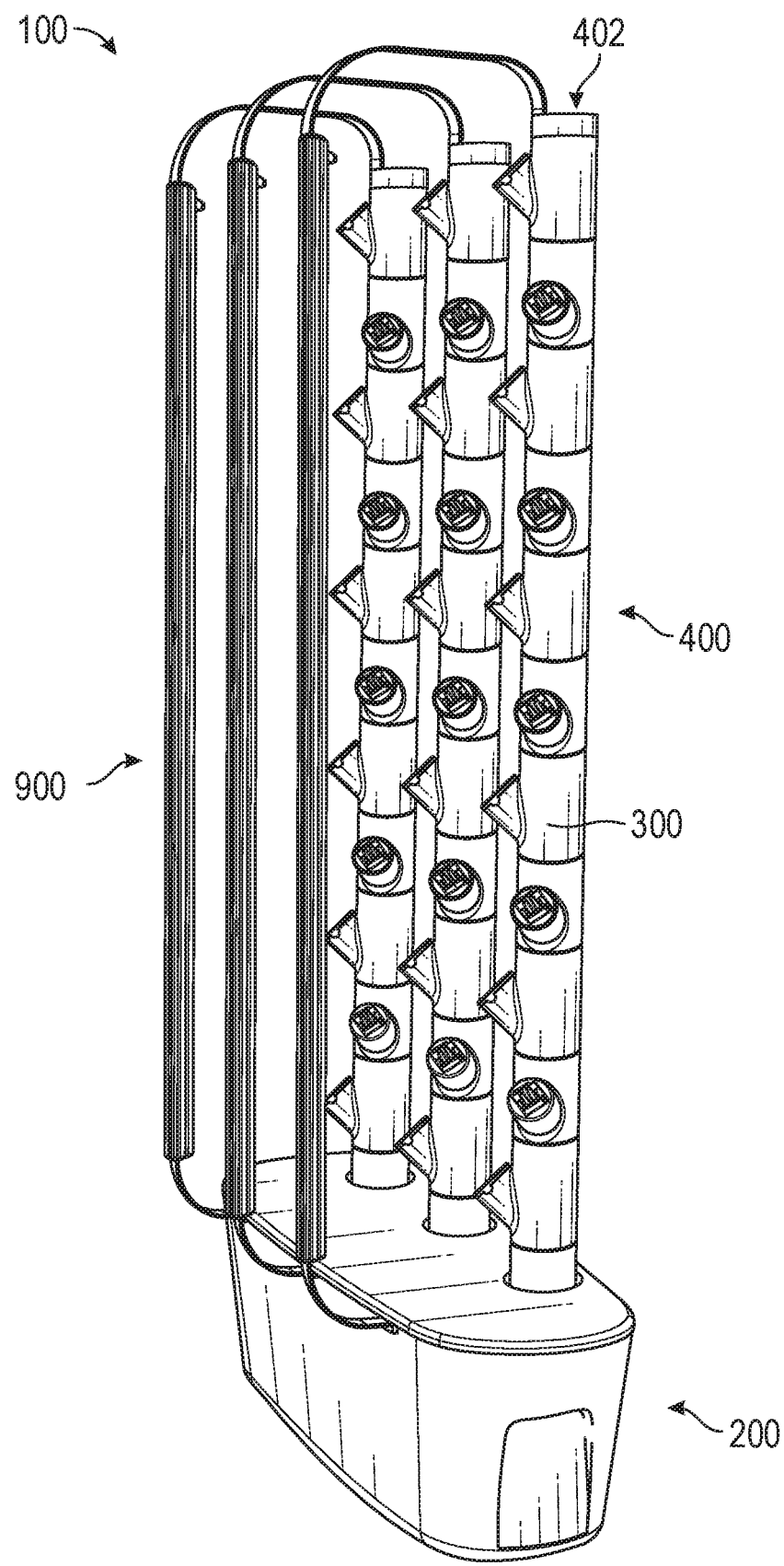
Figure 1C:
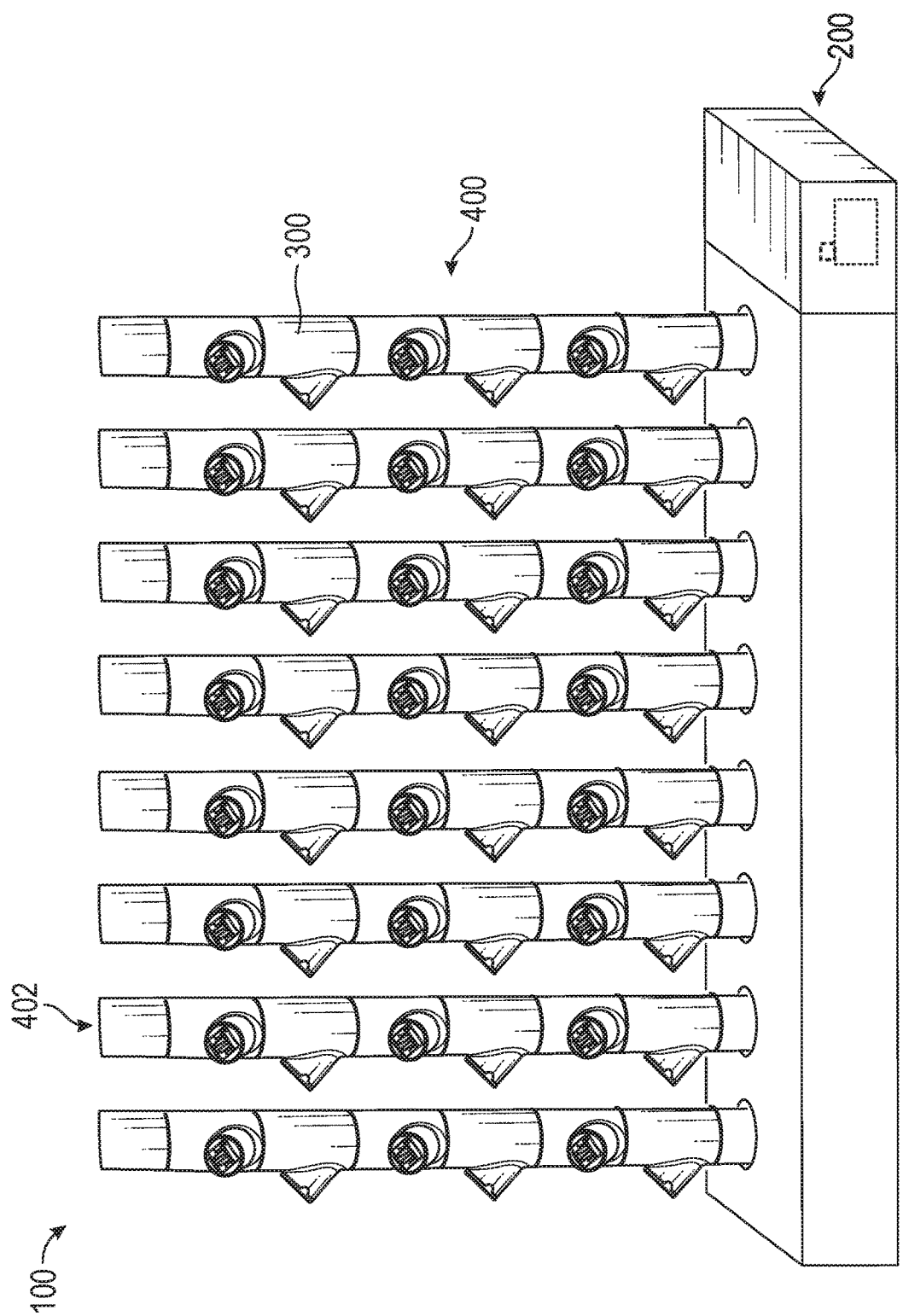
Figure 1D:
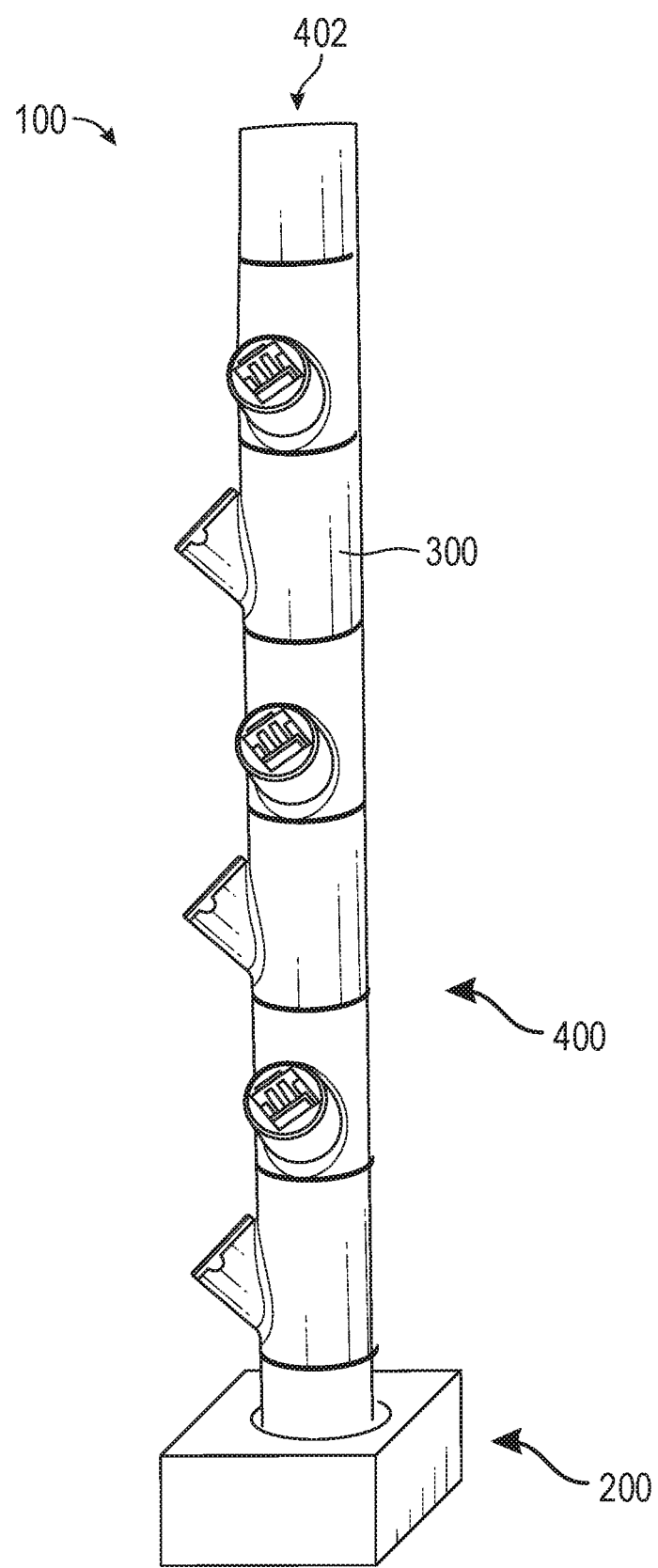

FIGS. 1A-1D illustrate perspective views of exemplary plant-growing systems 100, as disclosed herein. In some implementations, the plant-growing system 100 includes one or more of a fluid storage and distribution system 200, a planting system 400, and a lighting and/or image capture system 900, as illustrated in FIGS. 1A and 1B. In certain configurations, the plant-growing system 100 includes a fluid storage and distribution system 200 and a planting system 400, as shown in FIGS. 1C and 1D. It will be appreciated that the plant-growing systems 100 of FIGS. 1A-1D represent example plant-growing systems and other embodiments may use fewer, additional, or different components or arrangements (including a different arrangements of fluid storage and distributions systems, planting systems, lighting systems, and components thereof that are not pictured). Furthermore, it will be understood that, in some implementations, any one or more components of the fluid storage and distribution system 200, the planting system 400, or the lighting and/or image capture system 900 can be part of one or more of the other systems.

In some implementations, the fluid storage and distribution system 200 can be configured to store a fluid. The fluid may be, for example, water, an aqueous solution (can include plant nutrients, plant foods, etc.), any commercially available plant nutrients that are suitable for plants grown in a soilless plant-growing system, or the like. In several configurations, the fluid storage and distribution system 200 is configured to distribute fluid to other portions of the plant-growing system 100, such as to the planting system 400.

In certain implementations, the fluid storage and distribution system 200 can also function as a base of the plant-growing system 100. For example, as illustrated in FIGS. 1A-1D, the fluid storage and distribution system 200 can form the bottom of the plant-growing system 100 and can support one or more of the planting system 400, the lighting, and/or image capture system 900. However, it will be understood that the configuration of the plant-growing system 100 can vary across embodiments. For example, in some cases, the fluid storage and distribution system 200 can be offset from or supported by one or more components of the plant-growing system 100, such as the planting system 400 or the lighting and/or image capture system 900, and a separate base for the plant-growing system 100 can be provided as a separate component (not pictured).

In some configurations, the planting system 400 can be configured with plug-n-play plant-growing capabilities. In some implementations, the planting system 400 can be configured with modules 300 that can be mixed and matched. The planting system 400 can include a plurality of modules 300 that are coupled together in an end-to-end configuration to form at least a portion of a planting column 402, which is coupled to the fluid storage and distribution system 200. In some implementations, each module is identical. In other implementations, different modules (e.g., non-identical modules) can be used in combination. In some configurations, the size (e.g., height) of an individual planting column 402 can be increased by inserting additional modules 300 into the column 402. A column 402 can include as few as one module 300 or a plurality of modules 300, including 2, 3, 4, 5, 6, 7, 8, 9, or 10 modules (or more).

Figure 3A:
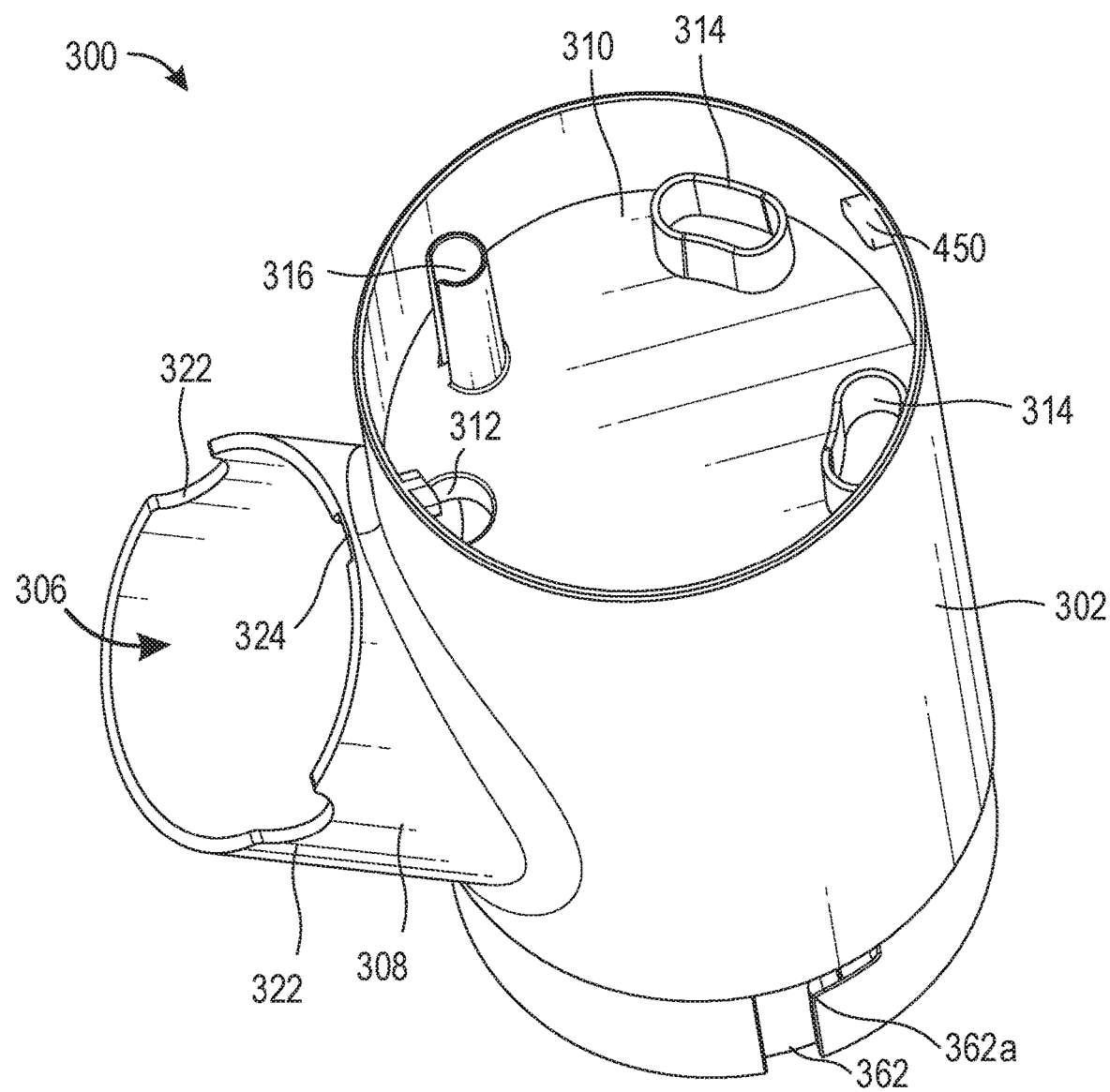
FIGS. 3A-3C illustrate perspective and cross-sectional side views, respectively, of example modules.
Figure 3B:
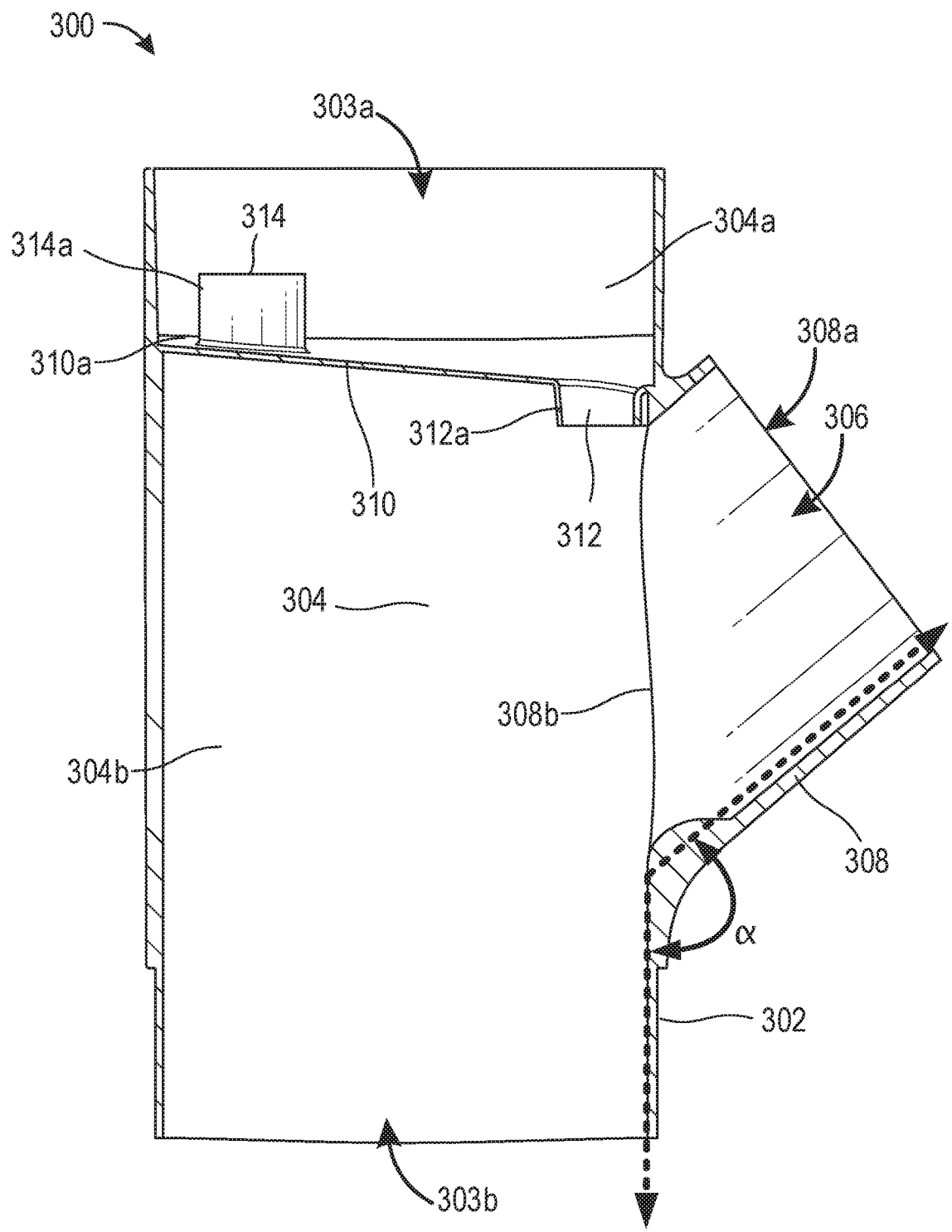

As described elsewhere herein, each of the modules 300 can be configured with plug-n-play plant-growing capabilities. In some implantations, each of the modules 300 can be configured to removably receive a plant-growing container (such as the plant-growing container 500 of FIGS. 5A-5C). In some cases, a first plant-growing container can be removed from a module 300 a second plant-growing container can be removably received by the module. Further, the planting system 400 can receive fluid from the fluid storage and distribution system 200 and can supply the fluid to the plant-growing containers. Notably, in some implementations, a user can remove a plant-growing container from a module 300 of the planting system 400 without causing the plant-growing system 100 to function differently (e.g., substantial interrupt the flow of fluid through the system), to malfunction, or to spill fluid (e.g., spill as it is circulated through the system, spill from the removed plant-growing container, etc.). Similarly, a user can insert a plant-growing container into an available port 308 (as shown in FIGS. 3A-3B) of a module of the planting system 400 at any time without causing the plant-growing system 100 to function differently, malfunction, or spill fluid. In this way, the plant-growing system 100 can streamline the growing process of plants. Furthermore, the plant-growing system 100 can provide increase fluid efficiency by limit the amount of fluid lost during removal and/or insertion of a plant-growing container into a port 308 of a module of the planting system 400.

Figure 2A:
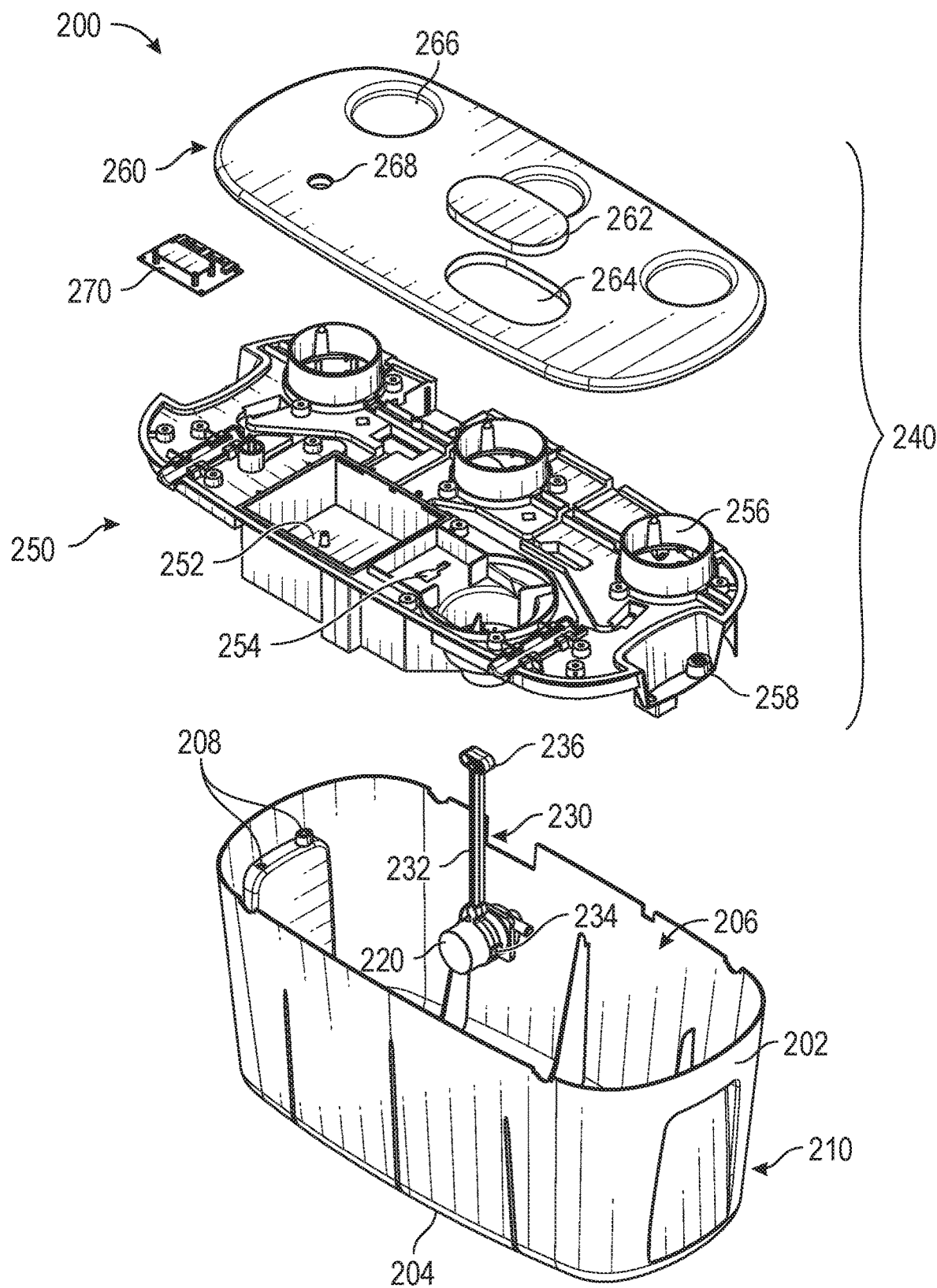
FIG. 2A illustrates an exploded view of an example fluid storage and distribution system.

It will be understood that the number of planting columns 402 of a planting system 300 can vary across embodiments. For example, the planting systems 300 of FIGS. 1A and 1B depict three planting columns 402, the planting system 300 of FIG. 1C depicts eight planting columns 402, and the planting system 300 of FIG. 1D includes only one planting column 402. However, it will be understood that any number of planting columns can be utilized. In some embodiments, the fluid storage and distribution system 200 or separate base (not pictured) can include one or more base connectors 256 (e.g., as shown in FIG. 2A) that allow attachment of a bottommost module 300 that may act as a lowest member of a planting column 402. In some configurations, the fluid storage and distribution system 200 or separate base (not pictured) can include at least one base connector 256 or a plurality of base connectors 256 (e.g., 2, 3, 4, 5, 6, 7, 8, or more). Additionally, in some implementations, where a base connector 256 is provided but a column 402 is not desired at that position, a cap 403 can be used to plug (e.g., cover, block, etc.) the base connector 256 (e.g., to prevent access to the fluid storage and distribution system 200, to prevent light from entering the planting system 100, or the like).

Furthermore, although the planting columns 402 of FIGS. 1A-1D are illustrated as a single row of vertical and cylindrical pillars, it will be appreciated that the layout, orientation, or size of the planting columns 402 can vary across embodiments. For example, a planting column 402 can be vertical or substantially vertical, or can be oriented at an angle relative to a vertical axis. For instance, the one or more planting columns 402 can be tilted, slanted, or oriented 5° to 50°, 50° to 130°, or 130° to 180° relative to a vertical axis. As another example, in some cases, one or more of the planting columns 402 can be staggered or out of line relative to one or more other planting columns 402. In some cases, as disclosed elsewhere herein, the size (e.g., height) of the planting column is configurable by a user. For example, a planting column can have a height or length based on a number of stacked modules of the planting column. Furthermore, in some implementations, not shown, the planting columns 402 can form at least a portion of a wall. For example, a planting column 402 can be integrated with a wall of a room such that a plurality of ports 308 protrude from the wall surface and the planting columns 402 are behind or embedded into the wall of the room.

Furthermore, it will be understood that the shape or width of the one or more planting columns 402 can vary across embodiments. For example, the one or more planting columns 402 can be relatively cylindrical, rectangular, triangular, spherical, conical, or helical in shape. As another example, the one or more planting columns 402 can have a shape that is similar to a prism, such as a regular prism, an irregular prism, a right prism, an oblique prism, a parallelepipeds, a cuboid, a triangular prism, a rectangular prism, a pentagonal prism, a hexagonal prism, or the like. Further still, in some cases, the one or more planting columns 402 have a zig-zag or wavy shape. In some configurations, the module 300 can have a shape that is substantially cylindrical, rectangular, triangular, spherical, conical, or that is similar to a prism, such as a regular prism, an irregular prism, a right prism, an oblique prism, a parallelepiped, a cuboid, a triangular prism, a rectangular prism, a pentagonal prism, a hexagonal prism, or the like.

The lighting and/or image capture system 900 can be configured to facilitate the growth and/or monitoring of the plants within the planting system 400. For example, as described elsewhere herein, in some cases, the lighting and/or image capture system 900 can include a controllable light source, such as one or more LEDs, that is configured to provide light to the plants, which can aid growth of the plants. As another example, the lighting and/or image capture system 900 can include a camera or other image capture device that can be configured to capture images or video of one or more plants over time and/or provide real-time or near real-time images or video of one or more plants, as well as be utilized to monitor the plants.

Example Fluid Storage and/or Distribution System

FIG. 2A illustrates an exploded view of an example fluid storage and distribution system 200. As shown, in some instances, the fluid storage and distribution system 200 can include a base 210, a pump 220, a pump lift 230, and a lid 240. FIG. 2A represents an exemplary fluid storage and distribution system. It will be understood that, as disclosed elsewhere herein, other embodiments may use fewer, additional, or different components or arrangements. Additionally, the components disclosed for use with the embodiment of FIG. 2A can be mixed and matched and/or used with other exemplary systems disclosed elsewhere herein.

The fluid storage and distribution system 200 can include a wall 202 or one or more walls that, together with a bottom portion 204, provide or form a chamber 206. The wall 202 and the bottom portion 204 can create or form the base 210. It will be appreciated that the shape of the base 210 can vary across embodiments. For example, the base 210 can be relatively cylindrical, rectangular, triangular, spherical, conical, or helical in shape. As another example, the base 210 can have a shape that is similar to a prism, such as a regular prism, an irregular prism, a right prism, an oblique prism, a parallelepiped, a cuboid, a triangular prism, a rectangular prism, a pentagonal prism, a hexagonal prism, or the like. Furthermore, it will be appreciated that the size or dimensions of the base 210 can vary across embodiments.

As disclosed elsewhere herein, the base 210 can define, create, or form a chamber 206. The chamber 206 can be configured to store fluid. The type of fluid can vary across embodiments. For example, as disclosed elsewhere herein, the fluid can include water, mineral nutrient solutions in a water solvent, or any commercially available plant nutrients that are suitable for plants grown in a soilless plant-growing system. In some cases, the chamber 206 can include a user access opening 264 (e.g., covered by a removable cover 262) that allows a user to access a handle 236 of the pump lift 230, add additional fluid and/or nutrients, etc.

Figure 10:
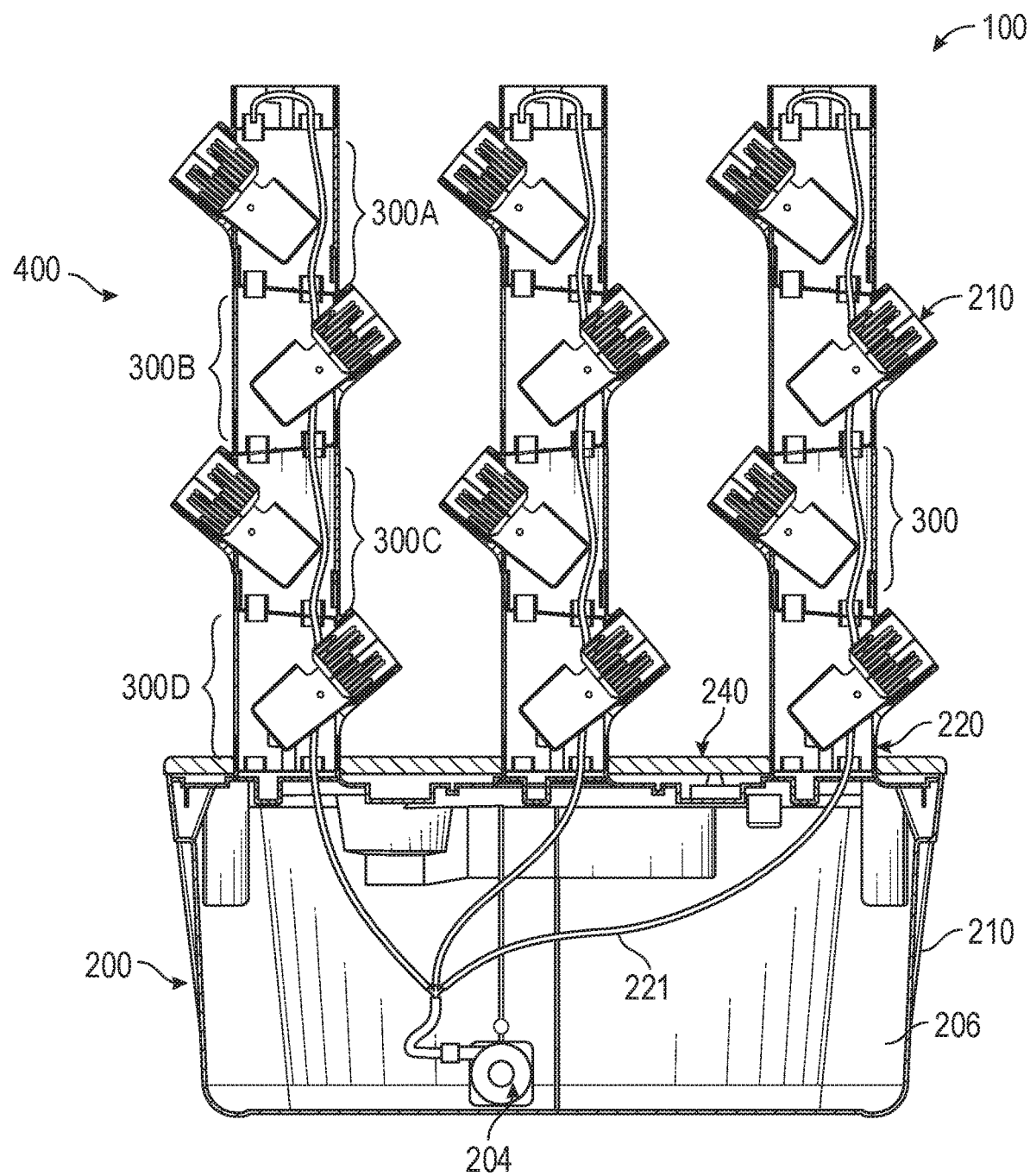
FIG. 10 illustrates a cross sectional view of an example plant-growing system.

In several implementations, the pump 220 can be configured to circulate fluid through the plant-growing system 100. For example, the pump 220 can be configured to pump fluid from the chamber 206 to a portion of the planting system 400, such as to an upper-most module 300 of a planting column 402 and/or to each module 300 of a planting column 402. In some configurations, the pump 220 is in fluidic communication with a fluid conduit (e.g., the fluid conduit 221 as shown in FIG. 10). In some implementations, as shown in FIG. 10, the fluid conduit 221 distributes fluid to the uppermost module 300A (e.g., to a plant-growing container removably inserted in the uppermost module). Referring to FIG. 10, and as described elsewhere herein in additional detail, the fluid may be distributed into the uppermost module 300A (e.g., to a plant-growing container removably inserted in the uppermost module 300A) and then down the column serially until a plant-growing container in the bottommost module 300D is filled. For example, the fluid may be distributed into the uppermost module 300A first, which can cause a plant-growing container removably inserted in the uppermost module to fill and overflow to fill (e.g., through gravity) the plant-growing container removably inserted in the next uppermost module 300B, followed by the third uppermost module 300C, and finally the bottommost module 300D. In certain configurations, the plant-growing container removably inserted in the bottommost module 300D can then overflow to replenish the fluid in the chamber 206. In other implementations, not shown, the fluid may be distributed to each module 300A, 300B, 300C, 300D simultaneously or substantially simultaneously by the fluid conduit or by virtue of the shape and configuration of the modules. Further still, in some implementations, not shown, the fluid may be distributed into the uppermost module 300C or to each module 300A, 300B, 300C, 300D simultaneously or substantially simultaneously through external means, such as from an irrigation system that is external to the planting system 100. For example, fluid may be provided to a module 300 through a hole in the module 300.

Figure 2B:
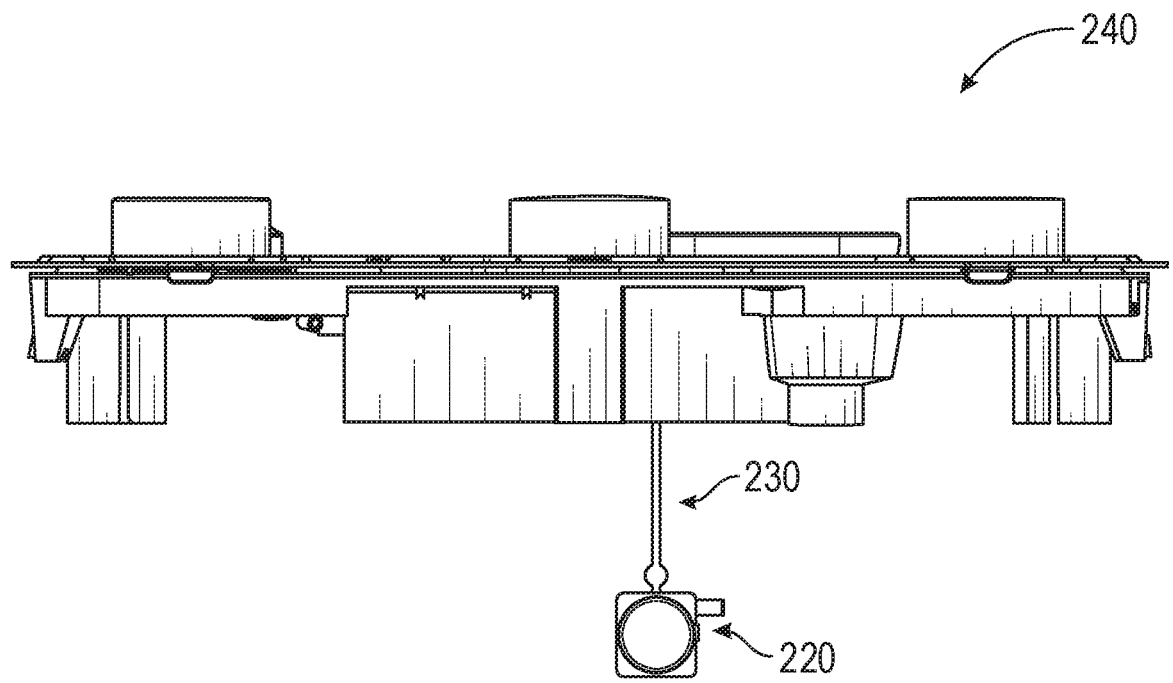
FIGS. 2B and 2C illustrate example configurations of a pump of an example fluid storage and distribution system.
Figure 2C:
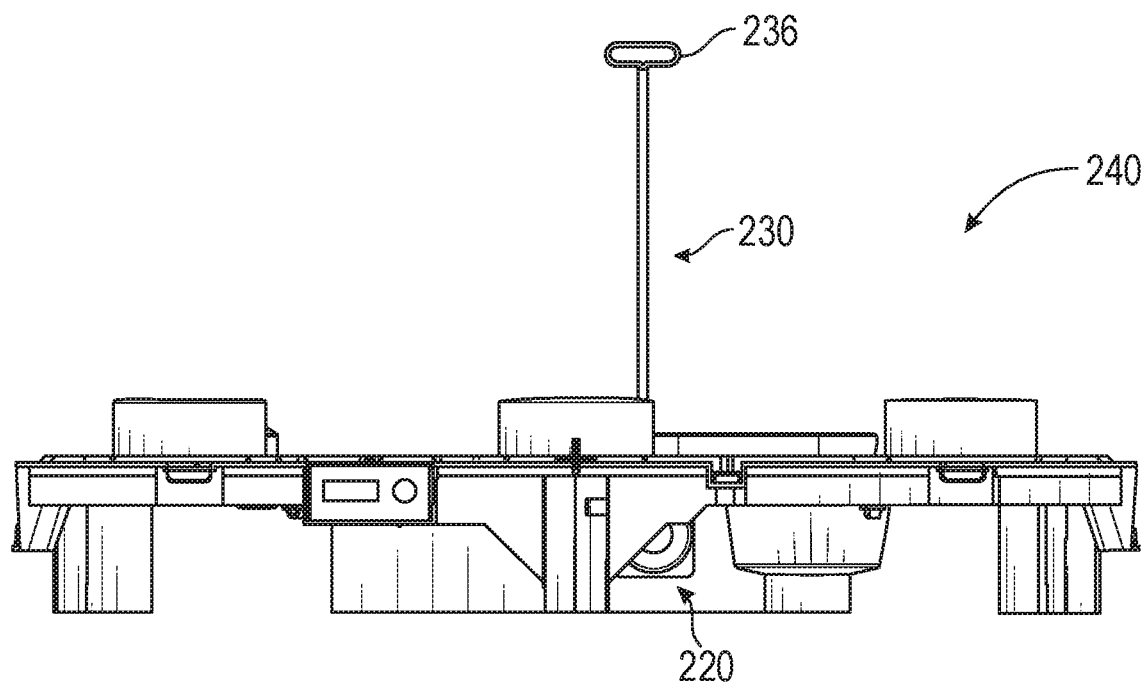

As illustrated in FIG. 2A-C, in some cases, the pump 220 can be coupled to a pump lift 230, which can be used to raise or lower the pump 220. For example, in a first configuration, the pump 220 can be suspended from the pump lift 230 into the chamber 206, for example so that the pump 220 can be submerged in the fluid held in the chamber 206. As another example, in a second configuration, the pump 220 can be raised above the fluid in the chamber by the pump lift 230.

In some cases, the pump 220 is a submersible water pump. However, the type of pump 220 can vary across embodiments. In some cases, the pump 220 can be controlled electronically. For example, in some cases, the speed of the pump or the frequency at which the pump operates can be controlled by a computing device, such as the controller 270, as described elsewhere herein. In this way, in some cases, the controller 270 can adjust an amount of fluid delivered to the plants of the plant-growing system 100. As described elsewhere herein, in some cases, plant growth can be based on an amount of fluid delivered to the plant over time. As such, in some cases, the controller 270 can control the pump to control or otherwise influence a growth rate or harvest date of a plant. In some cases, the controller can reside in a compartment 252 of the lower portion 260 of the lid 240.

The lid 240 can be configured to cover at least a portion of the chamber 206. In some cases, the lid 240 can cover the entire chamber 206, for example such that the base 210 and the lid 240 seal the chamber 206. In some configurations, the lid seals the chamber such that no light can enter the chamber 206. In some cases, the lid 240 can be configured to couple to the base 210 via coinciding coupling features on the lid and base (e.g., a snap fit pairing, a living hinge and coinciding lip, an interference fit pairing, a hook and loop fastener, a protrusion and slot, a clip, a clamp, a clasp, a buckle, a button, a hook and protrusion, a screw and aperture, a wire, etc.). For example, the lid 240 can include a first engagement portion 258 and the base 210 can include a second engagement portion 208, and the first engagement portion 258 can engage with the second engagement portion 208 to couple to lid 240 to the base 210. In the illustrated example, the first engagement portion 258 includes a slot and the second engagement portion 208 includes a protrusion. However, it will be understood that first engagement portion 258 and the second engagement portion 208 can vary across embodiments.

In some configurations, the lid 240 includes a lower portion 250 and a cover portion 260. In some implementations, as shown in FIG. 2A, the cover portion 260 may include one or more cover apertures 266 (e.g., one, two, three, four, five, six, seven, eight, or more). In some instances, the aperture 266 is configured allow access to a base connector 256 that is configured to engage a module 300 (e.g., a single module that may be alone or the bottom module in a column of modules stacked on one another). In certain implementations, the base connector 256 has a locking feature that engages with a coinciding locking feature of the module (e.g., a lower engagement portion of the module) to hold and/or secure the module in place. For example, the locking feature of the base connector 256 can include one or more features (e.g., tabs, recesses, protrusions, stripes, slots, bumps, and/or friction-inducing gripping surfaces, etc.—not shown) that interact with the lower engagement portion 362 of the module 300, which may have coinciding features (e.g., tabs, recesses, protrusions, stripes, slots, bumps, and/or friction inducing gripping surfaces, etc.). By way of illustration, the module 300 can include a slot 362 as shown in FIG. 3A and the base connector can include a protrusion (not shown). The protrusion can fit into the slot 362 and, as the module 300 is seated, the protrusion can travel within the slot to engage the module 300. In some instances, as shown, the slot can include an elbow 362a that allows the module 300 to be turned within the base connector 256 and secured in place. In some embodiments, the lid 240 includes a button aperture 268 through which a start/stop button can protrude. In some cases, the start/stop button can cause the pump 220 to pump fluid into the planting system 400.

In some implementations, the base connector 256 of the lid 240 and/or the engagement portion 362 of the module 300 can include one or more disconnection-resisting features or structures configured to resist disconnection between the module 300 and the base connector 256. The disconnection resisting features can be configured to initially require a higher level of force to initiate disconnection then, once that force is overcome, lower force to allow disconnection of the module 300 from the lid 240 without additional frictional resistance.

In some configurations, as disclosed elsewhere herein, the module 300 can include an upper engagement portion (e.g., upper engagement portion 450 of FIG. 3A). In some implementations, the upper engagement portion includes substantially the same features or identical features to those of the base connector 256. This can allow any module 300 to engage the base 210 or another module to allow stacking and mixing and matching of modules on the fluid storage and distribution system 200.

Example Pump Lift

In some circumstances, it may be desirable to remove or detach the lid 240 from the base 210. For example, removing or detaching the lid 240 from the base 210 can facilitate cleaning the base 210, adding fluid to the chamber 206, moving the plant-growing system 100, etc. The fluid storage and distribution system 200 can include a pump lift 230, which can allow a user to raise the pump 220 from the chamber 206, and then remove the lid 240 without having the pump 220 hanging below the bottom of the lid 240.

As illustrated in FIG. 2A, the pump lift 230 can include an elongate member 232 configured to extend through an aperture 254 of the lid 240. When coupled through the lid, the pump lift 230 includes a first end 234 on a chamber-facing side of the lid 240 and a second end 236 on a non-chamber-facing second side of the lid 240. The first end 234 is configured to couple to the pump 220, and the second end 236 includes a handle. Using this configuration, movement of the pump lift 230 (for example, elevation of the handle) moves the pump 220 relative to the chamber 206. FIGS. 2B and 2C illustrate side views of a transition from a lowered configuration of the pump 220 to an elevated configuration of the pump 220. As shown, as the handle of the pump lift 230 is elevated, the pump 220 is also elevated. It will be understood that the pump lift 230 can be implemented in a variety of ways. For example, although the pump lift 230 of FIGS. 2A-2C is illustrated as a manual lift, in some cases, the pump lift 230 can be controlled electronically.

Example Module

Figure 3C:
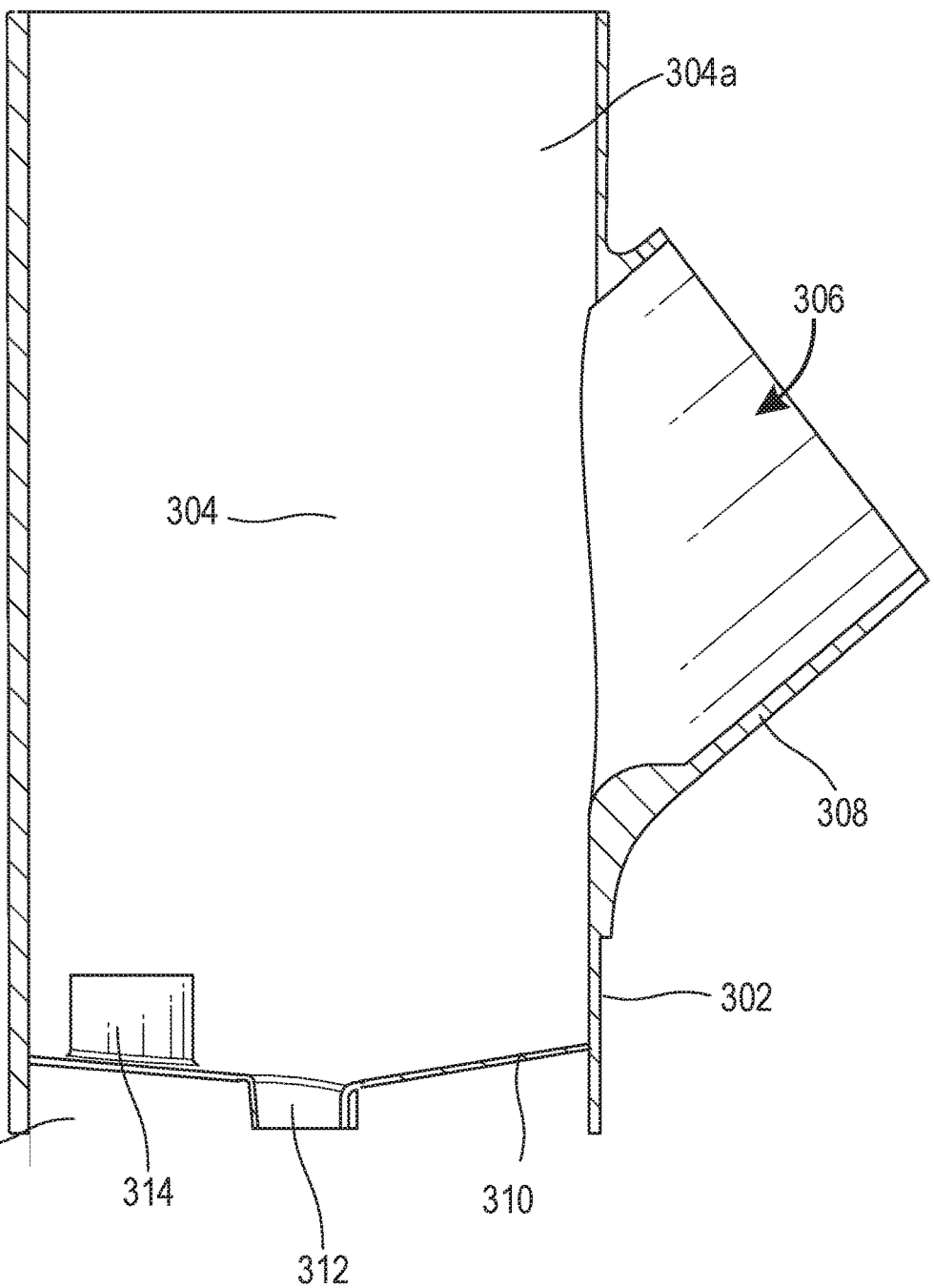

FIGS. 3A-3C illustrate perspective and cross-sectional side views of examples of module 300. As described elsewhere herein, a plant-growing system 100 can include one or a plurality of modules 300, which can be coupled together to form at least a portion of a planting system 400. Furthermore, each module 300 can be configured to couple to (e.g., receive) a plant-growing container (e.g., the plant-growing container 500 of FIG. 5A-5C). It will be understood that FIGS. 3A and 3B represent an example module and other embodiments may include different features or configurations.

The module 300 can include a wall 302, such as one or more walls. The wall 302 can define or form a generally hollow space 304 within the module 300. In the illustrated embodiment, the module 300 is relatively cylindrical. However, as disclosed elsewhere herein, it will be appreciated that the shape of the module 300 can vary across embodiments. For example, as shown, the module 300 can be substantially cylindrical in shape. In other embodiments, the module 300 can be substantially rectangular, triangular, spherical, conical, or helical in shape. As another example, the module 300 can have a shape that is similar to a prism, such as a regular prism, an irregular prism, a right prism, an oblique prism, a parallelepipeds, a cuboid, a triangular prism, a rectangular prism, a pentagonal prism, a hexagonal prism, or the like. Further still, in some cases, the module 300 can have a zig-zag or wavy shape.

In some implementations, as shown in FIG. 3B, the wall 302 may extend circumferentially around the hollow space 304 of the module 300. As shown, the module 300 may have an upper opening 303a and a lower opening 303b that allow access to an internal area of the module 300. It will be understood that, where the module 300 and/or planting column 402 of modules is oriented to the side (e.g., not upwardly and downwardly), the upper opening 303a and lower opening 303b would then be directed substantially sideways as a first opening and a second opening, respectively. In some configurations, the internal diameter of the module 300 remains substantially the same along a length of the module 300, such that the internal diameter of the upper opening 303a is substantially the same as the internal diameter of the lower opening 303b. In some examples, the internal diameter of the upper opening 303a is larger or smaller than the internal diameter of the lower opening 303b to facilitate stacking of the modules to form, for example, a planting column 402. In some configurations, the ratio of the internal diameters of upper opening 303a to the lower opening 303b can be about: 4:1, 2:1, 5:3, 4:3, 1:1, 3:4, 3:5, 1:2, 1:4, ratios between the aforementioned ratios, or otherwise.

As shown, the module 300 can include an orifice 306 (e.g., an aperture or opening). In some cases, the module 300 is configured to receive a plant-growing container (e.g., the plant-growing container 500 of FIGS. 5A-5C) through the orifice 306. In some cases, the orifice 306 can be created or formed by a port 308 (e.g., a side-arm) that extends or protrudes outwardly from the wall 302. For example, in the illustrated embodiments of FIGS. 3A and 3B, the port 308 (e.g., a hollow side-arm) extends outwardly from the wall 302 at an angle relative to a vertical axis of module 300. In other implementations, not shown, the port may extend inwardly into the module 300 relative to the wall 302 of the module 300. It will be understood that the angle at which the port 308 extends from (or into) the wall 302 can vary across embodiments. For example, in some cases, relative to a downwardly pointing axis as shown in FIG. 3B, the angle (a) at which the port 308 extends from the wall 302 can be greater than 90°, such that the orifice 306 is oriented upwards. In some cases, this upward orientation can facilitate the insertion of a plant-growing container into the orifice 306 as well as encourage plants to grow upward and away from the module 300. In some cases, as disclosed elsewhere herein, the upward orientation of the port prevents or substantially avoids spilling of a liquid from the reservoir of a plant-growing container when the plant-growing container is removed from or inserted into the module.

In some configurations, relative to a downwardly pointing axis, the angle (a) at which the port 308 extends from the wall 302 can be greater than or equal to about: 90°, 100°, 110°, 120°, 130°, 140°, 150°, 160°, 170°, or ranges including and/or spanning the aforementioned values. However, it will be understood that, in some cases, the angle at which the port 308 extends from the wall 302 can be equal to or less than 90°, such that the orifice 306 is oriented perpendicular to the vertical axis of module 300 or downwards. In some cases, the module 300 may include the orifice 306 without including a port 308. For example, in some cases, the orifice 306 can simply be an aperture in the wall 302, rather than a protrusion from the wall 302.

The shape of the orifice 306 and/or port 308 can vary across embodiments. For example, although illustrated as relatively circular, the orifice 306 and/or port 308 can be relatively rectangular, triangular, or square in shape or have the shape of a polygon. As another example, the orifice 306 and/or port 308 can have a shape of a leaf or a flower. In some cases, the orifice 306 and/or port 308 can have a symmetrical shape, while in other cases the orifice 306 can have a non-symmetrical shape. In some cases, the shape of the orifice 306 and/or port 308 is complementary to at least one of an exterior shape of a plant-growing container (for example, the plant-growing container 500 of FIGS. 5A-5C) or an exterior shape of seed receptacle (for example, the seed receptacle 600 of FIGS. 6A-6C).

In some configurations, as shown in FIG. 3B, an internal diameter of the port 308 remains the same along the port 308, such that the external opening of the port 308a (e.g., the orifice 306) has substantially the same internal diameter as the internal opening of the port 308b. In some embodiments, the internal diameter of the external opening is larger than the internal diameter of the internal opening such that the side-arm (e.g., port) has a partially conical shape and/or narrows proceeding toward the hollow space 304. For example, the ratio of the internal opening to the external opening area can be about: 1:1, 3:4, 3:5, 1:2, 1:4, ratios between the aforementioned ratios, or otherwise. In some implementations, this feature may aid in securing a plant-growing container that may have a coinciding shape when traveling from the top of the plant-growing container to the bottom.

The module 300 can include a member 310. In some configurations, as shown in FIG. 3A, the member 310 may extend inwardly from one portion of the wall 302 to another portion of the wall 302. In some cases, the member 310 creates at least a partial barrier within the hollow space 304 of the module 300. For example, in some cases, the member 310 can separate the hollow space 304 within the module 300 into at least two spaces. For example, as shown in FIG. 3A, the module 300 can have a space above the member 304a (e.g., an upper space) and a space below the member 304b (e.g., a lower space).

The position of the member 310 within the module 300 can vary across embodiments. For instance, in the illustrated examples of FIGS. 3A and 3B, the member 310 is positioned above the level of orifice 306 and below the top of the wall 302, thereby creating an upper shelf-like partition within the module 300. As another example, in the illustrated examples of FIG. 3C, the member 310 is positioned below the level of orifice 306 and above the bottom of the wall 302, thereby creating a lower shelf-like partition within the module 300. However, it will be understood that the position of the member 310 can be anywhere within the module 300. For example, in some cases, the member 310 is positioned at the top of the module 300 so that it is flush with the top of the wall 302. As another example, in some cases, the member 310 is positioned at the bottom of the module 300 so that it is flush with the bottom of the wall 302. In yet another example, the member 310 can be positioned such that it intersects or crosses at least a portion of the orifice 306 or the internal opening of the port 308b. In some cases, the module 300 can include multiple members 310, such as an upper member and a lower member. Where multiple members are provided (not shown), they may each include one or more of the features of any other member disclosed herein.

In some cases, the member 310 can extend horizontally from one section of the wall 302 to another section of the wall 302. In some cases, the member 310 can slope from one section of the wall 302 to another section of the wall 302. Furthermore, in some cases, the member 310 is relatively flat or level. In some cases, when viewed from above the module, the member 310 has one or more concavities. For example, as described elsewhere herein, the member 310 can include one or more apertures (for example, aperture 312) and at least a portion of the member 310 can be relatively concave or dipped so as to direct a flow of fluid through the member aperture 312. In some configurations, the member or a portion of the member is conical to direct fluid to the member aperture 312. Alternatively, in some cases, at least a portion of the member 310 can be relatively inclined or bumpy, for example to direct a flow of fluid through the aperture 312.

The member 310 can include one or more member apertures (e.g., openings, holes, passages, etc.). In some configurations, the aperture can allow access from the upper space 304a of the module 300 to the lower space 304b. For example, in some cases, the member 310 can include a first aperture 312. In some cases, the first aperture 312 can be configured to allow fluid to flow through the member 310. As shown, in some configurations, the aperture 312 can include a sidewall 312a. In some implementations, the sidewall 312a is downwardly facing (as shown) and in others the sidewall is upwardly facing (not shown). In some configurations, the downwardly facing sidewall 312a can act as a funnel to direct fluid from a particular area of the upper portion 304a of the module 300 to a particular area of the lower portion 304b of the module 300, such as to an expected location of an inserted plant-growing container. The location of the first aperture 312 within the member 310 can vary across embodiments. For example, in the illustrated embodiment of FIGS. 1B and 1B, the member 310 may be located at a position above the orifice 306 and the first aperture 312 is positioned such that it is directly over the area that would be occupied if a plant-growing container (for example, the plant-growing container 500 of FIGS. 5A-5C) were inserted into the orifice 306. In this way, the first aperture 312 is located within the member 310 such that the first aperture 312 can direct a flow of fluid onto an inserted plant-growing container (such as an orifice 408 of the plant-growing container 500 of FIGS. 5A-5C). As another example, in the illustrated embodiment of FIG. 1C, the member 310 is located at a position below the orifice 306 and the first aperture 312 is positioned such that it is below an area that would be occupied if a plant-growing container were inserted into the orifice 306. In this way, the member 310 can catch or receive any fluid flowing out of an inserted plant-growing container. Furthermore, in the illustrated embodiment of FIG. 1C, the aperture 312 is positioned within the member 310 such that the first aperture 312 can direct a flow of fluid onto a plant-growing container that is inserted into another module that is coupled to the module 300.

As disclosed elsewhere herein, the height at which the first aperture 312 is located relative to a highest connection point 310a of the member 310 at the wall 302 can vary across embodiments. In some cases, the first aperture 312 can be relatively flush with the member's 310 connection point to the wall 302 or can be lower relative to the member 310. In this way, fluid can more easily be directed through the first aperture 312. However, in some cases, the first aperture 312 can be raised relative to the member 310. In this way, fluid located on the member 310 (e.g., in the upper portion 304a of the module 300) must increase to a level above the raised aperture before fluid can flow through the first aperture 312. In some cases, aperture 312 is level with or slightly below the periphery of the member 310 about the wall 302 but the side wall 312a extends above the member 310 so that fluid collects on the member 310 until reaching the height of the sidewall of the aperture 312a.

In some cases, the member 310 can include one or more second apertures 314. In some cases, the one or more second apertures 314 are configured to receive a fluid conduit (e.g., a tube or hose, such as the fluid conduit 221 shown in FIG. 10) that extends from a fluid storage and distribution system (such as the fluid storage and distribution system 200 of FIG. 2). For example, the fluid conduit can allow fluid to be transported thorough the plant-growing system 100, such as through the planting system 400. In the illustrated embodiment, the member 310 includes two second apertures 314.

However, in this example, only one of the two second apertures 314 is used for the fluid conduit, but that second aperture 314 that is used can depend on the configuration of the module 300. As shown, in some configurations, a second aperture 314 can include a sidewall 314a. In some implementations, the sidewall 314a is upwardly facing (as shown) and in others the sidewall is downwardly facing (not shown). In some configurations, the upwardly facing sidewall 314a can act to direct fluid away from the second aperture 314 and/or toward the first aperture 312, such that the first aperture 312 directs fluid from a particular area of the upper portion 304a of the module 300 to a particular area of the lower portion 304b of the module 300 and the second aperture 314 does not.

As described elsewhere herein, multiple modules can be coupled together, and sometimes consecutive modules are rotationally offset from each other, for example, to provide additional space for the plants to grow. For example, when a first module and a second module are coupled together, the second module may be rotationally offset from the first module such that the port 306 of the second module is rotationally offset from the port 306 of the first module. The degree at which the second module is rotationally offset from the first module can vary across embodiments. For example, the second module can be rotationally offset from the first module 0° to 30°, 30° to 60°, 60° to 90°, 90° to 120°, 120° to 150°, 150° to 180° relative to a vertical axis. Because the modules are rotationally offset, the fluid conduit (e.g., the fluid conduit 221 as shown in FIG. 10) may extend through a first one of the second apertures 314 for a first module and may extend through a second one of the second apertures 314 for a second module.

As disclosed elsewhere herein, the height of the second apertures 314 relative to the member 310 (e.g., the highest connection point 310a of the member 310) or relative to the first aperture 312 can vary across embodiments. In some cases, the second apertures 314 can be relatively flush with the member 310 or can be lowered relative to the member 310. In some cases, the second apertures 314 can be raised relative to the member 310 or raised relative. In some cases, the second apertures 314 can be raised relative to the first aperture 312. In this way, because the first aperture 312 is lower than the second apertures 314, fluid will generally flow through the first aperture 312, rather than the second apertures 314, unless for example if the first aperture 312 is clogged (for example, by roots). Thus, in some cases, the second apertures 314 can be utilized as overflow holes. In some cases, the planting growing system 100 can provide an indication that the first aperture 312 is clogged or at least partially clogged. For example, the planting growing system 100 can include one or more sensors configured to measure fluid flow. The one or more sensors can be positioned so as to detect fluid flow through the first aperture 312 or one or more of the second apertures 314. In this way, the planting growing system 100 can monitor the fluid flow through the module 300 (e.g., through the member 310) and can provide an indication of fluid flow, such as a fluid blocked alarm.

The module 300 can include a conduit engagement portion 316 (e.g., as shown in FIG. 3A). The conduit engagement portion 316 can be configured to engage with a fluid conduit (e.g., the fluid conduit 221 as shown in FIG. 10) that is configured to supply fluid to the module 300. In the illustrated embodiment of FIG. 3A, the conduit engagement portion 316 may be coupled to or protruding from the member 310. However, it will be understood that the location of the conduit engagement portion 316 can vary across embodiments. For example, in some cases, the conduit engagement portion 316 can be coupled to the wall 302. Furthermore, in the illustrated embodiment of FIG. 3A, the conduit engagement portion 316 is depicted as a cylindrical wall that can receive a fluid conduit. However, it will be understood that the conduit engagement portion 316 can vary across embodiments. For example, the conduit engagement portion 316 can include a clip or a hook, or the like that can be configured to couple to an end of a fluid conduit. In some cases, a fluid conduit is coupled to the conduit engagement portion 316 of each module of a planting system. For example, an individual fluid conduit can be designated for each module. In some cases, a fluid conduit is coupled to the conduit engagement portion 316 of only a particular module of a planting system, such as the upper most module of the planting system. In this way, fluid can be supplied to the upper most module and then the fluid can flow down from the upper most module to the modules below the upper most module.

Example Planting System

Figure 4:
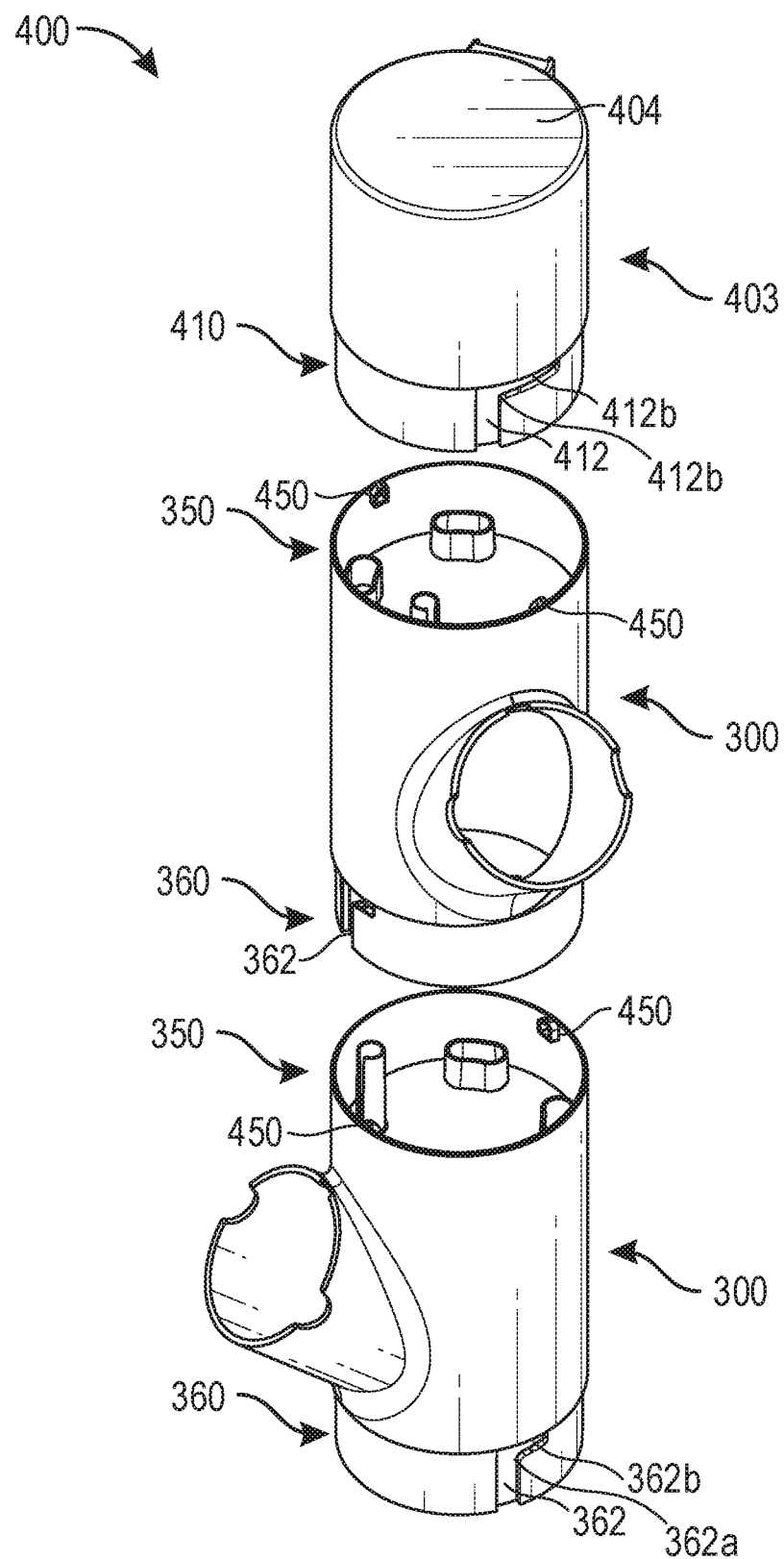
FIG. 4 illustrates an exploded perspective view of an example planting system that includes a cap and a plurality of modules.

FIG. 4 illustrates an exploded perspective view of an example planting system 400 that includes a cap 403 and a plurality of modules 300. For purposes of describing FIG. 4, the upper module 300 of FIG. 4 is generally referred to as the first module 300, the lower module 300 of FIG. 4 is generally referred to as the second module 300, and the term "module" broadly refers to any module, which can include the first module 300 or the second module 300. It will be understood that FIG. 4 represents an example planting system 400 and other embodiments may use different, fewer, or additional components or arrangements. For example, fewer or additions modules can be added, as desired.

The cap 403 includes a covered or sealed top 404 and a lower engagement portion 410. In the illustrated example, the lower engagement portion 410 includes a narrow body (relative to the body of the upper engagement portion 350 of the module 300) and further includes slots 412. In other examples, the lower engagement portion includes a wider body (e.g., relative to the body of the upper engagement portion 350 of the module 300) and further includes slots 412. Where one body is wider than the other, the wider body will fit over the narrower body to aid in engagement of two components.

In some configurations, as shown, the module 300 includes a lower engagement portion 360 and an upper engagement portion 350. In some implementations, the engagement portions 256, 350, 360, or 410 simply refer to connection points between modules 300, caps 403, and/or the base connector 256. For example, in some examples, the engagement portions 256, 350, 360, or 410 simply involve a wider body and a narrower body without other features that facilitate connection between the components. In such an embodiment, gravity may be used to hold the modules 300, caps 403, or the base connectors 256 together. In other configurations, as disclosed elsewhere herein, engagement and/or locking features can be employed on the engagement portions 256, 350, 360, or 410. For example, modules 300, caps 403, and/or the base connector 256 may be connected together via coinciding coupling features on (e.g., a snap fit pairing, a living hinge and coinciding lip, an interference fit pairing, a hook and loop fastener, a protrusion and slot, a clip, a clamp, a clasp, a buckle, a button, a hook and protrusion, a screw and aperture, a wire, etc.). In some cases, more than one coupling feature can be used. In some configurations, as disclosed elsewhere herein, the modules, caps, and/or the base may include coinciding engagement portions so that the modules 300, caps 403, and/or the base connector 256 can be mixed and matched. For example, the lower engagement portion 360 of the modules 300 and the lower engagement portion 410 of the caps 403 may both be configured to interact with an upper engagement portion 350 of a module 300 or a base connector 256. In some implementations, the lower engagement portion 360 of the modules 300 and the lower engagement portion 410 of the caps 403 may be identical to each other while the an upper engagement portion 350 of the modules 300 and base connectors 256 may be identical.

In some cases, as disclosed elsewhere herein, any number of modules 300 can be stacked or coupled together in an end-to-end configuration by coupling lower engagement portions 360 to upper engagement portions 350. In the illustrated example, the lower engagement portion 360 includes a narrow body (relative to the body of the upper engagement portion 350 of the module 300) and further includes slots 362. In some configurations, as shown, the slot may include an elbow 362a and an elbow track 362b such that the modules 300 can be rotationally turned to further secure them in place. In some configurations, the angle of the turn after the elbow is reached to secure the modules is equal to or at least about: 1°, 2.5°, 5°, 10°, 15°, 20°, 25° or ranges including and/or spanning the aforementioned values. In some configurations, these slots, elbows, and protrusions may also be found on caps 403 or base connectors 256. Furthermore, in the illustrated example, the upper engagement portion 350 includes a broader or wider body (relative to the body of the lower engagement portions 360, 410) that forms a socket and further includes protrusions 314.

In some implementations, as disclosed elsewhere herein and as shown in FIG. 4, the lower engagement portion 410 of the cap 403 is configured to engage with the upper engagement portion 350 of the first module 300. As shown, the cap 403 may include a slot 412 and/or a slot 412 with an elbow 412a and an elbow track 412b. Furthermore, the lower engagement portion 360 of the first module 300 is configured to engage with the upper engagement portion 350 of the second module 300. In this way, when engaged, the cap 403, the first module 300, and the second module 300 form a column, such that the first module 300 is positioned below the cap 403 and above the second module 300. Put another way, when engaged, the second module 300 is positioned below the cap 403 and the first module 300.

In the illustrated example of FIG. 4, to join the cap 403 and the first module 300, the protrusions 450 of the first module 300 engage the slots 312 in the cap 403 as the lower engagement portion 410 of the cap 403 is pushed into the socket of the upper engagement portion 350 of the first module 300. Further, in this example, turning either the cap 403 or the first module 300 can lock the protrusions 450 into position, while turning the cap 403 or the first module 300 in an opposite direction allows the cap 403 and the first module 300 to be pulled apart.

Furthermore, in the illustrated example of FIG. 4, to join the first module 300 and the second module 300, the protrusions 450 of the second module 300 engage the slots 362 of the first module 300 as the lower engagement portion 360 of the first module 300 is pushed into the socket of the upper engagement portion 350 of the second module 300. Further, in this example, turning either the first module 300 or the second module 300 can lock the protrusions 450 into position, while turning the first module 300 or the second module 300 in an opposite direction allows the first module 300 or the second module 300 to be pulled apart.

It will be understood that the lower engagement portion 360 of the cap 403, the upper engagement portion 350 of the module 300, and the lower engagement portion 360 of the module 300 can vary across embodiments. For example, although the protrusions 450 are illustrated as being located on an interior wall of the upper engagement portion 350, in some cases, the protrusions 450 are located on an exterior wall of the upper engagement portion 350. As a corollary and as disclosed elsewhere herein, although the slots 412 and 362 are illustrated as being located on an interior wall of the lower engagement portions 360, 410, in some cases, the slots 412 are located on an interior wall of the upper engagement portion 350.

Furthermore, as disclosed elsewhere herein, in some cases, the configuration of the upper engagement portion 350 of the module 300 is switched with the configuration of the lower engagement portion 360 of the module 300 or the configuration of the lower engagement portion 410 of the cap 403. For example, the upper engagement portion 350 can include a narrow body (relative to the body of the lower engagement portion 360 of the module) and can further include slots. Furthermore, the lower engagement portion 360 can include a broader or wider body (relative to the body of the upper engagement portion 450) that forms a socket and further includes protrusions.

Furthermore, in some cases, the engagement portions 350, 360, 410, or 256 can form any part of a twist and lock connection. As another example, any of the engagement portions 350, 360, 410, or 256 can be configured to mate or lock together without requiring a twist. For instance, any one or more of the engagement portions 350, 360, 410, or 256 can include a hook and loop fastener, a clamp, a clasp, a buckle, a button, or a hook. As another example, any one or more of the engagement portions 350, 360, 410, or 256 can include a cavity, aperture, or groove configured to receive a protrusion, or can include the protrusion.

Further still, in some cases, the cap 403 is integrated with a module 300 such that no coupling is required. In addition or alternatively, in some cases, two or more modules 300 are integrated together such that no coupling is required. In some cases, the lower engagement portion 360 of the module 300 and/or the lower engagement portion 410 of the cap 403 can be configured to be wedged into the upper engagement portion 350 of the module 300. In some cases, the upper engagement portion 350 of the module 300 can be configured to be wedged into at least one of the lower engagement portion 360 of the module or the lower engagement portion 410 of the cap 403.

In some cases, the plant-growing system 100 can develop algae or microbes if light is exposed to the fluid therein. In some cases, the cap 403 can engage with a module 300, or a module 300 can engage with another module 300, so as to create a seal that is impermeable to light. For example, in some cases, the connecting region between the module 300 and the cap 403 or the module 300 and another module 300 includes no gaps or holes that could permit light to enter the plant-growing system 100. In several implementations, the components of the system are opaque and/or otherwise block light passage (e.g., they substantially block or block the passage of wavelengths of light emitted by the light source 904).

It will be appreciated that similar engagement portions can be utilized throughout the plant-growing system 100. For example, in some cases, the fluid storage and distribution system 200 can include one or more engagement portions similar to those described elsewhere herein. For example, in some cases, the fluid storage and distribution system 200 can be configured to couple to a module 300. For instance, the lid of the fluid storage and distribution system 200 can include an aperture through which the lower engagement portion 360 of the module 300 can be received. In addition or alternatively, the lid of the fluid storage and distribution system 200 can include an upper engagement portion configured to engage with the lower engagement portion 360 of the module 300.

Example Plant-Growing Container

Figure 5A:
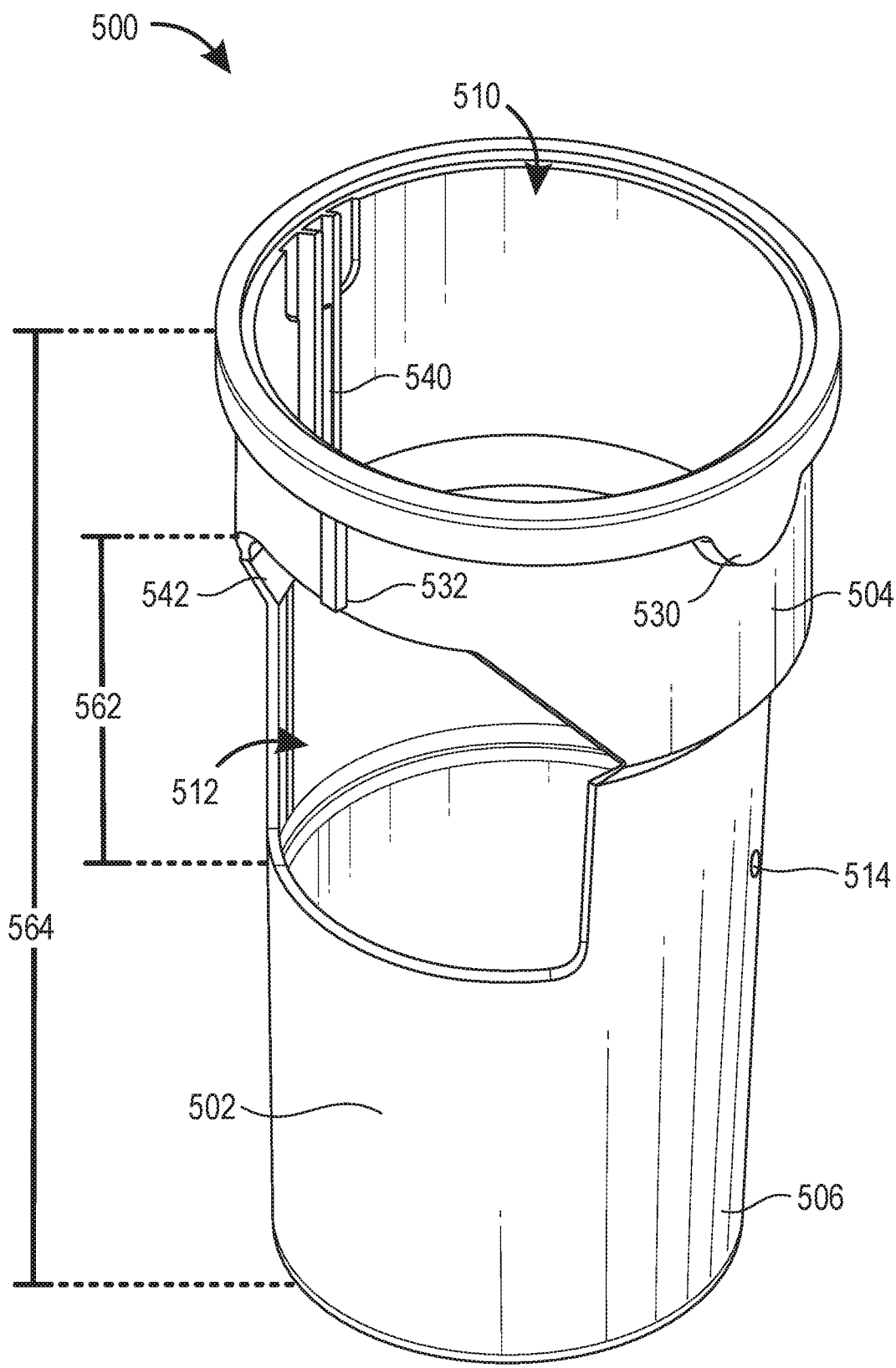
FIGS. 5A-5C illustrate perspective, side, and top views, respectively, of an example plant-growing container.
Figure 5B:
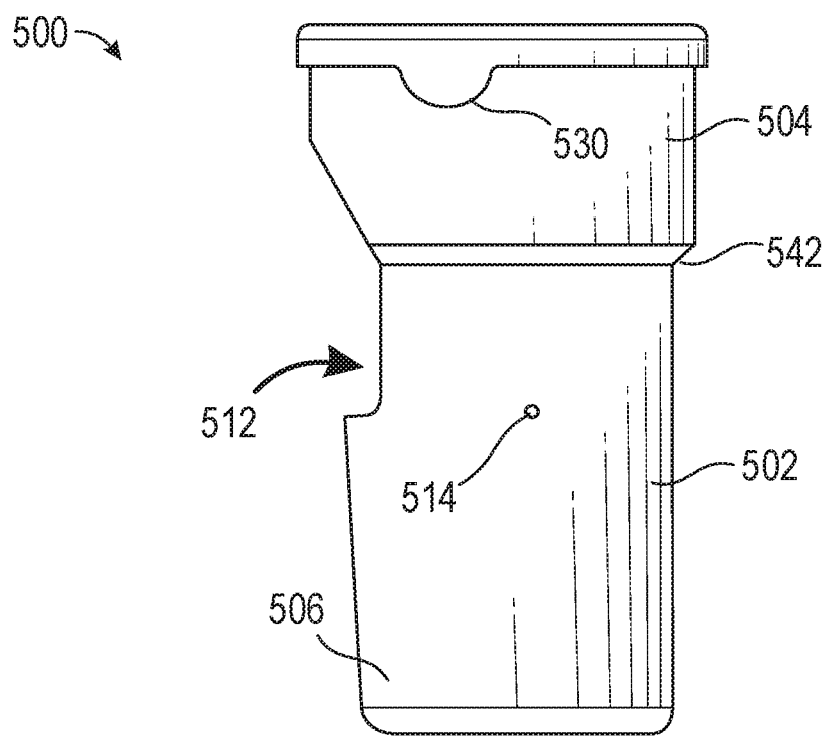
Figure 5C:
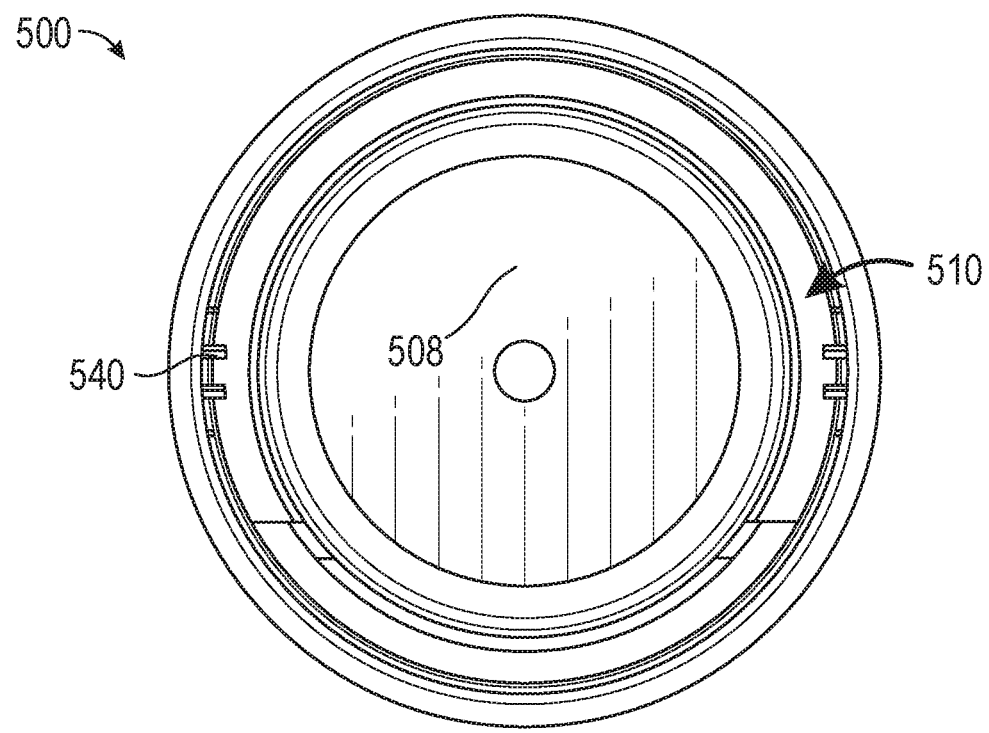

FIGS. 5A-5C illustrate perspective, side, and top views of an example plant-growing container 500. As described elsewhere herein, a plant-growing container 500 can be configured to couple or engage with a module 300. Furthermore, a plant-growing container 500 can be configured to couple or engage with a seed receptacle 600. It will be understood that FIGS. 5A-5C represent an example plant-growing container and other embodiments may include different features or configurations.

The plant-growing container 500 can include a wall 502, which can include one or more walls. The wall 502 can include an upper portion 504 and a lower portion 506. In some cases, the wall 502 can define or form a largely hollow space 508 within the plant-growing container 500. In the illustrated implementation, the plant-growing container 500 is relatively cylindrical. However, it will be appreciated that the shape of the plant-growing container 500 can vary across embodiments. For example, the plant-growing container 500 can be relatively cylindrical, rectangular, triangular, spherical, conical, or helical in shape. As another example, the plant-growing container 500 can have a shape that is similar to a prism, such as a regular prism, an irregular prism, a right prism, an oblique prism, a parallelepipeds, a cuboid, a triangular prism, a rectangular prism, a pentagonal prism, a hexagonal prism, or the like. Further still, in some cases, the plant-growing container 500 can have a zig-zag or wavy shape. In some cases, the shape of the plant-growing container 500 is complementary to an interior shape of an orifice of a module (for example, orifice 306 of the module 300 of FIGS. 3A-3C) or a port 308 of the module. In some cases, the shape of the plant-growing container 500 is complementary to an exterior shape of a seed receptacle 600 (for example, seed receptacle 600 of FIGS. 6A-6C).

The plant-growing container 500 can include an orifice 510. In some cases, the plant-growing container 500 is configured to receive a seed receptacle 600 though the orifice 510. In some cases, the orifice 510 can be created or formed by the wall 502, such as by the upper portion 504 of the wall 502. The shape of the orifice 510 can vary across embodiments. For example, although illustrated as relatively circular, the orifice 510 can be relatively rectangular, triangular, or square in shape or have the shape of a polygon. As another example, the orifice 510 can have a shape of a leaf or a flower. In some cases, the orifice 510 can have a symmetrical shape, while in other cases the orifice 510 can have a non-symmetrical shape. In some cases, the shape of the orifice 510 is complementary to at least one of an exterior shape of the plant-growing container 500 or an exterior shape of an exterior shape of seed receptacle 600. In some cases, the shape of the orifice 510 is different from the shape of an exterior of the plant-growing container 500.

The plant-growing container 500 can include a reservoir therein, which can be configured to hold fluid. As described with respect to FIGS. 5D and 5E, the size or location of the reservoir can vary based on an orientation of the plant-growing container 500. For example, FIG. 5D illustrates a perspective view of an example of an upright plant-growing container 500 and FIG. 5E illustrates a cross sectional side view of an example of an angled plant-growing container 500. As illustrated by FIG. 5D, when upright, the plant-growing container 500 includes a first reservoir 520 (e.g., indicated by the location of the fluid in the plant-growing container 500). Furthermore, as illustrated by FIG. 5E, when angled, the plant-growing container 500 includes a second reservoir 522 (e.g., indicated by the location of the fluid in the plant-growing container 500). Notably, the position and/or volume of the reservoirs 520 and 522 can be different. In some examples, the volume of the reservoir 520 is smaller than the volume of the reservoir 522. In some examples, the volume of the reservoir 520 is equal to the volume of the reservoir 522. In some examples, the volume of the reservoir 520 is greater than the volume of the reservoir 522. In some configurations, the ratio of the volume of the reservoir 520 to the volume of the reservoir 522 can be about: 4:1, 3:1, 2:1, 3:2, 5:4, 1:1, 4:5, 2:3, 1:2, 1:3, 1:4, ratios between the aforementioned ratios, or otherwise. In some examples, the length 562 (e.g., as noted in FIG. 5A) of the aperture 512 is smaller than the length 564 (e.g., as noted in FIG. 5A) of the plant-growing container 500. For example, the length 562 of the aperture 512 can span greater than or equal to half of the length 564 of the plant-growing container 500. As another example, the length 562 of the aperture 512 can span greater less than or equal a third of the length 564 of the plant-growing container 500. In some configurations, the ratio of the length 562 of the aperture 512 to the length 564 of the plant-growing container 500 can be about: 4:5, 3:4, 5:7, 2:3, 4:7, 1:2, 1:3, 1:4, ratios between the aforementioned ratios, or otherwise.

Referring again to FIGS. 5A-5C, the plant-growing container 500 can include an aperture 512. In some cases, the plant-growing container 500 is configured to receive fluid though the aperture 512 (e.g., when the plant-growing container 500 is coupled to a module 300). For example, as described elsewhere herein, the plant-growing container 500 can be coupled to (for example, inserted in) a module 300. The module 300 can receive fluid, and the fluid can be passed or funneled to the plant-growing container 500 through the aperture 512. For example, referring back to FIG. 3A, in some cases, when the plant-growing container 500 is coupled with the module 300, the aperture 512 of the plant-growing container 500 is substantially aligned with the aperture 312 of the module 300 such that at least some (or substantially all) of the fluid flowing through the aperture 312 of the module 300 is received by the plant-growing container 500 through to the aperture 512. In some examples, the opening of the aperture 512 is smaller than the opening of the orifice 510. In some configurations, the ratio of the area of the aperture to the orifice can be about: 1:1, 3:4, 3:5, 1:2, 1:4, ratios between the aforementioned ratios, or otherwise.

In some cases, the aperture 512 is an overflow hole. For example, as described, fluid can enter the plant-growing container 500 through the aperture 512 and can be received by the reservoir 522. Over a period of time, the reservoir of the plant-growing container 500 can fill with the fluid. The aperture 512 can allow at least some fluid to escape the plant-growing container 500 when the reservoir 522 fills to a first threshold level (e.g., first threshold level 582 as shown in FIG. 5E). In some cases, the amount of fluid that resides in the reservoir 522 when the reservoir 522 is filled to the first threshold level 582 is referred to as the first volume of fluid. For example, in some cases, the plant-growing container 500 includes a bulk volume of fluid, for instance that that can be distributed elsewhere throughout the plant-growing system 100. In some cases, for example when the fluid in the reservoir 522 is filled to the first threshold level 582, the aperture 512 can both allow fluid to enter the plant-growing container 500 and allow fluid to escape the plant-growing container 500.

In some cases, the plant-growing container 500 can include a second aperture 514, which can include one or more apertures. As illustrated in FIG. 5A, in some cases, the second aperture 514 is level with a bottom of the aperture 512. However, it will be understood that the second aperture 514 can be positioned in any location on the plant-growing container 500. In some cases, fluid can exit the plant-growing container 500 through the second aperture 514. For example, when angled (e.g., as shown in FIG. 5A), the second aperture 514 can be lower than the bottom of the aperture 512. Over a period of time, the reservoir 522 of the plant-growing container 500 can fill with the fluid. The aperture 514 can allow at least some fluid to escape the plant-growing container 500 when the reservoir 522 fills to a second threshold level (e.g., second threshold level 584 as shown in FIG. 5E). In some cases, the amount of fluid that resides in the reservoir 522 when the reservoir 522 is filled to the second threshold level 584 is referred to as a second volume of fluid. In some cases, the second volume of liquid is less than the first volume of liquid (e.g., associated with the first threshold level 582). In some cases, for example when the fluid in the reservoir 522 is filled to the second threshold level 584, the aperture 514 can allow fluid to escape the plant-growing container 500. In some cases, the fluid enters the plant-growing container 500 (e.g., through the aperture 512) at a higher rate than the fluid exits the second aperture 514. In this way, in some cases, the fluid level in the plant-growing container 500 can rise above the second aperture (e.g., above second threshold level 584). Over time (e.g., after the fluid supply is shut off), the second aperture 514 can allow fluid to exit the plant-growing container 500 until the fluid reduces to the second threshold level 584. In this way, for at least a period of time, the fluid in the plant-growing container 500 can rise above the second aperture 514, which can allow for increase fluid transfer to a plant included in the plant-growing container 500. Furthermore, by reducing the level of fluid to the second threshold level 584 (e.g., rather than retaining the level of fluid at the first threshold level 582 corresponding to the aperture 512), the plant-growing container 500 can reduce a likelihood that fluid spills out of the plant-growing container 500 when the plant-growing container 500 is removed from the module 300. In some cases, the location and/or size of the second aperture 514 influences the current created by the second aperture 514. For example, in some cases, the second aperture does not create a current (or does not create a substantial current) in the plant-growing system 100. In some configurations, the size of the aperture 514 to the size of the aperture 512 can be about: 1:1000, 1:500, 1:250, 1:100, 1:50, 1:25, ratios between the aforementioned ratios, or otherwise.

The size, shape, or dimensions of the aperture 512 can vary across embodiments. In some cases, the size, shape, or dimensions of the aperture 512 can be based on the size, shape, or dimensions of the plant-growing container 500. In some cases, the length of the aperture 512 is approximately equal to the width of the aperture 512. In some cases, the surface area of the aperture 512 (with respect to the surface of the plant-growing container 500) is between 1500 mm$^2$ and 2000 mm$^2$. In some cases, the surface area of the aperture 512 is equal to about 5%, 10%, 15%, 20%, or 25% of the surface area of plant-growing container 500. In some cases, the size of the aperture 512 is similar to the size of the orifice 510 (for example, 75%-125% of the size of the orifice 510). It will be understood that the size, shape, or dimensions of the aperture 512 can vary across embodiments, as described.

The location of the aperture 512 on the plant-growing container 500 can vary across embodiments. In some cases, the size of the reservoir 522 is based on the location of the aperture 512. For example, as described elsewhere herein, the aperture 512 can be an overflow hole allows fluid to escape the plant-growing container 500 when the reservoir 522 is filled to a threshold level. Thus, in some cases, the aperture 512 is located on the plant-growing container 500 so as to allow for sufficient size of the reservoir 522.

Figure 5F:
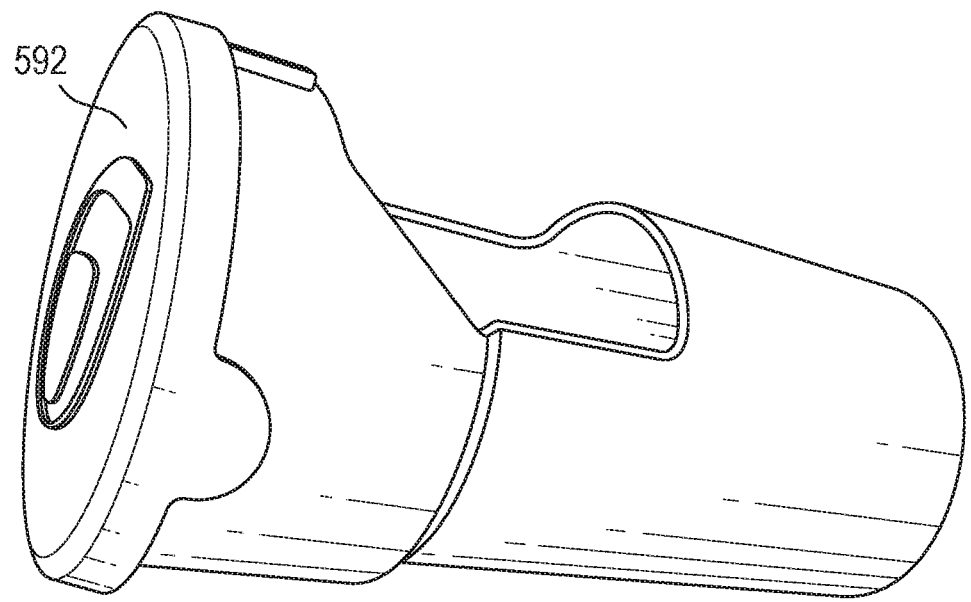
FIGS. 5F-5H illustrate various view of an example cap for a plant-growing container.
Figure 5G:
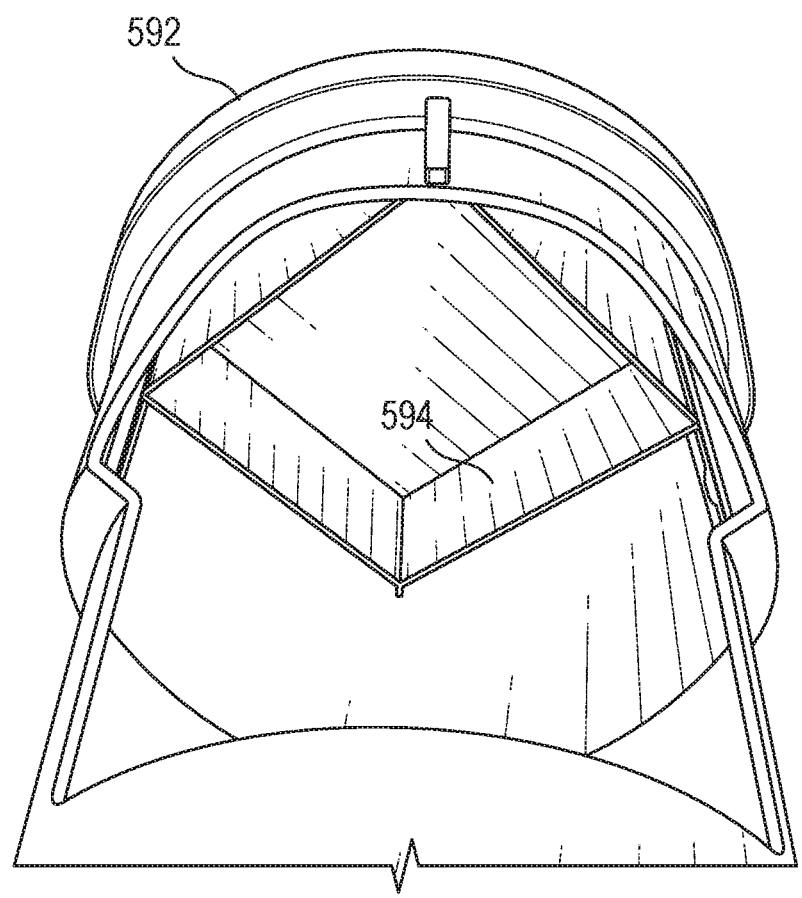
Figure 5H:
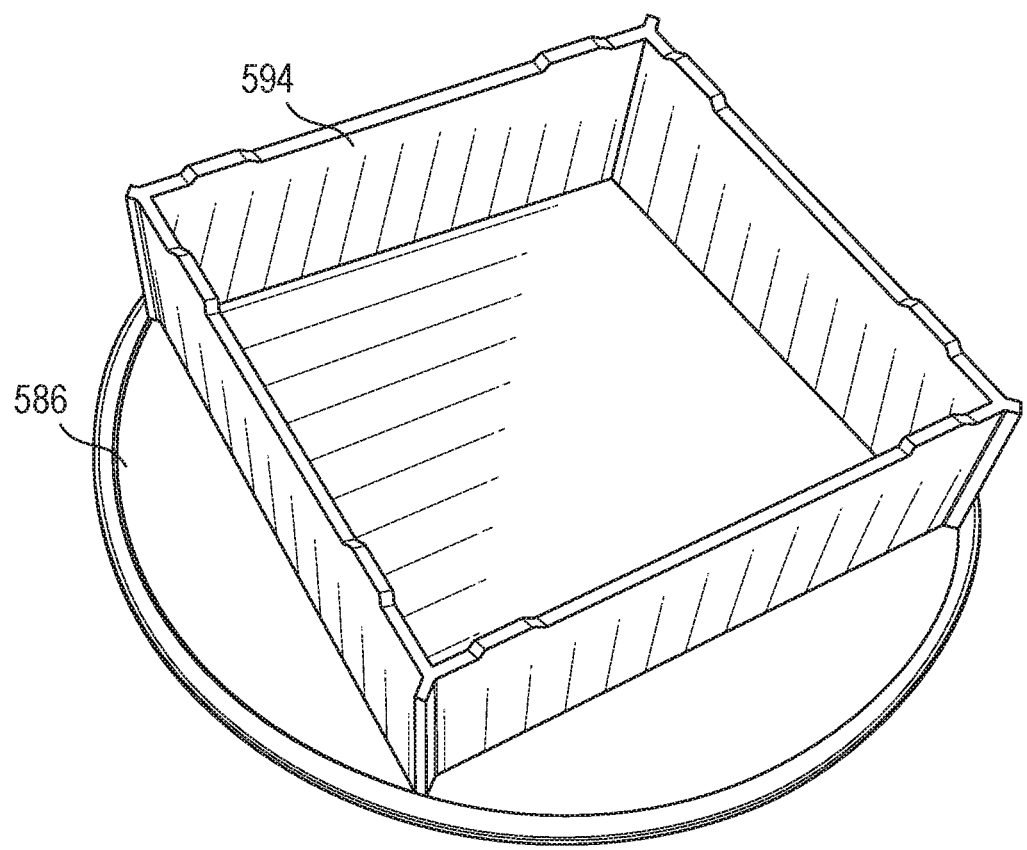

FIGS. 5F-5H illustrate various view of an example cap 592 for a plant-growing container 500. In some implementations, for example, where a plant-growing container 500 is provided or inserted into a module 300 but does not include a plant medium, a cap 592 can be used to plug (e.g., cover, block, etc.) the orifice 510 of the plant-growing container 500 (e.g., to prevent access to the plant-growing container 500, to prevent light from entering the planting system 100, to prevent liquid from exiting the planting system 100, or the like). As illustrated, the cap 592 can include an engagement portion 594, which can engage with the orifice 510 of the plant-growing container 500. Furthermore, the cap 592 can include a plate 586 to cover or seal the orifice 510 of the plant-growing container 500. It will be understood that the engagement portion 594 of the cap 592 can vary across embodiments. For example, in some configurations, as disclosed elsewhere herein, cap 592 and the plant-growing container 500 may include any coinciding engagement portions so that the cap 592 can cover at least a portion of the orifice of the plant-growing container.

Example Seed Receptacle

Figure 6A:
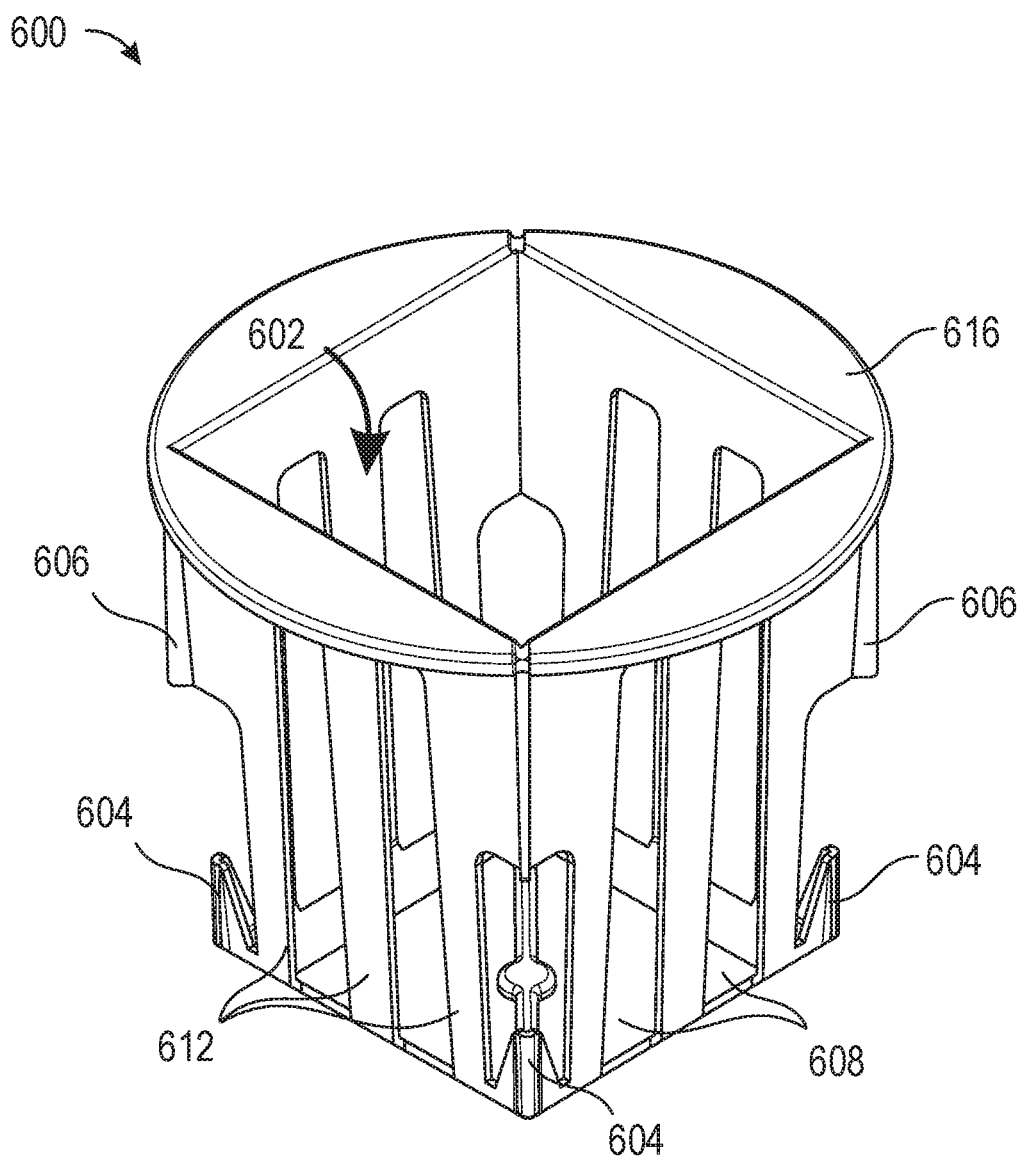
FIGS. 6A-6C illustrate perspective, side, and top views, respectively, of an example seed receptacle.
Figure 6B:
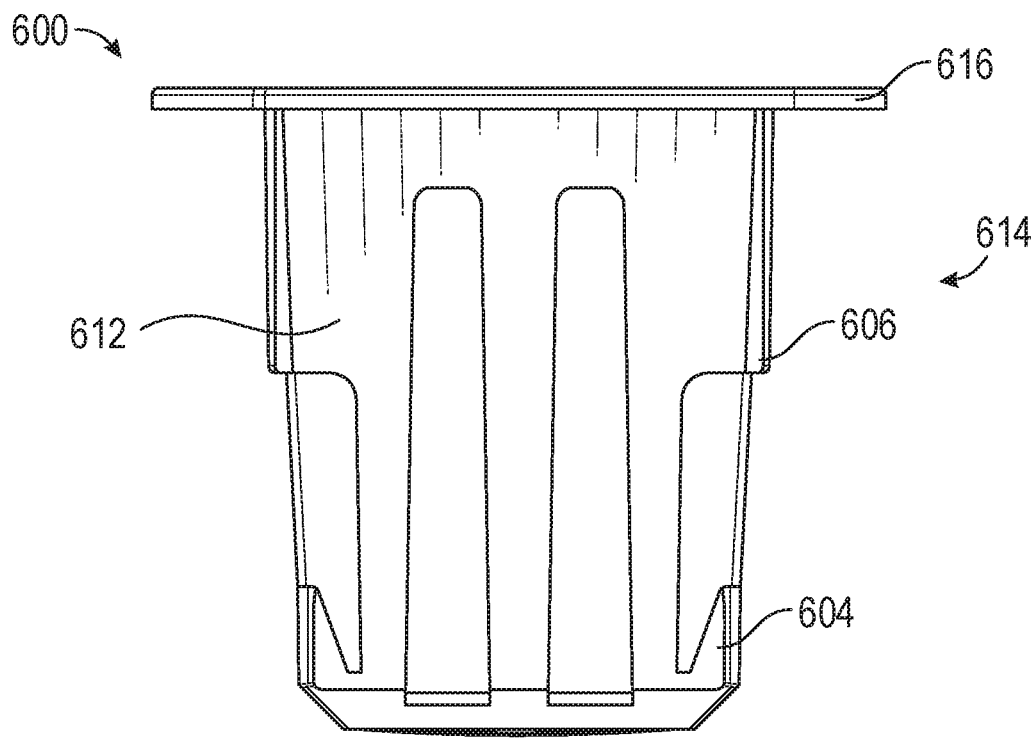
Figure 6C:
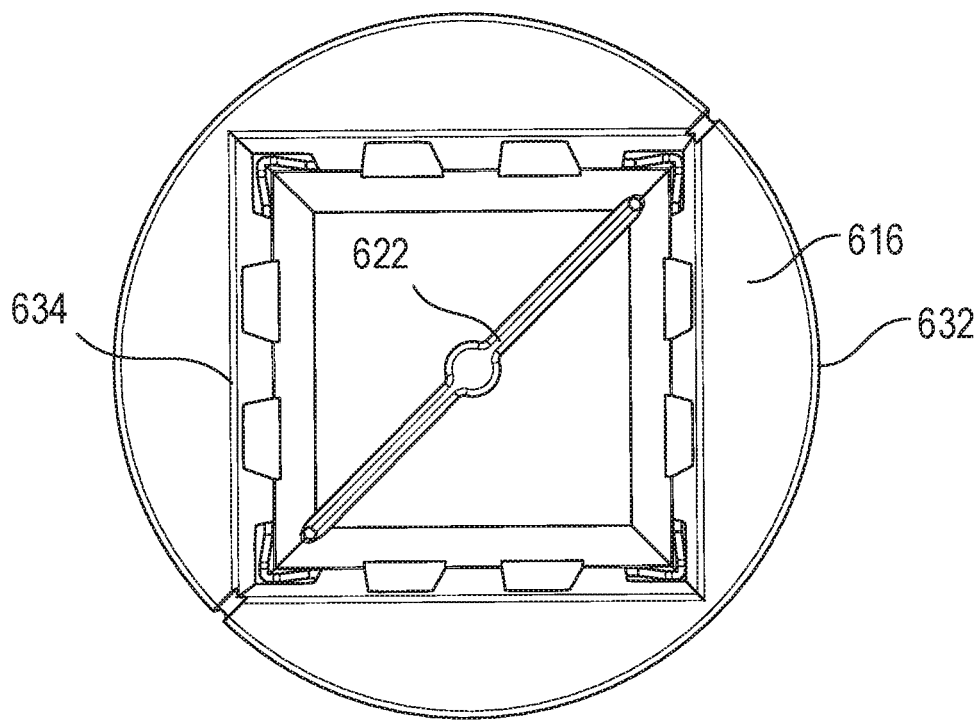

FIGS. 6A-6C illustrate perspective, side, and top views, respectively, of an example seed receptacle 600. As described elsewhere herein, a seed receptacle 600 can be configured to couple or engage with a plant-growing container, such as the plant-growing container 500 of FIGS. 5A-5E. Furthermore, a seed receptacle 600 can be configured to store a plant medium. It will be understood that FIGS. 6A-6C represent an example seed receptacle and other embodiments may include different features or configurations.

The seed receptacle 600 can include a wall 612, which can include one or more walls. The wall 612 can define or form a cavity 602 within the seed receptacle 600. In some cases, the seed receptacle 600 can be configured to receive and/or store a plant medium (not shown) in the cavity 602. In the illustrated embodiments of FIGS. 6A-6C, the wall 612 of the seed receptacle 600 forms the general shape of a rectangular prism. However, it will be appreciated that the shape of the seed receptacle 600, formed by the wall 612, can vary across embodiments. For example, the seed receptacle 600 can be relatively cylindrical, rectangular, triangular, spherical, conical, or helical in shape. As another example, the seed receptacle 600 can have a shape that is similar to a prism, such as a regular prism, an irregular prism, a right prism, an oblique prism, a parallelepipeds, a cuboid, a triangular prism, a rectangular prism, a pentagonal prism, a hexagonal prism, or the like. Further still, in some cases, the seed receptacle 600 can have a zig-zag or wavy shape. In some cases, the shape of the seed receptacle 600 is complementary to an interior shape of an orifice 510 of a plant-growing container 500. In some cases, the shape of the seed receptacle 600 is complementary to an interior shape of an orifice 306 of a module 300.

The wall 612 can be porous. For example, in some cases, one or more portions of the wall 612 can include one or more slots or holes 608, through which fluid may pass or roots of a plant may grow. In some cases, the wall 612 can be implemented as one or more wall sections having gaps in between the wall sections. In some cases, the wall 612 is relatively permeable, such that fluid can penetrate the wall 612.

The seed receptacle 600 can include a member 622 coupled to the bottom of the wall 612. In some cases, the member 622 forms the bottom of the seed receptacle 600. In some cases, the member 622 is porous. For example the member 622 can include one or more slots or holes through which fluid may pass or roots of a plant may grow. In some cases, the wall 612 can be implemented as one or more wall sections having gaps in between the wall sections. In some cases, the member 622 is relatively permeable, such that fluid can penetrate the wall 612.

For ease of reference, in some cases, the portion of the seed receptacle 600 that includes the wall 612 can be referred to as the lower portion 614 of the seed receptacle 600. In some cases, the seed receptacle 600 can include an upper portion 616 coupled to the lower portion 614. For example, in some cases, the upper portion 616 is coupled to, or positioned at, the tops of the wall 612. In some cases, the upper portion 616 can be relatively thin or flat. However, the size, dimensions, thickness, etc. of the upper portion 616 can vary across embodiments. In the illustrated embodiments of FIGS. 6A-6C, the upper portion 616 includes flaps or a plate.

Specifically referring to FIG. 6C, which illustrates a top view of an example seed receptacle 600, the upper portion 616 can include an exterior shape 632 and an interior shape 634. In some cases, the exterior shape 632 corresponds to the shape of the exterior or outer surface of the upper portion 616 from a top-view perspective. In some cases, the interior shape 634 corresponds to a shape formed by the wall 612 from a top-view perspective.

In the illustrated embodiments of FIGS. 6A-6C, the exterior shape 632 of the upper portion 616 is a circle. However, it will be appreciated that exterior shape 632 of the upper portion 616 can vary across embodiments. For example, the exterior shape 632 can be a triangle, square, rectangle, circle, semi-circle, oval, parallelogram, rhombus, trapezoid, star, heart, crescent, cross, flower, or leaf. In some cases, the exterior shape 632 can have the shape of a polygon, can have a symmetrical shape, or can have a non-symmetrical shape. In some cases, the shape of the exterior shape 632 is complementary to the interior shape 634 of the upper portion 616. In some cases, the shape of the exterior shape 632 is complementary to the shape of the orifice 510 of the plant-growing container 500.

In the illustrated embodiments of FIGS. 6A-6C, the interior shape 634 of the upper portion 616 is a square. However, it will be appreciated that interior shape 634 of the upper portion 616 can vary across embodiments. For example, the interior shape 634 can be a triangle, square, rectangle, circle, semi-circle, oval, parallelogram, rhombus, trapezoid, star, heart, crescent, cross, flower, or leaf. In some cases, the interior shape 634 can have the shape of a polygon, can have a symmetrical shape, or can have a non-symmetrical shape. In some cases, the shape of the interior shape 634 is complementary to the exterior shape 632 of the upper portion 616. In some cases, the shape of the interior shape 634 is complementary to the shape of the orifice 510 of the plant-growing container 500.

In some cases, the seed receptacle 600 (or the plant medium configured to be inserted into the seed receptacle 600) can include an identifier (not shown). The identifier can vary across embodiments. In some cases, the identifier can include a unique identifier associated with the seed receptacle 600. For example, the unique identifier can indicate a time or date that a plant was planted. As another example, the unique identifier can indicate to whom the seed receptacle 600 belongs. In some cases, the identifier can include plant information regarding the plant in which the seed receptacle 600 (or the plant medium containers). For example, the plant information can include a type of plant (e.g., arugula, lettuce, kale, mustard, spinach, tatsoi, basil, chives, cilantro, dill, mint, oregano, sage, thyme, beans, tomatoes, cucumbers, peas, peppers, strawberries, calibrachoa, campanula, lavender, morning glory, nasturtium, petunia, torenia, viola, etc.), a unique identifier associated with the plant, or the like. In some cases, the identifier can allow the seed receptacle 600 to be traced. For example, seed receptacle 600 can be associated with a unique identifier. In some cases, the plant-growing system 100 can be configured to verify a unique identifier of the seed receptacle 600 before the seed receptacle 600 is utilized in the plant-growing system 100. For example, in some cases, if the seed receptacle 600 is not associated with an expected unique identifier, then the plant-growing system 100 can cause an error code, stall or pause the plant-growing system 100, or otherwise be incompatible with the seed receptacle 600. In some cases, the identifier can include at least one of a label, a bar code, a QR code, near-field communication (NFC) tag, or a radio-frequency identification (RFID) tag.

Example Engagements Between Modules, Plant-growing Containers, and/or Seed Receptacles FIG. 7 illustrates an exploded perspective view of an example module 300, plant-growing container 500, and seed receptacle 600. In the illustrated embodiment, the seed receptacle 600 is configured to engage with the plant-growing container 500, and the plant-growing container 500 is configured to engage with the module 300. It will be understood that FIG. 7 represents an example module 300, an example plant-growing container 500, and an example seed receptacle 600 and other embodiments may use different, fewer, or additional components or arrangements. For example, in some cases, a module is integrated with a plant-growing container such that no coupling is required (e.g., as illustrated in FIGS. 8J and 8K). As another example, in some cases, a seed receptacle is integrated with a plant-growing container such that no coupling is required (e.g., as illustrated in FIGS. 8D-8I).

Modules 300, plant-growing containers 500, and/or seed receptacles 600 can include engagement portions to engage with each other. It will be understood that the engagement portions of the modules, plant-growing containers, and seed receptacles can vary across embodiments. For example, modules 300, plant-growing containers 500, and/or seed receptacles 600 may be connected together via coinciding coupling features (e.g., a snap fit pairing, a living hinge and coinciding lip, an interference fit pairing, a hook and loop fastener, a protrusion and slot, a clip, a clamp, a clasp, a buckle, a button, a hook and protrusion, a screw and aperture, a wire, etc.). In some cases, more than one coupling feature can be used.

The seed receptacle 600 can include one or more engagement portions, such as a lower engagement portion 604 and an upper engagement portion 606. In the illustrated example of FIGS. 6A and 7, the lower engagement portion 604 of the seed receptacle 600 includes a plurality of clips forming exterior edges or corners of a lower upper section of the lower portion 614 of the seed receptacle 600. Moreover, in the illustrated example, the lower portion 614 of the seed receptacle 600 is relatively narrow so that it can fit inside the orifice 510 of the plant-growing container 500. Furthermore, in the illustrated examples of FIGS. 6A and 7, the upper engagement portion 606 of the seed receptacle 600 includes a plurality of ridges forming exterior edges or corners of an upper section of the lower portion 614 of the seed receptacle 600. In this example, the plurality of ridges taper as that extend closes to the upper portion 616 of the seed receptacle 600.

The plant-growing container 500 can include one or more engagement portions 524, 542, 530, or 532. For example, the plant-growing container 500 can include one or more engagement portions for engaging with the seed receptacle 600, such as engagement portions 524, 542, 530, or 532 illustrated in FIG. 5A, or engagement portion 534 illustrated in FIGS. 5D and 7. In the illustrated example of FIG. 5A and as disclosed elsewhere herein, the engagement portions 524, 542, 530, or 532 of the plant-growing container 500 may include a plurality of ridges, tracks, or apertures, on the interior or exterior of the upper portion 504 of the plant-growing container 500.

Furthermore, in some cases, the plant-growing container 500 can include a narrow body (relative to the body of the port 308 of the module) and can further include slots. Furthermore, the plant-growing container 500 can include a broader or wider body (relative to the body of the port 308 of the module that forms a socket and further includes protrusions. Furthermore, in some cases, engagement portions 524, 542, 530, or 532 of the plant-growing container 500 can form any part of a twist and lock connection. As another example, engagement portions 524, 542, 530, or 532 of the plant-growing container 500 can be configured to mate or lock together with the seed receptacle 600 of the module 300 without requiring a twist. For instance, any one or more of the engagement portions 524, 542, 530, or 532 can include a hook and loop fastener, a clamp, a clasp, a buckle, a button, or a hook. As another example, any one or more of the engagement portions 524, 542, 530, or 532 can include a cavity, aperture, or groove configured to receive a protrusion, or can include the protrusion. In the illustrated example of FIGS. 5D and 7, the engagement portion 524 of the plant-growing container 500 includes a plurality of apertures extending through a side of the wall 502.

Further, the engagement portion 542 of the plant-growing container 500 may include a beveled portion that transitions the plant-growing container 500 from having a wider section to narrow section. In some configurations, as shown in FIG. 5A, an internal diameter of plant-growing container 500 narrows towards the bottom of the plant-growing container 500. However, in some cases, the internal diameter of plant-growing container 500 remains the same along the plant-growing container 500, such that the orifice 510 has substantially the same internal diameter as the bottom of the plant-growing container 500. In some embodiments, the internal diameter of the orifice 510 is larger than the internal diameter of a middle portion and/or bottom portion of the plant-growing container 500, for example such that the plant-growing container 500 has a partially conical shape and/or narrows proceeding toward the bottom of the plant-growing container 500. For example, the ratio of the orifice 510 to the middle portion and/or bottom portion can be about: 4:1, 3:1, 2:1, 7:4, 3:2, 7:5, 4:3, 1:1, 3:4, 5:7, 2:3, 4:7, 1:2, 1:3, 1:4, ratios between the aforementioned ratios, or otherwise. In some implementations, this feature may aid in securing the plant-growing container 500 to the seed receptacle 600 or the module 300.

In the illustrated example of FIG. 7, the seed receptacle 600 is configured to engage with the plant-growing container 500. For example, to join the seed receptacle 600 and the plant-growing container 500, the bottom of the lower portion 614 is inserted into the orifice 510 of the plant-growing container 500. As the seed receptacle 600 is pushed into the orifice 510, the upper engagement portion 606 (e.g., ridges) of the seed receptacle 600 engages the engagement portion 540 (e.g., tracks) of the plant-growing container 500. As the seed receptacle 600 is pushed further into the plant-growing container 500, the lower engagement member 604 (e.g., clips) are received and secured by the engagement portion 534 (e.g., apertures). Furthermore, as the seed receptacle 600 is pushed into the plant-growing container 500, the engagement portion 542 exerts an inward pressure on a portion of the seed receptacle 600. In this example, the engagement of the engagement portions of the seed receptacle 600 with the engagement portions of the plant-growing container 500 restricts rotational and/or lateral movement of the seed receptacle 600 within the orifice 510.

As another example, the plant-growing container 500 can include one or more engagement portions for engaging with the module 300, such as engagement portions 530 or 532 illustrated in FIG. 5A. In the illustrated example of FIG. 5A, the engagement portion 530 of the plant-growing container 500 includes curved protrusion on a rim of the upper portion 504 of the plant-growing container 500, and the engagement portion 532 of the plant-growing container 500 includes protrusion on the rim of the upper portion 504 of the plant-growing container 500.

The module 300 can include one or more engagement portions for engaging with a plant-growing container 500. For example, as illustrated in FIGS. 3A, the port 308 of the module 300 can include engagement portions 322 or 324. In this example, the engagement portions 322 and 324 of the module 300 include an aperture, cutout, or indention on an exterior edge of port 308 that forms the orifice 306.

In the illustrated example of FIG. 7, the plant-growing container 500 is configured to engage with the module 300. For example, to join the plant-growing container 500 and the module 300, the lower portion 506 of the plant-growing container 500 is inserted into the orifice 306 of the module 300. As the plant-growing container 500 is pushed into the orifice 306, the engagement portion 530 of the plant-growing container 500 fits into the engagement portion engagement portions 322. In this example, the engagement of the engagement portion 322 of the module 300 with the engagement portion 530 of the plant-growing container 500 restricts rotational and/or lateral movement of the plant-growing container 500 within the orifice 306. In some cases, as the plant-growing container 500 is pushed into the orifice 306, the engagement portion 532 (e.g., illustrated in FIG. 5A) of the plant-growing container 500 fits into the engagement portion 324 (e.g., illustrated in FIG. 3A) of the module 300. In some cases, the engagement of engagement portion 532 and the engagement portion 324 can sure proper orientation of the plant-growing container 500 within the module 300.

Combined

Figure 8A:
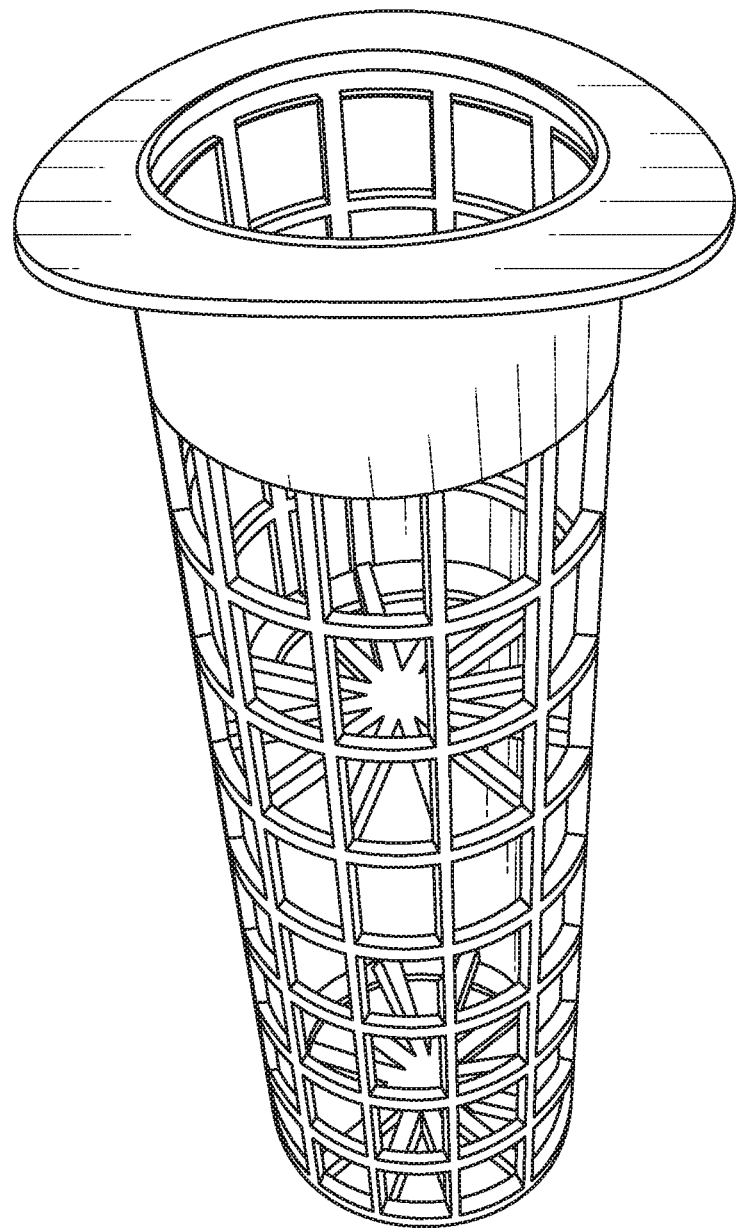
FIG. 8A illustrates a perspective view of an example seed receptacle.

FIG. 8A illustrates a perspective view of an example seed receptacle 810, which can be an embodiment of the seed receptacle 600 of FIG. 6A. In the illustrated embodiment, the seed receptacle 810 is configured to engage with the plant-growing container 500 and configured to receive/store a plant medium that includes a seed. It will be understood that FIG. 8A represents an example seed receptacle 810 and other embodiments may use different, fewer, or additional components or arrangements.

Figure 8B:
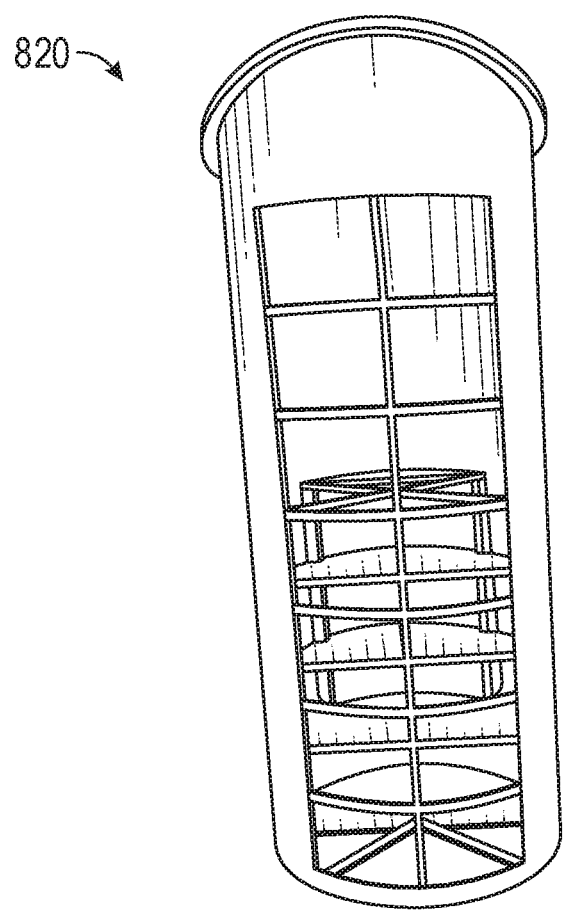
FIGS. 8B and 8C illustrate perspective view and side views, respectively, of an example seed receptacle.
Figure 8C:
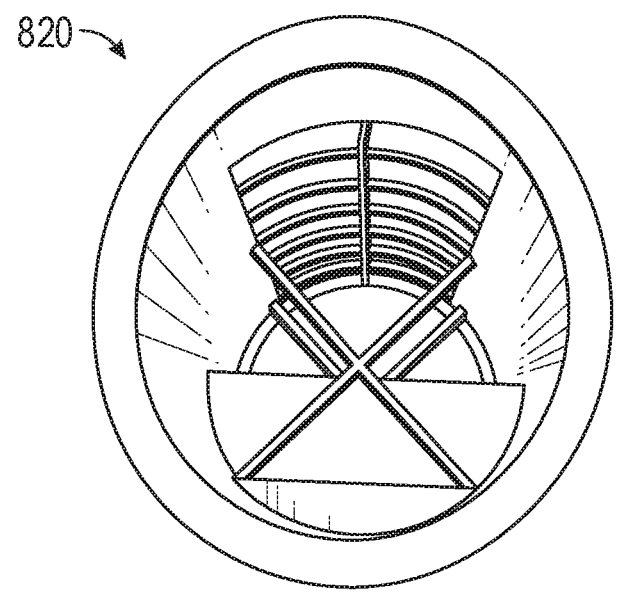

FIGS. 8B and 8C illustrate perspective view and side views, respectively, of an example seed receptacle 820, which can be an embodiment of the seed receptacle 600 of FIG. 6A. In the illustrated embodiment, the seed receptacle 820 is configured to engage with the plant-growing container 500 and configured to receive/store a plant medium that includes a seed. It will be understood that FIGS. 8B and 8C represent an example seed receptacle 810 and other embodiments may use different, fewer, or additional components or arrangements.

Figure 8D:
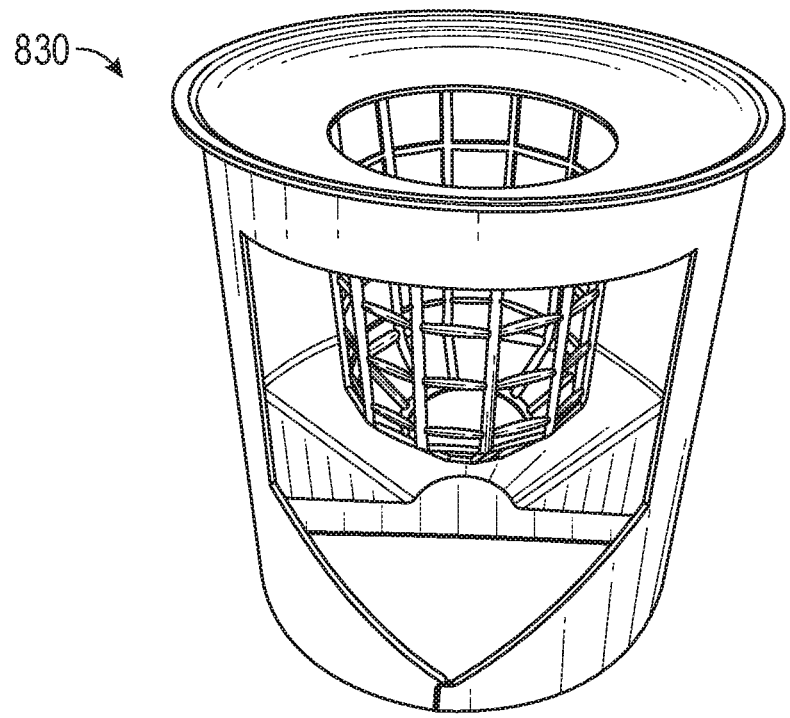
FIGS. 8D and 8E illustrate side views of an example apparatus that includes a seed receptacle integrated with a plant-growing container.
Figure 8E:
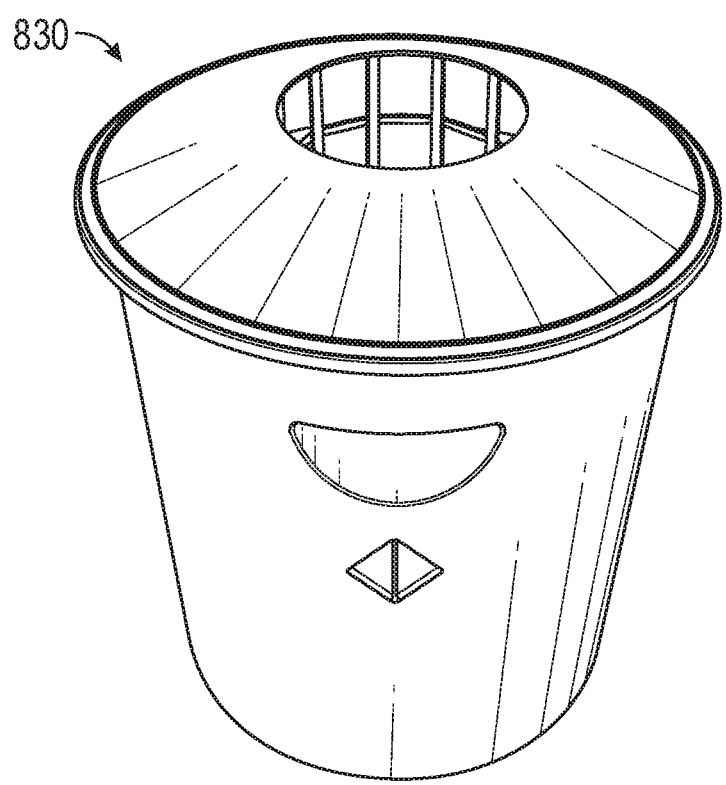

FIGS. 8D and 8E illustrate side views of an example apparatus 830 than includes a seed receptacle integrated with a plant-growing container. As described herein, in some cases, a plant-growing container is integrated with a seed receptacle such that no coupling is required. In some cases, the apparatus 830 can include one or more of the features of the seed receptacle 600 of FIG. 6A and/or the features of the plant-growing container 500 of FIG. 5A. In the illustrated embodiment, the apparatus 830 can be configured to engage with a module 300 and can be configured to receive/store a plant medium that includes a seed. It will be understood that FIGS. 8D and 8E represent an example integrated seed receptacle and plant-growing container and other embodiments may use different, fewer, or additional components or arrangements.

Figure 8F:
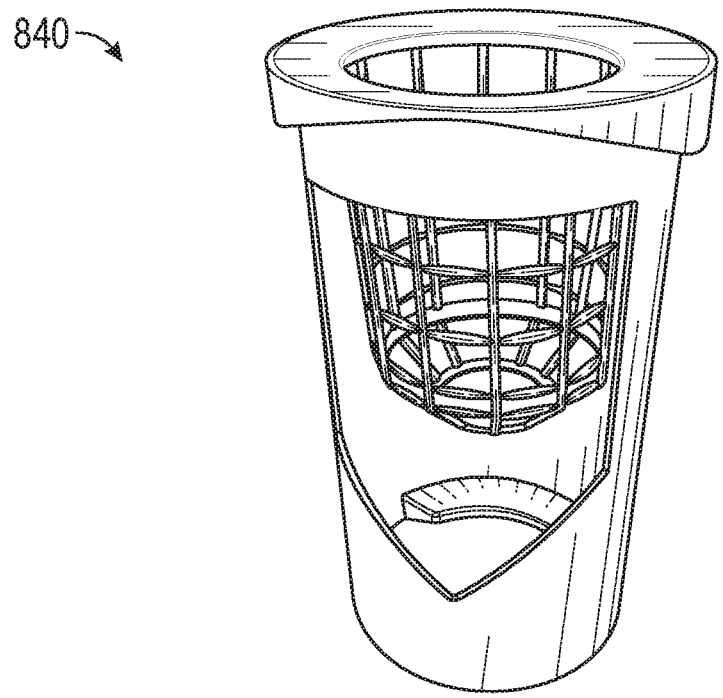
FIGS. 8F and 8G illustrate side views of an example apparatus that includes a seed receptacle integrated with a plant-growing container.
Figure 8G:
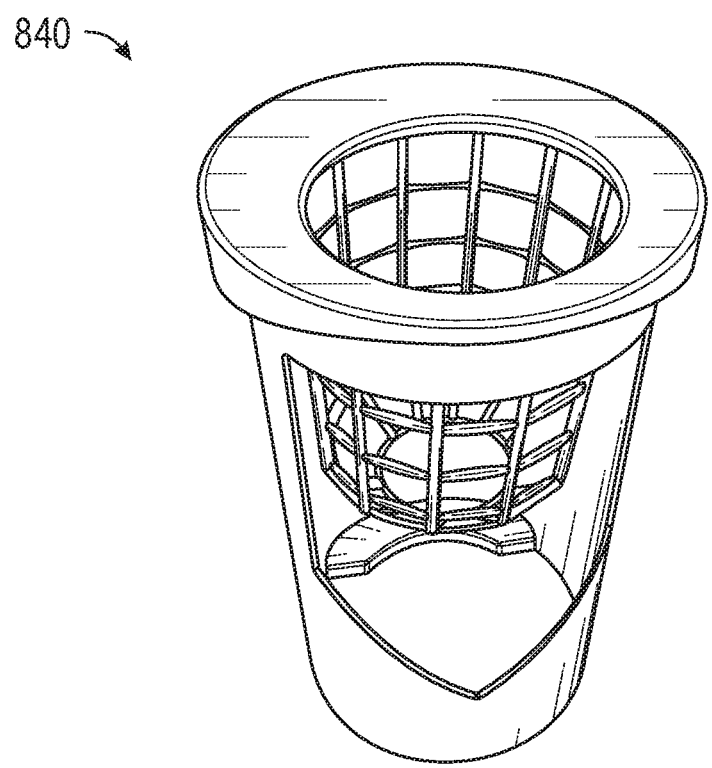

FIGS. 8F and 8G illustrate side views of an example apparatus 840 than includes a seed receptacle integrated with a plant-growing container. As described herein, in some cases, a plant-growing container is integrated with a seed receptacle such that no coupling is required. In some cases, the apparatus 840 can include one or more of the features of the seed receptacle 600 of FIG. 6A and/or the features of the plant-growing container 500 of FIG. 5A. In the illustrated embodiment, the apparatus 840 can be configured to engage with a module 300 and can be configured to receive/store a plant medium that includes a seed. It will be understood that FIGS. 8F and 8G represent an example integrated seed receptacle and plant-growing container and other embodiments may use different, fewer, or additional components or arrangements.

Figure 8H:
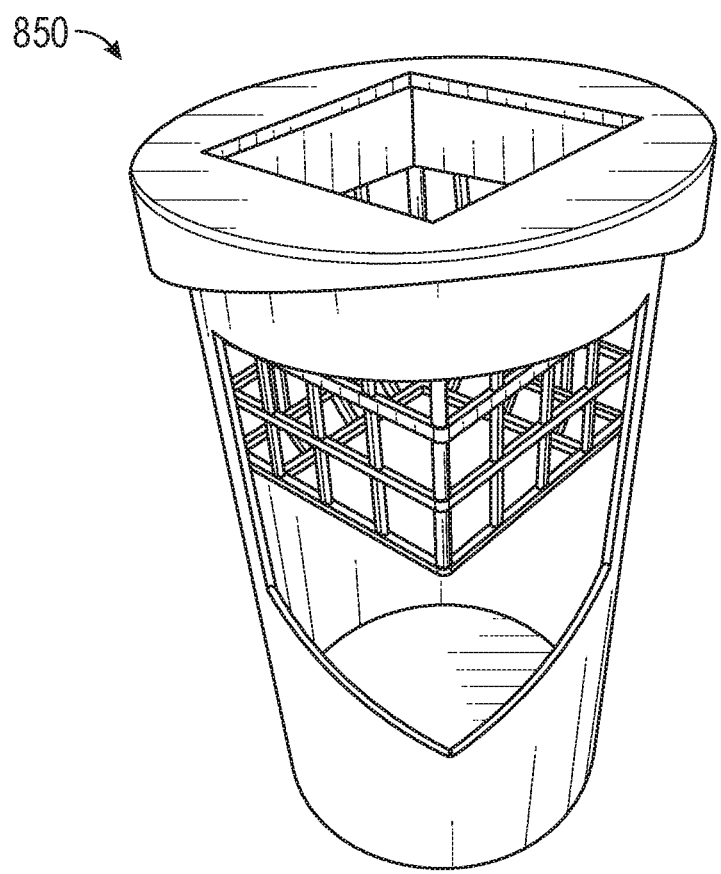
FIGS. 8H and 8I illustrate side views of an example apparatus that includes a seed receptacle integrated with a plant-growing container.
Figure 8I:
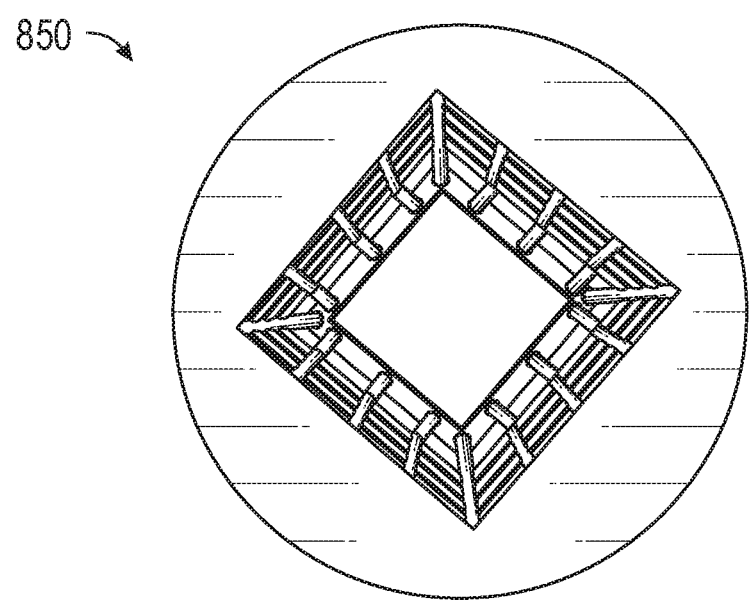
Figure 8J:
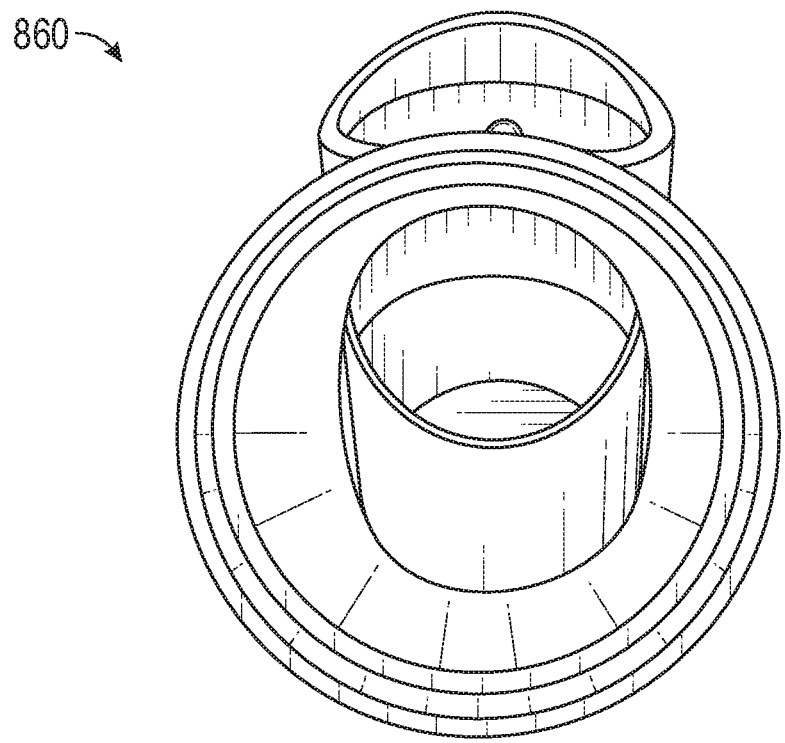
FIGS. 8J and 8K illustrate side views of an example apparatus that includes a plant-growing container integrated with a module
Figure 8K:
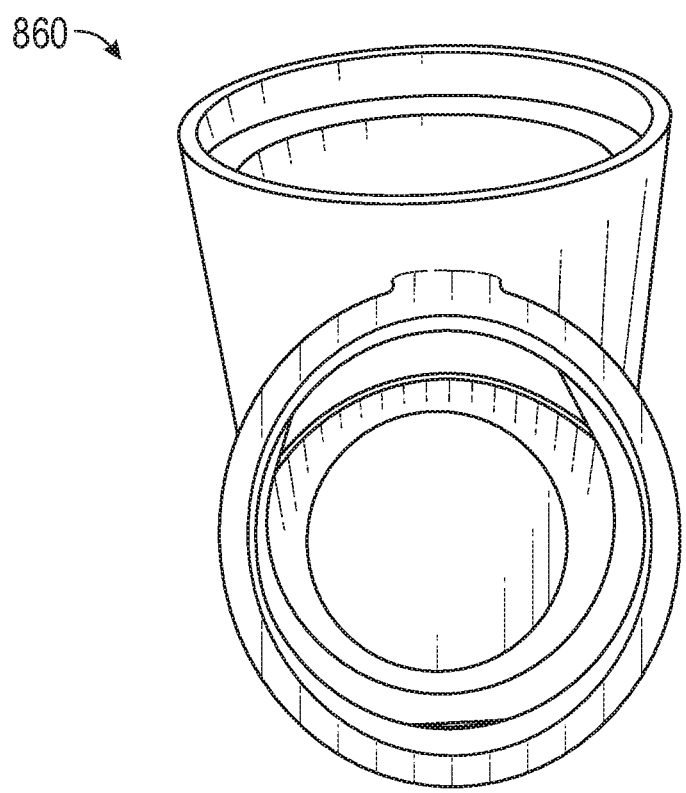

FIGS. 8H and 8I illustrate side views of an example apparatus 850 than includes a seed receptacle integrated with a plant-growing container. As described herein, in some cases, a plant-growing container is integrated with a seed receptacle such that no coupling is required. In some cases, the apparatus 850 can include one or more of the features of the seed receptacle 600 of FIG. 6A and/or the features of the plant-growing container 500 of FIG. 5A. In the illustrated embodiment, the apparatus 850 can be configured to engage with a module 300 and can be configured to receive/store a plant medium that includes a seed. It will be understood that FIGS. 8H and 8I represent an example integrated seed receptacle and plant-growing container and other embodiments may use different, fewer, or additional components or arrangements.

FIGS. 8J and 8K illustrate side views of an example apparatus 860 than includes a plant-growing container integrated with a module. As described herein, in some cases, a plant-growing container is integrated with a module such that no coupling is required. In some cases, the apparatus 860 can include one or more of the features of the module 300 of FIG. 3A and/or the features of the plant-growing container 500 of FIG. 5A. In the illustrated embodiment, the apparatus 860 can be configured to engage with other modules and can be configured to receive a seed receptacle. It will be understood that FIGS. 8J and 8K represent an example integrated seed receptacle and plant-growing container and other embodiments may use different, fewer, or additional components or arrangements.

Lighting and/or Image Capture System

Figure 9A:
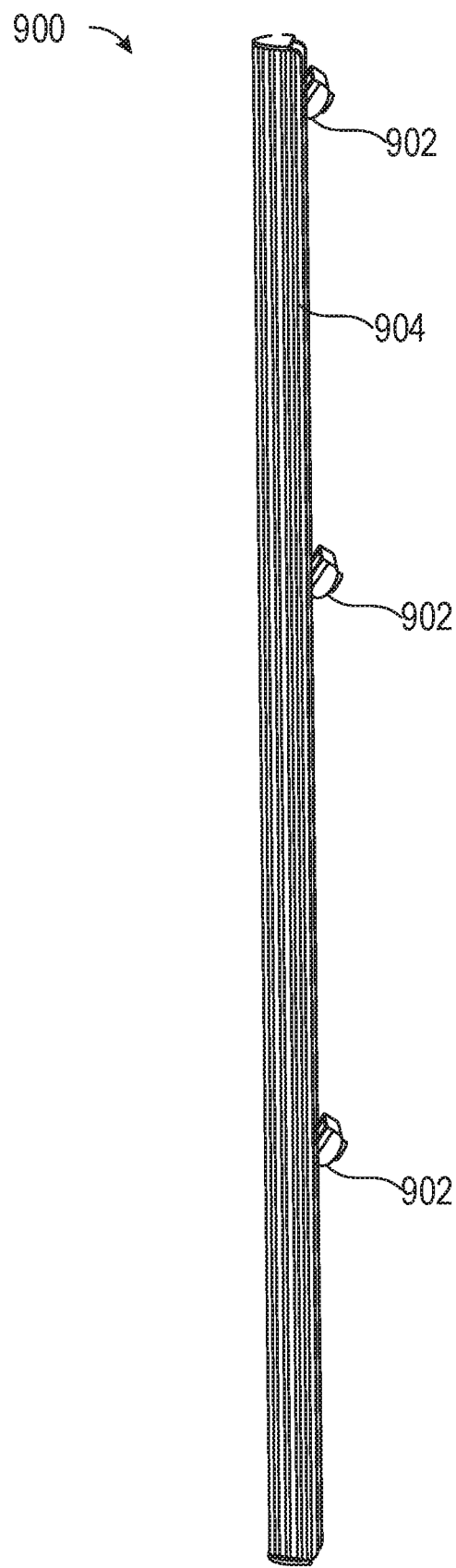
FIG. 9A illustrates a side view of an example lighting and/or image capture system.

FIG. 9A illustrates a side view of an example lighting and/or image capture system 900. As shown, in some instances, the lighting and/or image capture system 900 can include one or more image capture devices 902 and one or more light sources 904. FIG. 9A represents an exemplary lighting and/or image capture system. It will be understood that, as disclosed elsewhere herein, other embodiments may use fewer, additional, or different components or arrangements. For example, in some cases, the planting system 100 may include a lighting system separate from an image capture system. Furthermore, a lighting and/or image capture system can include only a lighting system or an image capture system. Additionally, the components disclosed for use with the embodiment of FIG. 9A can be mixed and matched and/or used with other exemplary systems disclosed elsewhere herein.

The lighting and/or image capture system 900 can include a light source 904, such as one or more light sources. The light source 904 can include a light-emitting diode (LED) or other source that is configured to emit light. In some cases, the light source 904 can emit light one or more wavelengths. For example, the light source 904 can include multiple emitters configured to emit light at different wavelengths, or the light source 904 can include a controllable light source that can be controlled to adjust the wavelength of the light emitted from the light source 904. In some cases, the light source 904 can be controllable by a controller, such as controller 270. For example, a controller 270 can be configured to adjust an intensity, wavelength, or duration of light emitted by the light source 904. In some implementations, the lighting and/or image capture system 900 includes a screen or cover (not shown), which can be configured to cover at least a portion of the lighting and/or image capture system 900 (e.g., to make the system more discrete.)

Figure 9B:
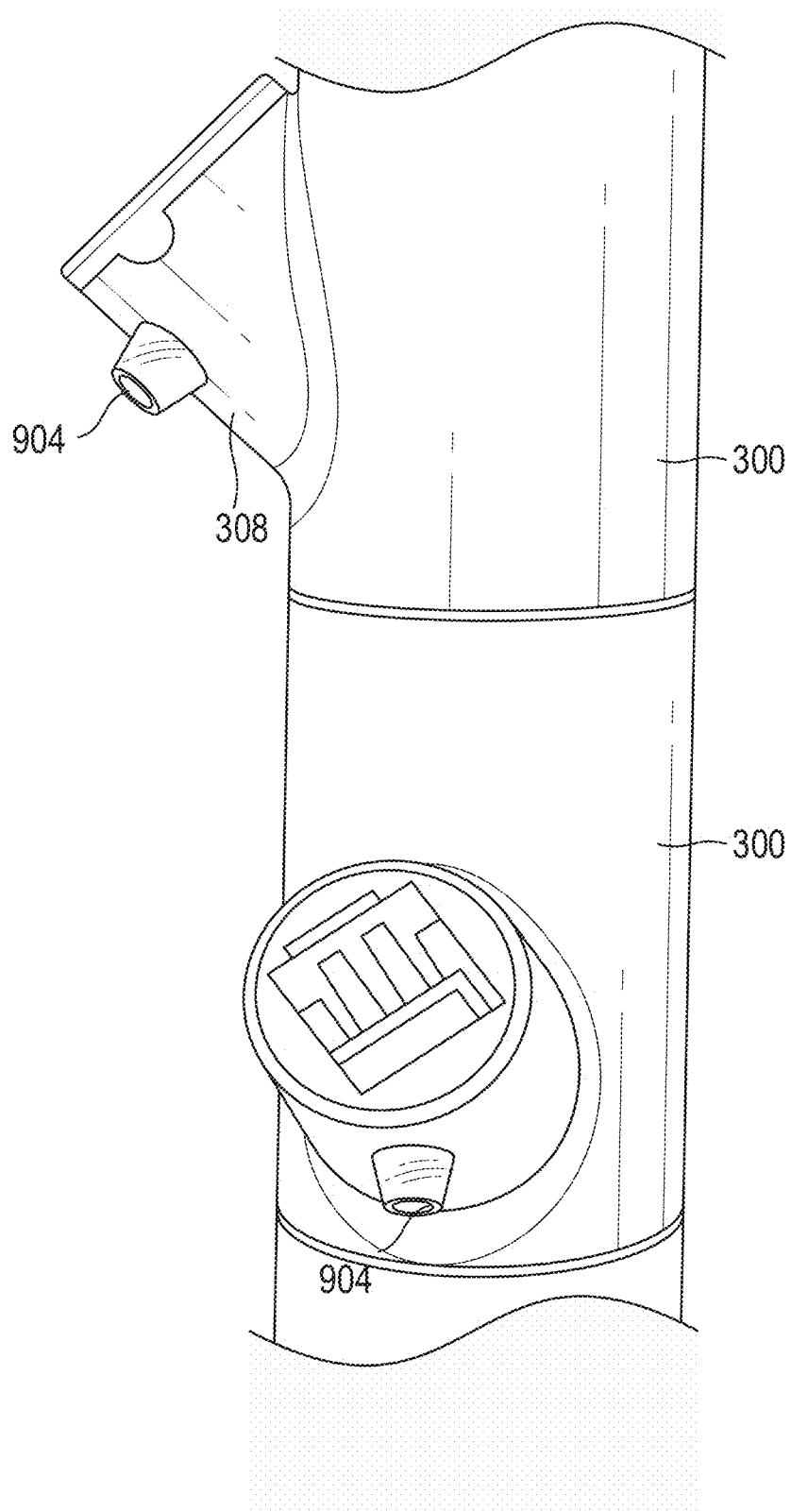
FIG. 9B illustrates a perspective view of a portion of a planting system that includes modules with an integrated light source.

In the illustrated embodiment, the light source 904 is implemented as being part of a vertical column, which can be positioned in front of, or proximate to, the ports 308 (e.g., the plants in the ports 308). However, it will be understood that a light source 904 can be implemented in a variety of ways. For example, as illustrated in FIG. 9B, in some cases, a light source 904 can be embedded into or coupled with a module 300, such as a port 308 of a module. Furthermore, in some cases, the lighting and/or image capture system 900 can include a dedicated light source 904 for each plant, or can include a dedicated light source 904 for a set of plants, such as 2, 3, 4, or 5, plants. In some cases, a light source 904 can be configured to provide light to a planting column or a particular module of a particular planting column. Furthermore, in some cases, the lighting and/or image capture system 900 can include a focuser (not shown), such as a parabolic member around the light source 904, which can help direct light onto a plant and limit the dispersion of the light.

The lighting and/or image capture system 900 can include a camera or other image capture device 902 that can be configured to capture images or video of one or more plants over time and/or provide real-time or near real-time images or video of one or more plants, as well as be utilized to monitor the plants. Furthermore, in some cases, image capture device 902 can be configured to scan an identifier of a seed receptacle, as described elsewhere herein, for example to determine whether a particular seed receptacle is compatible with the plant-growing system 100.

In the illustrated embodiment, image capture device 902 is implemented as being attached to the light source 904. However, it will be understood the position of the image capture device 902 within the plant-growing system can vary across embodiments. Furthermore, although the image capture device 902 in FIG. 9A is illustrated as three cameras positioned along the light source 904, it will be understood that any number of image capture devices 902 can be utilized. For example, in some instances, the plant-growing system 100 includes a separate image capture device 902 for each planting column, each module, each plant, or the like. As described herein, the image capture devices 902 can be communicatively coupled to a controller, such as controller 270. For example, the image capture devices 902 can provide the controller 270 with image data corresponding to one or more images taken by the image capture devices 902.

Cross Sectional View/Water Flow Diagram

FIG. 10 illustrates a cross sectional view of an example plant-growing system 100. In some implementations, the plant-growing system 100 includes a fluid storage and distribution system 200 and a planting system 400. It will be appreciated that the plant-growing systems 100 of FIG. 10 represents an example plant-growing system and other embodiments may use fewer, additional, or different components or arrangements (including a different arrangements of fluid storage and distributions systems, planting systems, lighting systems, and components thereof that are not pictured). Furthermore, it will be understood that, in some implementations, any one or more components of the fluid storage and distribution system 200 or the planting system 400 can be part of one or more of the other systems.

As described elsewhere herein, in some implementations, the pump 220 can be configured to circulate fluid through the plant-growing system 100. For example, the pump 220 can be fluidically coupled to portions of the plant-growing system 100 via a fluid conduit 221. For example, the fluid conduit 221 can extend from the pump 220 to one or more of the modules 300. In some implementations, as shown in FIG. 10, the fluid conduit 221 can extend from the pump 220 to the uppermost module 300A. In this way, the pump 220 can circulate fluid through the fluid conduit 221 to distribute fluid to the uppermost module 300A (e.g., to a plant-growing container removably inserted in the uppermost module 300A). In some implementations, not shown, the fluid conduit 221 can individually extend (e.g., separate conduit) from the pump 220 to the each of the modules (e.g., modules 300A, 300B, 300C, and 300D). In this way, the pump 220 can circulate fluid through the fluid conduit 221 to individually distribute fluid to each of the modules.

Figure 11A:
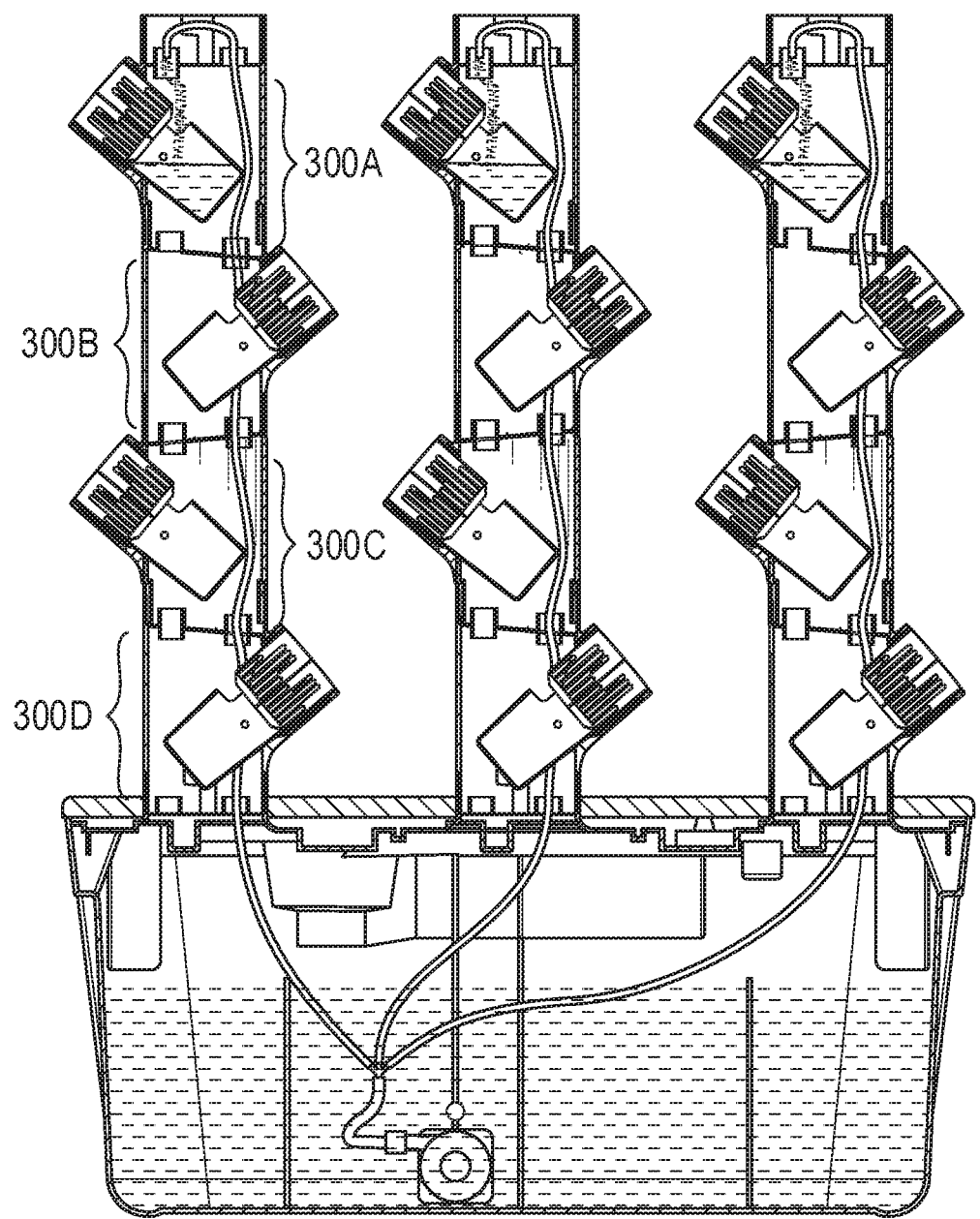
FIGS. 11A-11C illustrates cross sectional views of example stages of operation of the plant-growing system of FIG. 10.
Figure 11B:
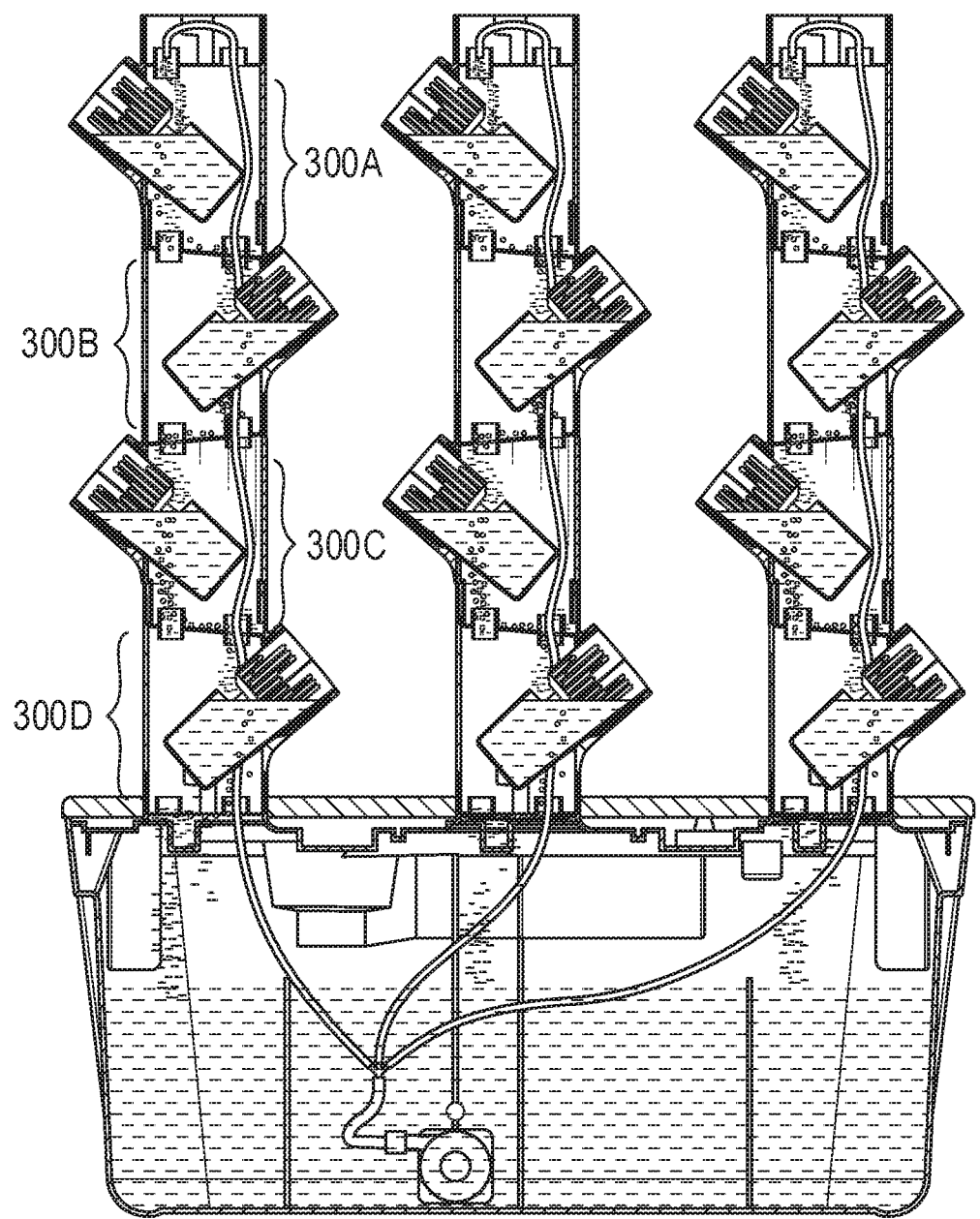
Figure 11C:
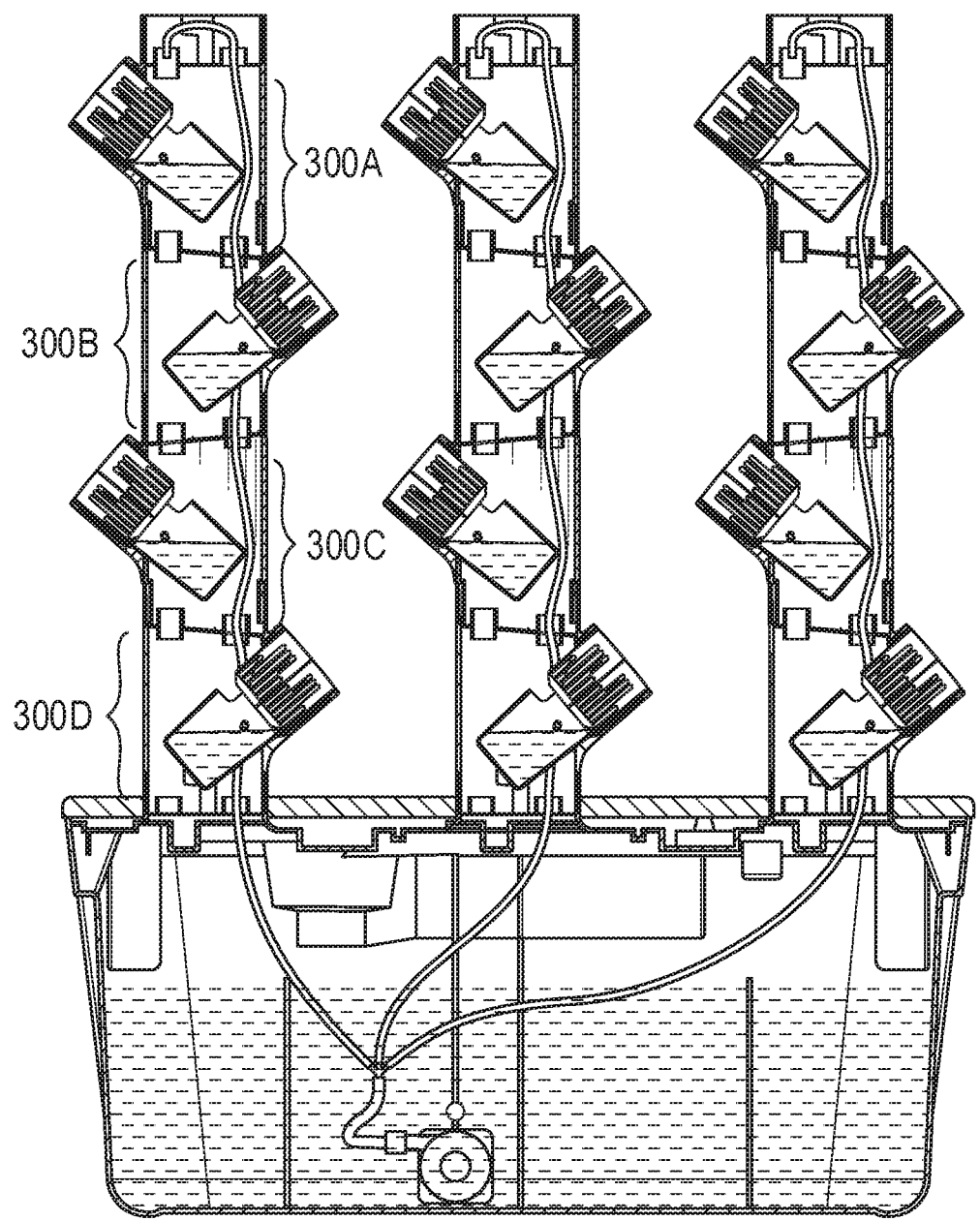

FIG. 11A-11C illustrate example fluid-flow stages of the plant-growing system of FIG. 11. FIG. 11A illustrates a time shortly after initialization of the plant-growing system 100. Here, the pump 220 operates to transport (via the fluid conduit 221) at least some of the fluid in the chamber 206 to the uppermost module 300A. As described elsewhere herein, in this example, the fluid is received by the uppermost module 300A and flows through an upper aperture (e.g., the aperture 312 of FIG. 3B) of the uppermost module 300A into the plant-growing container (e.g., via the aperture 512 of the plant-growing container 500) of the uppermost module 300A. As this stage, only the reservoir of the plant-growing container of the uppermost module 300A is filling, but has not yet overflowed into residual plant-growing containers below.

FIG. 11B illustrates a steady state of the growing system 100, while the pump 220 operates. Here, the pump 220 operates to transport (via the fluid conduit 221) at least some of the fluid in the chamber 206 to the uppermost module 300A. As described elsewhere herein, in this example, the fluid is received by the uppermost module 300A and flows through an upper aperture (e.g., the aperture 312 of FIG. 3B) of the uppermost module 300A into the plant-growing container (e.g., via the aperture 512 of the plant-growing container 500) of the uppermost module 300A. At this stage, the fluid may be distributed into the uppermost module 300A first, which can cause a plant-growing container removably inserted in the uppermost module 330A to fill and overflow (e.g., flow out of aperture 512 and/or aperture 514 of the plant-growing container 500). The overflowing of the plant-growing container removably inserted in the uppermost module 330A trickles or drips down (e.g., through gravity) to the next uppermost module 300B. The plant-growing container removably inserted in the next uppermost module 300B overflows, as described above, followed by the third uppermost module 300C, and finally the bottommost module 300D. In certain configurations, the plant-growing container removably inserted in the bottommost module 300D can then overflow to replenish the fluid in the chamber 206. As illustrated in FIG. 11B, in some cases, at steady state (while the pump 220 is operating), each of the plant-growing containers can be filled to a threshold corresponding to the aperture 512 (e.g., first threshold level 582 of FIG. 5E).

FIG. 11C illustrates a steady state of the growing system 100 after the pump 220 is turned off. Here, the pump 220 no longer transports fluid to the uppermost module 300A. As a result, the fluid in each of the plant-growing container seeps or flows out of the aperture 514 (e.g., as illustrated in FIG. 5A) such that each of the plant-growing containers have a liquid level equal to a threshold corresponding to the aperture 514 (e.g., second threshold level 584 of FIG. 5E).

In other implementations, not shown, the fluid may be distributed to each module 300A, 300B, 300C, 300D simultaneously or substantially simultaneously by the fluid conduit 221 or by virtue of the shape and configuration of the modules. Further still, in some implementations, not shown, the fluid may be distributed into the uppermost module 300C or to each module 300A, 300B, 300C, 300D simultaneously or substantially simultaneously through external means, such from an irrigation system that is external to the planting system 100. For example, fluid may be provided to a module 300 through a hole in the module 300.

Block Diagram

Figure 12:
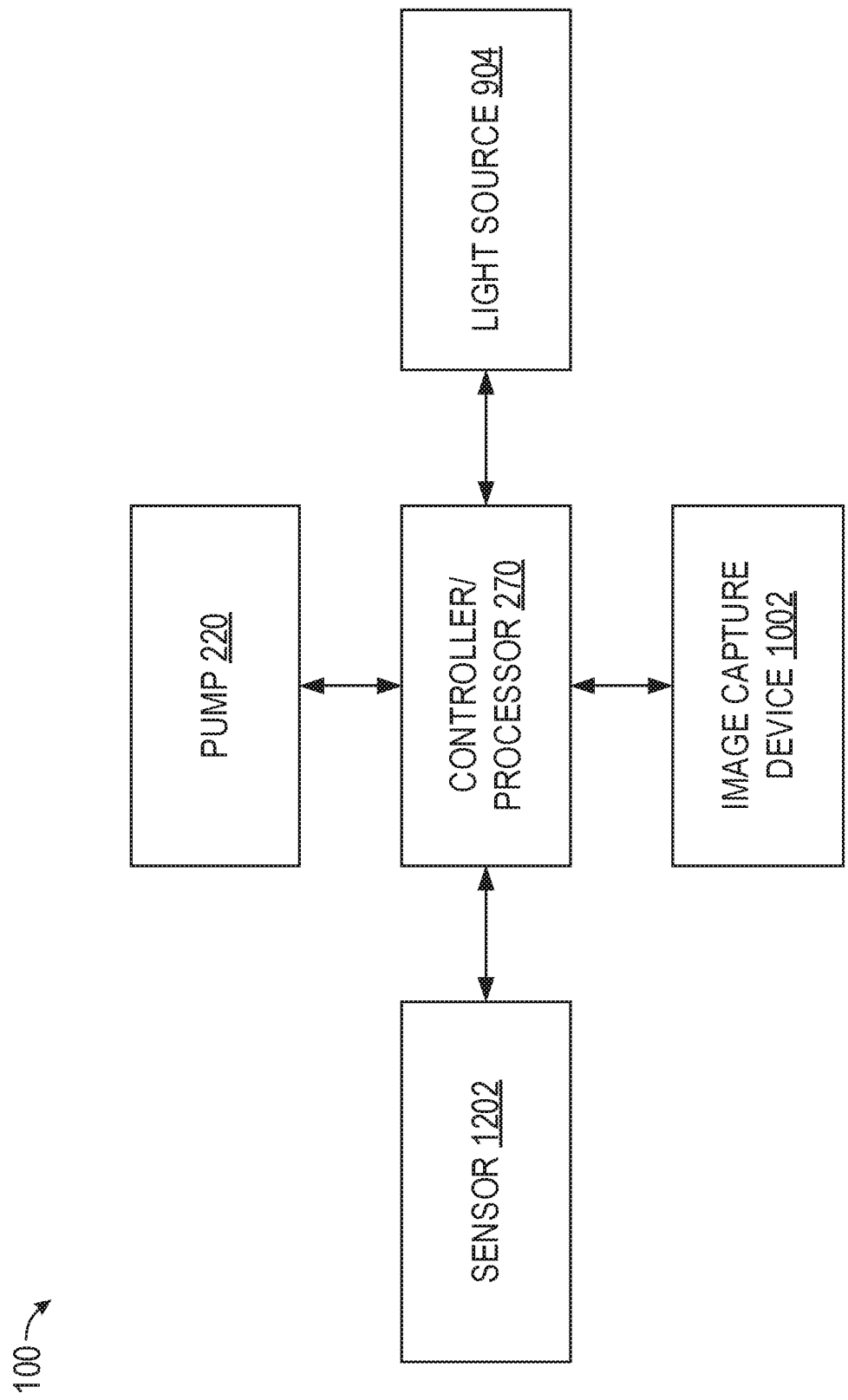
FIG. 12 illustrates a block diagram of an example plant-growing system.

FIG. 12 illustrates a block diagram of an example plant-growing system 100. In some implementations, the plant-growing system 100 includes a pump 220, a controller 270 and/or processor, an image capture device 902, and a light source 904, as described elsewhere herein. Furthermore, in some implementations, the plant-growing system 100 include a sensor 1202, such as one or more sensors 1202. It will be appreciated that the plant-growing systems 100 of FIG. 12 represents an example plant-growing system and other embodiments may use fewer, additional, or different components or arrangements.

In some implementations, a number of sensor technologies can be used in the plant growing system 100 or one or more components therein, forming part of the plant-growing system 100. For example, one or more sensors 1202 can be incorporated onto or into a fluid storage and distribution system 200, a planting system 400, or a lighting and/or image capture system 900. In some embodiments, one or more of temperature sensors, an optical sensors, humidity sensors, fluid flow sensors, pH sensors, fluid level sensors, electrical conductivity sensors, or the like. In some cases, the sensor 1202 can assist the monitoring of the plant-growing system 100, such as one or more plants of the plant-growing system 100.

The controller 270 can be communicatively coupled to the pump 220, the light source 904, the image capture device 1002, and/or the sensor 1202. For example, the controller 270 can be configured to control and/or receive data from any one or more of the pump 220, the light source 904, the image capture device 1002, and/or the sensor 1202.

In some cases, the controller 270 can receive sensor data from the sensor 1202 and/or image data from the image capture device 1002. Based at least in part on the sensor data and/or the image data, the controller 270 can determine at least one of a level of liquid in the chamber 206, a pH of the liquid the plant-growing system 100, an electrical conductivity of the liquid the plant-growing system 100, a temperature (e.g., of the liquid or ambient air) associated with the plant-growing system 100, a hygrometry/humidity associated with the plant-growing system 100, a growth rate or expected growth rate of a plant of the plant-growing system 100, plant health data, an expected harvest date for a plant of the plant-growing system 100, a type of plant in the plant-growing system 100, the unique identifier of the seed receptacle, a number of modules, plant-growing containers, and/or seed receptacles being utilized in the plant-growing system 100, an amount of light provided to the plant-growing system 100, an amount of light provided to a module, plant-growing container, and/or seed receptacle of the plant-growing system 100, etc.

In some cases, the controller 270 determine data associated with a plant of the plant-growing system 100 based at least in part on one or more images received from the image capture device 1002. For example, the controller 270 determine or estimate a growth rate of the plant based at least in part on one or more of the images and or can predict or estimate a harvest date based at least in part on the growth rate. For example, in some cases, the controller 270 can extract data from the images to identify information, (e.g., identifying any abnormal look of the plant (leave shape, color, over position of the plant, etc.) as well as the most likely causes for it and the actions to be undertaken to remediate it). In some cases, the controller 270 can perform image recognition algorithms to break down the image into each plant present in the plant-growing system 100. In some cases, using the image data, the controller 270 can determine a particular location (e.g., particular planting column 402 and/or particular module 300) where the plant is located can be computed. Image recognition algorithms can be based at least in part on pre-trained Convolutional Neuronal Networks, which can compute a size of a plant (e.g., based on a number of leaves, size of a leaf or plant, and/or a total weight of the plant). In some cases, the system can determine a growth rate of the plant. For example, one or more pictures can be compared with historical and standard data for the plant under these conditions, which can allow computation of when the plant will come to maturity and/or will be ready for harvesting.

In some cases, based on the sensor data and/or image data, the controller 270 can control or adjust the plant-growing system 100 (e.g., the pump 220, the light source 904, etc.) to optimize the growth of the plants and/or modify a growth rate (and thus, an estimated harvest date) of the plants. In some cases, based at least in part on the sensor data, the image data, and/or an internal clock, the controller 270 can output one or more notifications to a user. In some cases, the notification can include a notification to perform an action to be undertaken (e.g., add water, harvest plants, order new plants, etc.).

In some embodiments, the controller 270 can include, but not limited to, Raspberry Pi or Arduino. In some cases, the controller 270 is in communication with one or more cloud-based servers.

In some cases, the controller 270 can determine whether a seed receptacle is compatible with the plant-growing system 100. For example, as described elsewhere herein, each seed receptacle 600 can be associated with an identifier. In some cases, prior to inserting a seed receptacle 600 into the plant-growing system 100, a user can scan the seed receptacle 600 (e.g., scan a bar code, RFID tag, QC code, etc.) to determine the compatibility of the seed receptacle 600 with the plant-growing system 100. In some cases, if the seed receptacle 600 is not associated with an expected identifier, then the controller 270 can determine that the seed receptacle 600 is not compatible with and cannot be used in the plant-growing system 100. In some cases, the controller can prevent or restrict (e.g., limited) operation of the plant-growing system 100 until a valid seed receptacle 600 (e.g., a seed receptacle 600 associated with an expected identifier) is scanned.

In some cases, the controller 270 can control a user interface (not shown), which can provide information to a user. For example, the interface can allow a user to receive information relating to some or all of the plants growing in the plant-growing system 100, expected harvest dates, other information (e.g., pH, temperature, humidity, water level, nutrient level, etc.), view images (e.g., real-time images) of the plant-growing system 100 and/or specific plants growing therein, receive notifications, order new plants, etc.

Flow Diagrams

Figure 13:
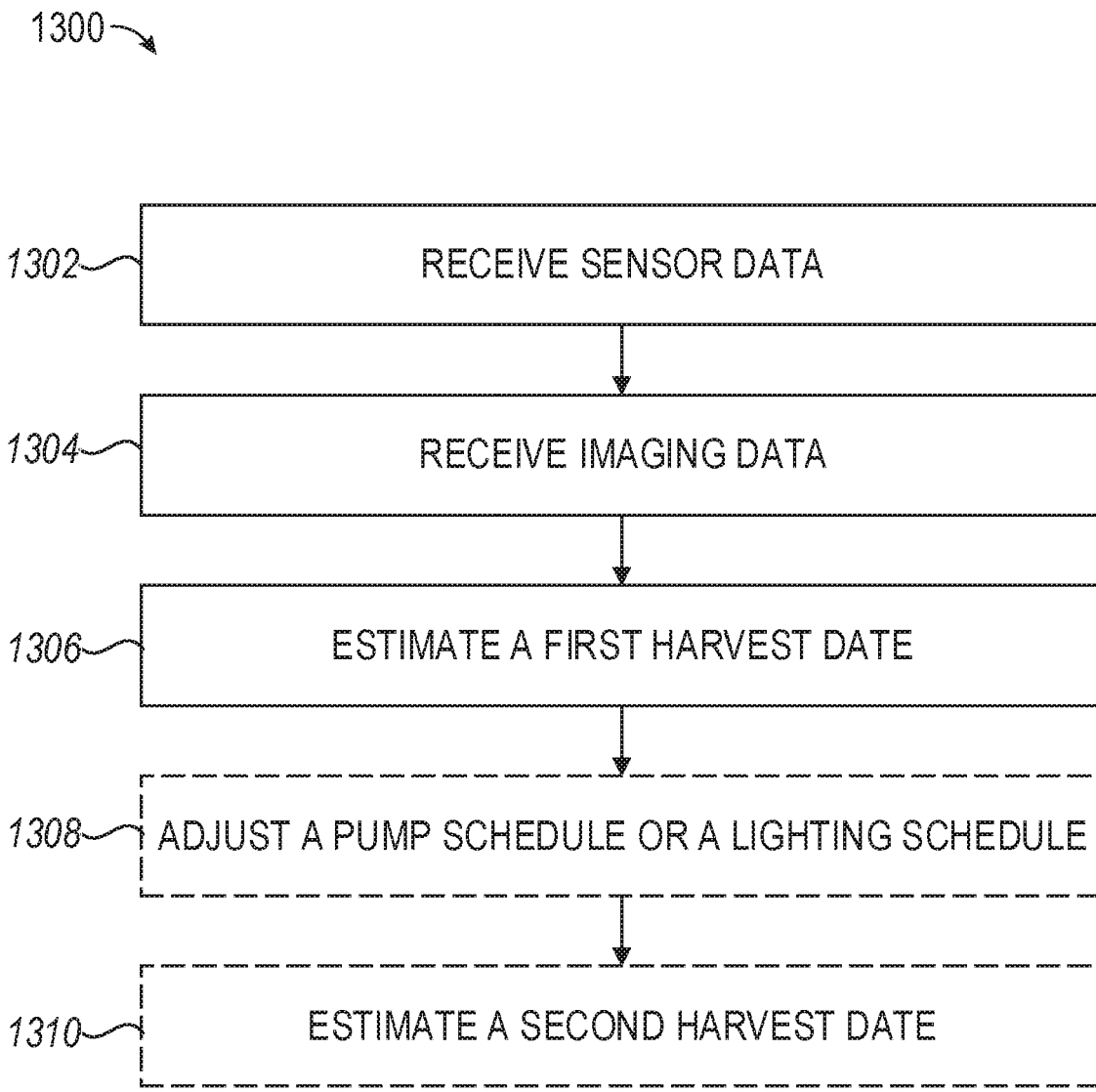
FIG. 13 is a flow diagram illustrative of an embodiment of a routine for estimating and/or modifying a harvest date of a plant of a plant-growing system.

FIG. 13 is a flow diagram illustrative of an embodiment of a routine for estimating and/or modifying a harvest date of a plant included in a plant-growing system, such as the plant-growing system 100 of FIGS. 1A-1D. One skilled in the relevant art will appreciate that the elements outlined for routine 1300 can be implemented by one or more computing devices, such as a cloud computing environment or a computing device associated with the system 100, such as the controller 270 of FIG. 2A. Routine 1300 has been logically associated as being generally performed by the controller 100. However, the following illustrative embodiment should not be construed as limiting. Furthermore, it will be understood that the various blocks described elsewhere herein with reference to FIG. 13 can be implemented in a variety of orders. For example, the system 100 can implement some blocks concurrently or change the order as desired. Furthermore, it will be understood that fewer, more, or different blocks can be used as part of the routine 1300. For example, in some embodiments, the solid blocks are part of routine 1300 and the dotted blocks are not implemented. However, it will be understood that any of the blocks (and more or different blocks) can be implemented as part of routine 1300.

At block 1302, the controller 270 receives sensor data, for example from the sensor 1202. As described herein, the sensor data can include temperature data, optical data, humidity data, fluid flow data, pH data, fluid level data, electrical conductivity data, or the like.

At block 1304, the controller 270 receives imaging data, for example from the image capture device 1002. As described herein, the imaging data can include one or more images or videos of a plant of the planting growing system 100. For example, the imaging data can be a series of images over a period of time. In some cases, the imaging data can include a time lapse of images.

At block 1306, the controller 270 estimates a first harvest date. In some cases, the first harvest date corresponds to a date by which the plant will be ready to harvest. In some cases, the plant will be ready to harvest when it is safe to consume or when it is ripe. In some cases, the plant will be ready to harvest at least a portion of one or more leaves of the plant change color. In some cases, the plant will be ready to harvest when at least a portion of the plant satisfies a threshold size. For example, the plant can be ready for harvest when the leaves satisfy a leaf size threshold or the entire plant satisfies a plant size threshold. In some cases, the harvest date varies plant-to-plant. For example, the controller 270 can determine a harvest date for each plant. In some cases, the one or more plants can have the same harvest date.

As described elsewhere herein, the harvest date can be estimated based at least in part on the sensor data and/or the image data. For example, any of the sensor data (e.g., temperature data, optical data, humidity data, fluid flow data, pH data, fluid level data, electrical conductivity data) can be indicative or factors of a health status or growth rate of the plant. Furthermore, the images can be indicative or factors of a health status or growth rate of the plant. For example, a size, a change in size of time, a color, a change in color over time, a number of leaves, or the like can be indicative of how quickly a plant is growing and/or how healthy a plant is. Furthermore, in some cases, the amount of liquid, oxygen, and/or light that the plant receives can affect the growth rate of the plant. Accordingly, based at least in part on the sensor data, the image data, the pump schedule, or the lighting schedule, the controller 270 can determine or estimate a growth rate of the plant and/or a harvest date of the plant.

At block 1308, the controller 270 adjusts at least one of a pump schedule or a lighting schedule, for example, to adjust the harvest date of the plant. In some cases, it can be advantageous to adjust the harvest date of a plant. For example, a user may be going on a vacation and doesn't want the plant to have a harvest date that overlaps with the vacation. As another example, the user may be growing many of the same type of plant and does not want all of the plants to grow at the same rate. Further still, in some cases, it may be desirable to speed up the growth rate of a plant (e.g., when the user runs out of a particular plant). Thus, it can be desirable to adjust the expected harvest date of a plant.

As described herein, the controller 270 can control the pump according to a pump schedule. The pump schedule can control the amount of fluid and/or oxygen provided to one or more plants of the plant-growing system 100. For example, in some cases, when the pump is operating, the plants of the plant-growing system 100 are provided liquid and/or oxygen (e.g., the circulation of the liquid can oxygenate the liquid). In some cases, the amount of liquid and/or oxygen the plant receives can affect the growth rate of the plant (e.g., how quickly the plant will grow). In some cases, the controller 270 can adjust or modify the pump schedule to affect the growth rate of the plant, thereby altering the harvest date.

Similarly, as described herein, the controller 270 can control the light source 904 according to a lighting schedule. The lighting schedule can control the intensity and/or duration of light provided to one or more plants of the plant-growing system 100. For example, in some cases, when the light source is operating, the plants of the plant-growing system 100 are provided light. In some cases, the intensity of the light, the particular wavelength of light, or the duration over which the plant receives light can affect the growth rate of the plant. For example, in some cases, higher intensity light or a longer duration of applied light can speed up plant growth. As a corollary, in some cases, lower intensity light or a shorter duration of applied light can slow down plant growth. In some cases, the controller 270 can adjust or modify the lighting schedule to affect the growth rate of the plant, thereby altering the harvest date.

At block 1310, similar to block 1306, the controller 270 estimates a second harvest date based at least in part on the sensor data, the image data, and the adjusted at least one pump schedule or lighting schedule.

It will be understood that the various blocks described herein can be implemented in a variety of orders, and that the controller 270 can implement one or more of the blocks concurrently and/or change the order, as desired. Furthermore, it will be understood that fewer, more, or different blocks can be used as part of the routine 1300.

Methods of Manufacturing and/or Use

A method of manufacturing and/or using any one or more of a module (e.g., the module 300 of FIG. 3A), a plant-growing container (e.g., the plant-growing container 500 of FIG. 5A), a seed receptacle (e.g., the seed receptacle 600 of FIG. 6A), a planting system (e.g., the planting system 400 of FIG. 1A), a lighting and/or image capture system (e.g., the lighting and/or image capture system 900 of FIG. 9A), or a plant-growing system (e.g., the plant-growing system 100 of FIG. 1A).

In some embodiments, the method includes obtaining (e.g., procuring, forming, or otherwise) any one or more of a module (such as the module 300 of FIG. 3A), a plant-growing container (such as the plant-growing container 500 of FIG. 5A), a seed receptacle (such as the seed receptacle 600 of FIG. 6A), and/or a plant medium that includes a seed. The method can include inserting the planting growing medium into the cavity 602 within the seed receptacle 600. The method can include inserting the seed receptacle 600 into the orifice 510 within the plant-growing container 500. The method can include inserting the plant-growing container 500 into the orifice 306 within the module 300. The method can include securing any of the plant medium to the seed receptacle 600, the seed receptacle 600 to the plant-growing container 500, or the plant-growing container 500 to the module 300 by aligning and engaging engagement portions, as described elsewhere herein. Certain embodiments of the method include obtaining (e.g., procuring, forming, or otherwise) one or more other modules and engaging the one or more other modules with the module to form a planting column. Certain embodiments of the method include providing fluid to the plant medium, for example, by circulating the fluid via a pump to the module. Certain embodiments of the method include providing light to the plant medium, for example via a lighting and/or image capture system. Certain embodiments of the method include removing the plant-growing container from the module, for example after a plant grows from the seed. Certain embodiments of the method include removing the seed receptacle from the plant-growing container, for example after a plant grows from the seed. Certain embodiments of the method include obtaining another plant medium and another seed receptacle, inserting the another plant medium into the another seed receptacle, and inserting the another seed receptacle into the plant-growing container 500.

Example Embodiments

Various example embodiments of methods, systems, and apparatuses relating to a plant-growing system can be found in the following clauses:

Clause 1. A module of a plant-growing system, the module can include:
a wall defining a portion of an internal space within the module;
a shelf extending inwardly from the wall and can include a first aperture, wherein the shelf is configured to receive a fluid during circulation of the fluid through the plant-growing system and wherein the aperture is positioned in the shelf so that at least a portion of the fluid passes through the first aperture;
a port extending radially outward from the wall at an angle relative to a vertical axis of the wall, wherein the port comprises an orifice configured to receive a plant-growing container, the plant-growing container can include a reservoir;
wherein the port is configured to engage the plant-growing container so that at least a portion of the plant-growing container protrudes into the internal space of the module;
an upper engagement portion configured to engage with one or more of a lower engagement portion of a second module and/or an engagement portion of a cap; and
a lower engagement portion configured to engage with one or more of an upper engagement portion of a third module and/or a base connector of a fluid storage and distribution system.

Clause 2. The module of any of clause 1, wherein the shelf comprises a contoured portion configured to direct fluid on the shelf toward the first aperture.

Clause 3. The module of any of clauses 1 or 2, wherein the contoured portion is funnel-shaped and terminates at the first aperture.

Clause 4. The module of any of clauses 1 to 3, wherein the shelf is positioned above the port.

Clause 5. The module of clause 4, wherein the first aperture is positioned within the shelf such that when fluid flows through the first aperture, the fluid is received by the plant-growing container through a hole in the plant-growing container.

Clause 6. The module of any of clauses 1 to 5, wherein the shelf is positioned below the port.

Clause 7. The module of clause 6, wherein the port is configured to direct the reservoir of the plant-growing container at a position below the aperture such that the reservoir collects fluid that passes through the first aperture.

Clause 8. The module of any of clauses 1 to 7, wherein the port comprises a first engagement portion configured to engage with a second engagement portion of the plant-growing container.

Clause 9. The module of clause 8, wherein engagement of the first engagement portion with the second engagement portion restricts rotational movement of the plant-growing container within the orifice.

Clause 10. The module of any of clauses 8 or 9, wherein engagement of the first engagement portion with the second engagement portion is configured to properly orient the plant-growing container within the orifice.

Clause 11. The module of any of clauses 8 to 10, wherein the first engagement portion comprises a protrusion, wherein the second engagement portion comprises at least one of a cavity, an aperture, or a groove, and wherein the second engagement portion is configured to receive the protrusion.

Clause 12. The module of any of clauses 8 to 11, wherein the second engagement portion comprises a protrusion, wherein the first engagement portion comprises at least one of a cavity, an aperture, or a groove, and wherein the first engagement portion is configured to receive the protrusion.

Clause 13. The module of any of clauses 8 to 12, wherein at least one of the first engagement portion or the second engagement portion comprises at least one of a hook and loop fastener, a clamp, a clasp, a buckle, a button, a hook, a screw, or a wire.

Clause 14. The module of any of clauses 1 to 13, wherein the upper engagement portion of the module is identical to the upper engagement portion of the third module.

Clause 15. The module of any of clauses 1 to 13, wherein the lower engagement portion of the module is identical to the lower engagement portion of the second module.

Clause 16. The module of any of clauses 1 to 15, wherein at least one of the lower engagement portion or the upper engagement portion comprises at least one of a hook and loop fastener, a clamp, a clasp, a buckle, a button, a hook, a screw, or a wire.

Clause 17. The module of any of clauses 1 to 16, wherein the lower engagement portion of the module is configured to clip into or onto the upper engagement portion of the third module.

Clause 18. The module of any of clauses 1 to 17, wherein the upper engagement portion is configured to clip into or onto the lower engagement portion of the second module.

Clause 19. The module of any of clauses 1 to 18, wherein the module is identical to the second module and/or the third module.

Clause 20. The module of any of clauses 1 to 22, wherein the wall extends circumferentially around the internal area of the module and providing an upwardly facing aperture defined by the upper engagement portion and a downwardly facing aperture defined by the lower engagement portion.

Clause 21. The module of any of clauses 1 to 20, further can include a second aperture.

Clause 22. The module of clause 21, wherein the second aperture is configured to receive a tube configured to provide the fluid to the module.

Clause 23. The module of clause 22, wherein the tube extends from the module to another module.

Clause 24. The module of any of clauses 21 to 23, further can include a chamber formed by the shelf and at least a portion of the wall, wherein at least some of the fluid flows through the second aperture of the shelf in response to a level of fluid contained in the chamber reaching a threshold depth of fluid.

Clause 25. The module of any of clauses 21 to 24, wherein second aperture is elevated with respect to the first aperture.

Clause 26. A module of a plant-growing system, the module can include:
a wall;
a shelf extending inwardly from the wall and can include a first aperture, wherein during circulation of fluid through the plant-growing system, at least some of the fluid passes through the first aperture;
a port extending inwardly from the wall at an angle relative to a vertical axis of the module, wherein the port comprises an orifice configured to receive a plant-growing container, wherein the plant-growing container comprises a reservoir configured to hold fluid;
an upper engagement portion configured to engage with at least one of a lower engagement portion of another module or an engagement portion of a cap; and
a lower engagement portion configured to engage with an upper engagement portion of another module.

Clause 27. The module of any of clause 26, wherein the shelf comprises an at least partially contoured portion proximate the first aperture.

Clause 28. The module of clause 27, at least partially contoured facilitates flow of fluid through the first aperture.

Clause 29. The module of any of clauses 26 to 28, wherein the shelf is positioned above the port.

Clause 30. The module of clause 29, wherein the first aperture is positioned within the shelf such that when fluid flows through the first aperture, the fluid is received by the plant-growing container through a hole in the plant-growing container.

Clause 31. The module of any of clauses 26 to 30, wherein the shelf is positioned below the port.

Clause 32. The module of clause 31, wherein the first aperture is positioned within the shelf such that when fluid flows through the first aperture, the fluid is received by a plant-growing container within another module.

Clause 33. The module of any of clauses 26 to 32, wherein the port comprises a first engagement portion configured to engage with a second engagement portion of the plant-growing container.

Clause 34. The module of clause 33, wherein engagement of the first engagement portion with the second engagement portion restricts rotational movement of the plant-growing container within the orifice.

Clause 35. The module of any of clauses 33 or 34, wherein engagement of the first engagement portion with the second engagement portion ensures proper orientation of the plant-growing container within the orifice.

Clause 36. The module of any of clauses 33 to 35, wherein the first engagement portion comprises a protrusion, wherein the second engagement portion comprises at least one of a cavity, an aperture, or a groove, and wherein the second engagement portion is configured to receive the protrusion.

Clause 37. The module of any of clauses 33 to 36, wherein the second engagement portion comprises a protrusion, wherein the first engagement portion comprises at least one of a cavity, an aperture, or a groove, and wherein the first engagement portion is configured to receive the protrusion.

Clause 38. The module of any of clauses 33 to 37, wherein at least one of the first engagement portion or the second engagement portion comprises at least one of a hook and loop fastener, a clamp, a clasp, a buckle, a button, a hook, a screw, or a wire.

Clause 39. The module of any of clauses 26 to 38, wherein the lower engagement portion comprises a protrusion, wherein the upper engagement portion comprises a cavity configured to receive the protrusion.

Clause 40. The module of any of clauses 26 to 39, wherein the upper engagement portion comprises a protrusion, wherein the lower engagement portion comprises a cavity configured to receive the protrusion.

Clause 41. The module of any of clauses 26 to 40, wherein at least one of the lower engagement portion or the upper engagement portion comprises at least one of a hook and loop fastener, a clamp, a clasp, a buckle, a button, a hook, a screw, or a wire.

Clause 42. The module of any of clauses 26 to 41, wherein the lower engagement portion of the module is configured to clip into or onto the upper engagement portion of the another module.

Clause 43. The module of any of clauses 26 to 42, wherein the upper engagement portion is configured to clip into or onto the lower engagement portion of the another module.

Clause 44. The module of any of clauses 26 to 43, further can include at least one second aperture.

Clause 45. The module of clause 44, wherein the at least one second aperture is configured to receive a tube configured to provide the fluid to the module.

Clause 46. The module of clause 45, wherein the tube extends from the module to another module.

Clause 47. The module of any of clauses 44 to 46, further comprises a chamber formed by the shelf and at least a portion of the wall, wherein at least some of the fluid flows through the second aperture of the shelf responsive to a level of fluid contained in the chamber satisfying a threshold level of fluid.

Clause 48. The module of clause 47, wherein the threshold level of fluid corresponds to a height of the elevated second aperture.

Clause 49. The module of any of clauses 44 to 48, wherein second aperture is elevated with respect to the first aperture.

Clause 50. A module of a plant-growing system, the module can include:
a first wall;
a shelf extending inwardly from the first wall and can include a first aperture; and
a plant-growing container can include:
a second wall can include a second aperture,
an orifice formed by the second wall and configured to receive a removable seed receptacle, and
a reservoir,
wherein during circulation of fluid through the plant-growing system, at least some of the fluid passes through the first aperture and the second aperture and at least some of the fluid if captured in the reservoir.

Clause 51. The module of clause 50, further can include an upper engagement portion configured to engage with at least one of a lower engagement portion of another module or an engagement portion of a cap.

Clause 52. The module of any of clauses 50 or 51, further can include a lower engagement portion configured to engage with an upper engagement portion of another module.

Clause 53. A module of any of the clauses 1 to 52, further comprising a light source embedded in the module.

Clause 54. A plant-growing system can include the module and plant-growing container of any of clauses 1 to 52.

Clause 55. A method using the plant-growing system of any of clauses 1 to 52.

Clause 56. A method of manufacturing the plant-growing system of any of clauses 1 to 52.

Example Embodiments

Various example embodiments of methods, systems, and apparatuses relating to a plant-growing system can be found in the following clauses:

Clause 1. A plant-growing container can include:
a lower portion and a wall extending upwardly from the lower portion, the wall can include a first aperture;
an orifice formed by an upper portion of the wall and configured to receive a removable seed receptacle; and
a reservoir provided by a lower portion of the wall, the reservoir configured to hold a fluid;
wherein the container is configured to be removably inserted into a port of a module of a plant-growing system;
wherein the reservoir is configured to receive a portion of a fluid that is circulated through the plant-growing system.

Clause 2. The plant-growing container of clause 1, wherein, when placed in the module of the plant-growing system, the plant-growing container is configured to receive the portion of fluid through the first aperture.

Clause 3. The plant-growing container of any of clauses 1 or 2, wherein, during circulation of the fluid through the plant-growing system, the aperture is configured to receive the portion of fluid via the first aperture.

Clause 4. The plant-growing container of clause 3, wherein, during circulation of the fluid through the plant-growing system, the reservoir is configured to receive the portion of fluid that passes through the first aperture.

Clause 5. The plant-growing container of any of clauses 3 or 4, wherein, during the circulation of the fluid through the plant-growing system, the aperture is also configured to allow at least some of the portion of fluid to exit the plant-growing container through the first aperture in response to the reservoir receiving a first threshold amount of fluid.

Clause 6. The plant-growing container of clause 5, wherein the wall further comprises a second aperture.

Clause 7. The plant-growing container of clause 6, wherein the first aperture is larger than the second aperture.

Clause 8. The plant-growing container of any of clauses 6 or 7, wherein second aperture is level with a bottom of the first aperture when the plant-growing container is in an upright position resting on its lower portion.

Clause 9. The plant-growing container of any of clauses 6 to 8, wherein the second aperture is configured to reduce an amount of fluid in the container to be a second threshold amount of fluid.

Clause 10. The plant-growing container of any of clauses 6 to 9, wherein during the circulation of the fluid through the plant-growing system, a flow of fluid out of the first aperture is greater than a flow of fluid out of the second aperture.

Clause 11. The plant-growing container of any of clauses 6 to 10, wherein during the circulation of the fluid through the plant-growing system, at least some of the fluid exits the plant-growing container through the second aperture responsive to the reservoir holding a second threshold amount of fluid.

Clause 12. The plant-growing container of any of clauses 6 to 11, wherein exit of the fluid through the second aperture creates a current through the plant-growing system that is less than a threshold current.

Clause 13. The plant-growing container of any of clauses 11 to 12, wherein second threshold amount of fluid is less than the first threshold amount of fluid.

Clause 14. The plant-growing container of any of clauses 1 to 13, wherein the container is configured to be removably inserted into the port at an angle.

Clause 15. The plant-growing container of any of clauses 14, wherein the angle is between 30 degrees and 60 degrees relative to a vertical axis of the module.

Clause 16. The plant-growing container of any of clauses 14 or 15, wherein the angle is less than 90 degrees relative to a vertical axis of the module.

Clause 17. The plant-growing container of any of clauses 1 to 16, further can include an engagement portion configured to mate with an engagement portion of at least one of the removable seed receptacle or a module.

Clause 18. The plant-growing container of clause 17, wherein the engagement portion of the plant-growing container is located on an interior surface of the wall.

Clause 19. The plant-growing container of any of clauses 17 or 18, wherein the engagement portion of the plant-growing container is located on an exterior surface of the wall.

Clause 20. The plant-growing container of any of clauses 17 to 19, wherein the engagement portion of the plant-growing container comprises a protrusion, wherein the engagement portion of the removable seed receptacle or module comprises at least one of a cavity, an aperture, or a groove, and wherein the engagement portion of the removable seed receptacle or module is configured to receive the protrusion.

Clause 21. The plant-growing container of any of clauses 17 to 20, wherein the engagement portion of the removable seed receptacle or module comprises a protrusion, wherein the engagement portion of the plant-growing container comprises at least one of a cavity, an aperture, or a groove, and wherein the engagement portion of the plant-growing container is configured to receive the protrusion.

Clause 22. The plant-growing container of any of clauses 17 to 21, wherein at least one of the engagement portion of the plant-growing container or the engagement portion of the removable seed receptacle or module comprises at least one of a hook and loop fastener, a clamp, a clasp, a buckle, a button, a hook, a screw, or a wire.

Clause 23. The plant-growing container of any of clauses 17 to 22, wherein the engagement portion of the plant-growing container is configured to clip into or onto the engagement portion of the removable seed receptacle or module.

Clause 24. The plant-growing container of any of clauses 17 to 23, wherein the engagement portion of the removable seed receptacle or module is configured to clip into or onto the engagement portion of the plant-growing container.

Clause 25. The plant-growing container of any of clauses 17 to 24, wherein the engagement portion of the plant-growing container is configured to protrude through a portion of the removable seed receptacle when the plant-growing container receives the removable seed receptacle.

Clause 26. The plant-growing container of any of clauses 17 to 25, wherein the engagement portion of the removable seed receptacle or module is configured to protrude through a portion of the container when the plant-growing container receives the removable seed receptacle.

Clause 27. The plant-growing container of any of clauses 17 to 26, wherein the engagement portion of the removable seed receptacle or module is configured to exert an outward pressure on an interior of the plant-growing container.

Clause 28. The plant-growing container of any of clauses 1 to 27, wherein the removable seed receptacle is configured to house a plant, wherein the plant-growing container is configured to confine at least some roots of the plant while the removable seed receptacle is located in the plant-growing container.

Clause 29. The plant-growing container of any of clauses 1 to 28, wherein the removable seed receptacle is configured to house a plant, wherein the plant-growing container is configured to confine all roots of the plant while the removable seed receptacle is located in the plant-growing container.

Clause 30. The plant-growing container of any of clauses 1 to 29, wherein, when the reservoir includes fluid, the plant-growing container is configured to retain the fluid within the plant-growing container and avoid spillage of the liquid when the plant-growing container is removed from a port of a module of a plant-growing system and oriented in an upright position.

Clause 31. The plant-growing container of clause 30, wherein when oriented in the upright position a level of fluid in the reservoir does not reach the aperture and does not escape the plant-growing container through the first aperture.

Clause 32. A plant-growing container can include:
a wall can include an aperture;
an orifice formed by the wall and configured to receive a removable seed receptacle;
a reservoir; and
wherein the container is configured to be removably inserted into a cavity of a module of a plant-growing system.

Clause 33. The container of clause 32, wherein the container is configured to receive fluid through the aperture.

Clause 34. The plant-growing container of any of clauses 32 or 33, wherein during circulation of fluid through the plant-growing system, at least some of the fluid passes through the aperture.

Clause 35. The plant-growing container of clause 34, wherein during the circulation of the fluid through the plant-growing system, at least some of the fluid is captured in the reservoir.

Clause 36. The plant-growing container of any of clauses 34 or 35, wherein during the circulation of the fluid through the plant-growing system, at least some of the fluid exits the container through the aperture responsive to the reservoir holding a threshold amount of fluid.

Clause 37. The plant-growing container of clause 36, wherein the aperture is a first aperture, wherein the wall further comprises a second aperture.

Clause 38. The plant-growing container of clause 37, wherein the first aperture is larger than the second aperture.

Clause 39. The plant-growing container of any of clauses 36 to 38, wherein second aperture is level with a bottom of the first aperture when the container is in an upright position.

Clause 40. The plant-growing container of any of clauses 36 to 39, wherein the threshold amount of fluid is a first threshold amount of fluid, wherein the second aperture is configured to reduce an amount of fluid in the container to be a second threshold amount of fluid.

Clause 41. The plant-growing container of any of clauses 36 to 40, wherein during the circulation of the fluid through the plant-growing system, a flow of fluid through the first aperture is greater than a flow of fluid through the second aperture.

Clause 42. The plant-growing container of any of clauses 36 to 41, wherein the threshold amount of fluid is a first threshold amount of fluid, wherein during the circulation of the fluid through the plant-growing system, at least some of the fluid exits the container through the second aperture responsive to the reservoir holding a second threshold amount of fluid.

Clause 43. The plant-growing container of any of clauses 36 to 42, wherein exit of the fluid through the second aperture creates a current through the plant-growing system that is less than a threshold current.

Clause 44. The plant-growing container of any of clauses 42 or 43, wherein second threshold amount of fluid is less than the first threshold amount of fluid.

Clause 45. The plant-growing container of any of clauses 32 to 44, wherein the container is configured to be removably inserted into the cavity at an angle.

Clause 46. The plant-growing container of clause 45, wherein the angle is between 30 degrees and 60 degrees relative to a vertical axis of the module.

Clause 47. The plant-growing container of any of clauses 45 or 46, wherein the angle is less than 90 degrees relative to a vertical axis of the module.

Clause 48. The plant-growing container of any of clauses 32 to 47, further can include a first engagement portion configured to mate with a second engagement portion of at least one of the removable seed receptacle or a module.

Clause 49. The plant-growing container of clause 48, wherein the first engagement portion is located on an interior surface of the wall.

Clause 50. The plant-growing container of any of clauses 48 or 49, wherein the first engagement portion is located on an exterior surface of the wall.

Clause 51. The plant-growing container of any of clauses 48 or 50, wherein the first engagement portion comprises a protrusion, wherein the second engagement portion comprises at least one of a cavity, an aperture, or a groove, and wherein the second engagement portion is configured to receive the protrusion.

Clause 52. The plant-growing container of any of clauses 48 or 51, wherein the second engagement portion comprises a protrusion, wherein the first engagement portion comprises at least one of a cavity, an aperture, or a groove, and wherein the first engagement portion is configured to receive the protrusion.

Clause 53. The plant-growing container of any of clauses 48 or 52, wherein at least one of the first engagement portion or the second engagement portion comprises at least one of a hook and loop fastener, a clamp, a clasp, a buckle, a button, a hook, a screw, or a wire.

Clause 54. The plant-growing container of any of clauses 48 or 53, wherein the first engagement portion is configured to clip into or onto the second engagement portion.

Clause 55. The plant-growing container of any of clauses 48 or 54, wherein the second engagement portion is configured to clip into or onto the first engagement portion.

Clause 56. The plant-growing container of any of clauses 48 or 55, wherein the first engagement portion is configured to protrude through a portion of the removable seed receptacle when the container receives the removable seed receptacle.

Clause 57. The plant-growing container of any of clauses 48 or 56, wherein the second engagement portion is configured to protrude through a portion of the container when the container receives the removable seed receptacle.

Clause 58. The plant-growing container of any of clauses 48 or 57, wherein the second engagement portion is configured to exert an outward pressure on an interior of the container.

Clause 59. The plant-growing container of any of clauses 32 to 58, wherein the removable seed receptacle is configured to include a plant, wherein the container is configured to confine at least some roots of the plant while the removable seed receptacle is located in the container.

Clause 60. The plant-growing container of any of clauses 32 to 59, wherein the removable seed receptacle is configured to include a plant, wherein the container is configured to confine all roots of the plant while the removable seed receptacle is located in the container.

Clause 61. The plant-growing container of any of clauses 32 to 60, wherein when the reservoir includes fluid, the container is configured to retain the fluid within the container and avoid spillage of the liquid when the container is removed from a port of a module of a plant-growing system and oriented in a upright position.

Clause 62. The plant-growing container of clause 61, wherein when oriented in the upright position a level of the fluid does not reach the aperture and the fluid does not escape the container through the aperture.

Clause 63. A plant-growing container can include:
a wall can include an aperture;
seed receptacle configured to receive a plant medium can include a seed; and
a reservoir,
wherein the container is configured to be removably inserted into a cavity of a module of a plant-growing system.

Clause 64. The plant-growing container of clause 63, wherein the container is configured to receive fluid through the aperture.

Clause 65. The plant-growing container of clause 64, wherein during circulation of fluid through the plant-growing system, at least some of the fluid passes through the aperture.

Clause 66. The plant-growing container of any of clauses 64 or 65, wherein during the circulation of the fluid through the plant-growing system, at least some of the fluid is captured in the reservoir.

Clause 67. The plant-growing container of any of clauses 64 to 66, wherein during the circulation of the fluid through the plant-growing system, at least some of the fluid exits the container through the aperture responsive to the reservoir holding a threshold amount of fluid.

Clause 68. The plant-growing container of any of clauses 64 to 67, wherein the aperture is a first aperture, wherein the wall further comprises a second aperture.

Clause 69. The plant-growing container of clause 68, wherein the first aperture is larger than the second aperture.

Clause 70. The plant-growing container of any of clauses 68 or 69, wherein second aperture is level with a bottom of the first aperture when the container is in an upright position.

Clause 71. The plant-growing container of any of clauses 68 to 70, wherein the threshold amount of fluid is a first threshold amount of fluid, wherein the second aperture is configured to reduce an amount of fluid in the container to be a second threshold amount of fluid.

Clause 72. The plant-growing container of any of clauses 68 to 71, wherein during the circulation of the fluid through the plant-growing system, a flow of fluid through the first aperture is greater than a flow of fluid through the second aperture.

Clause 73. The plant-growing container of any of clauses 68 to 72, wherein the threshold amount of fluid is a first threshold amount of fluid, wherein during the circulation of the fluid through the plant-growing system, at least some of the fluid exits the container through the second aperture responsive to the reservoir holding a second threshold amount of fluid.

Clause 74. The plant-growing container of clause any of clauses 68 to 73, wherein exit of the fluid through the second aperture does not create a current through the plant-growing system.

Clause 75. The plant-growing container of any of clauses 73 or 74, wherein second threshold amount of fluid is less than the first threshold amount of fluid.

Clause 76. The plant-growing container of any of clauses 32 to 75, wherein the container is configured to be removably inserted into the cavity at an angle.

Clause 77. The plant-growing container of clause 76, wherein the angle is between 35 degrees and 55 degrees relative to a vertical axis of the module.

Clause 78. The plant-growing container of any of clauses 76 or 77, wherein the angle is less than 90 degrees relative to a vertical axis of the module.

Clause 79. The plant-growing container of any of clauses 32 to 78, further can include a first engagement portion configured to mate with a second engagement portion of a module.

Clause 80. The plant-growing container of clause 79, wherein the first engagement portion is located on an interior surface of the wall.

Clause 81. The plant-growing container of clause 79, wherein the first engagement portion is located on an exterior surface of the wall.

Clause 82. The plant-growing container of clause 79, wherein the first engagement portion comprises a protrusion, wherein the second engagement portion comprises at least one of a cavity, an aperture, or a groove, and wherein the second engagement portion is configured to receive the protrusion.

Clause 83. The plant-growing container of clause 79, wherein the second engagement portion comprises a protrusion, wherein the first engagement portion comprises at least one of a cavity, an aperture, or a groove, and wherein the first engagement portion is configured to receive the protrusion.

Clause 84. The plant-growing container of clause 79, wherein at least one of the first engagement portion or the second engagement portion comprises at least one of a hook and loop fastener, a clamp, a clasp, a buckle, a button, a hook, a screw, or a wire.

Clause 85. The plant-growing container of clause 79, wherein the first engagement portion is configured to clip into or onto the second engagement portion.

Clause 86. The plant-growing container of clause 79, wherein the second engagement portion is configured to clip into or onto the first engagement portion.

Clause 87. The plant-growing container of any of clauses 32 to 86, wherein the container is configured to confine all roots of the plant.

Clause 88. The plant-growing container of any of clauses 32 to 87, wherein when the reservoir includes fluid, the container is configured to retain the fluid within the container when the container is removed from a port of a module of a plant-growing system and oriented in an upright position.

Clause 89. The plant-growing container of clause 88, wherein when oriented in the upright position a level of the fluid does not reach the aperture.

Clause 90. The plant-growing container of clause 88, wherein when oriented in the upright position a level of the fluid does not escape the container through the aperture.

Clause 91. A plant-growing system can include the container and seed receptacle of any of clauses 1 to 90.

Clause 92. A method using the plant-growing container of any of clauses 1 to 91.

Clause 93. A method of manufacturing the plant-growing container of any of clauses 1 to 91.

Example Embodiments

Various example embodiments of methods, systems, and apparatuses relating to a plant-growing system can be found in the following clauses:

Clause 1. A seed receptacle can include:
an upper portion having an exterior shape and an interior shape; and
a lower portion can include:
 a wall defining a cavity within the seed receptacle, and
 an engagement portion configured to engage with an engagement portion of a plant-growing container;
wherein the wall of the lower portion defines the interior shape of the upper portion.

Clause 2. The seed receptacle of clause 1, wherein the wall is porous.

Clause 3. The seed receptacle of any of clauses 1 or 2, wherein the wall comprises a plurality of apertures.

Clause 4. The seed receptacle of any of clauses 1 to 3, wherein the wall comprises a plurality of slits.

Clause 5. The seed receptacle of any of clauses 1 to 4, wherein the cavity is configured to store a plant medium can include a seed.

Clause 6. The seed receptacle of clause 5, wherein the wall restricts rotational movement of the plant medium within the cavity.

Clause 7. The seed receptacle of any of clauses 5 or 6, wherein the cavity is configured to hold the plant medium, thereby providing an anchor point for a plant-growing from the seed of the plant medium.

Clause 8. The seed receptacle of any of clauses 1 to 7, wherein the lower portion further comprises a lower member coupled to a bottom of the wall, wherein the lower member floor and the wall form the cavity.

Clause 9. The seed receptacle of any of clauses 1 to 8, wherein the interior shape of the upper portion is different from the exterior shape of the upper portion.

Clause 10. The seed receptacle of any of clauses 1 to 9, wherein the interior shape of the upper portion is complementary to the exterior shape of the upper portion.

Clause 11. The seed receptacle of any of clauses 1 to 10, wherein the engagement portion of the seed receptacle comprises a protrusion and the engagement portion of the plant-growing container comprises a cavity configured to receive the protrusion.

Clause 12. The seed receptacle of any of clauses 1 to 11, wherein the engagement portion of the plant-growing container comprises a protrusion and the engagement portion of the seed receptacle comprises a cavity configured to receive the protrusion.

Clause 13. The seed receptacle of any of clauses 1 to 12, wherein at least one of the engagement portion of the seed receptacle or the engagement portion of the plant-growing container comprises at least one of a hook and loop fastener, a clamp, a clasp, a buckle, a button, a hook, a screw, or a wire.

Clause 14. The seed receptacle of any of clauses 1 to 13, wherein the engagement portion of the seed receptacle is configured to clip into or onto the engagement portion of the plant-growing container.

Clause 15. The seed receptacle of any of clauses 1 to 14, wherein the engagement portion of the plant-growing container is configured to clip into or onto the engagement portion of the seed receptacle.

Clause 16. The seed receptacle of any of clauses 1 to 15, wherein the engagement portion of the seed receptacle is located on an exterior of the wall.

Clause 17. The seed receptacle of any of clauses 1 to 16, wherein the engagement portion of the seed receptacle is located on an interior of the wall.

Clause 18. The seed receptacle of any of clauses 1 to 17, wherein the engagement portion of the seed receptacle is configured to protrude through a portion of the plant-growing container when the seed receptacle is coupled with the plant-growing container.

Clause 19. The seed receptacle of any of clauses 1 to 18, wherein a portion of the plant-growing container is configured to protrude through a portion of the seed receptacle when the seed receptacle is coupled with the plant-growing container.

Clause 20. The seed receptacle of any of clauses 1 to 19, wherein the interior shape of the upper portion is one of a circle, an oval, a triangle, a square, a rectangle, a trapezoid, a rhombus, a parallelogram, or otherwise polygonal.

Clause 21. The seed receptacle of any of clauses 1 to 20, wherein the exterior shape of the upper portion is a circle, an oval, a triangle, a square, a rectangle, a trapezoid, a rhombus, a parallelogram, or otherwise polygonal.

Clause 22. The seed receptacle of any of clauses 1 to 21, wherein the upper portion of the seed receptacle is configured to align and/or be level with a portion of the plant-growing container when the seed receptacle is coupled with the plant-growing container.

Clause 23. The seed receptacle of any of clauses 1 to 22, wherein the engagement portion of the seed receptacle is configured to exert an outward pressure on an interior of the plant-growing container.

Clause 24. The seed receptacle of any of clauses 1 to 23, wherein the engagement portion of the plant-growing container is configured to exert an inward pressure on an exterior of the seed receptacle.

Clause 25. The seed receptacle of any of clauses 1 to 24, wherein engagement of the engagement portion of the seed receptacle with the engagement portion of the plant-growing container restricts rotational movement of the seed receptacle within the plant-growing container.

Clause 26. The seed receptacle of any of clauses 1 to 25, wherein engagement of the engagement portion of the seed receptacle with the engagement portion of the plant-growing container restricts rotational movement of the seed receptacle within the plant-growing container.

Clause 27. The seed receptacle of any of clauses 1 to 26, further can include an identifier.

Clause 28. The seed receptacle of clause 27, wherein the identifier is configured to identify a type of plant of the seed.

Clause 29. The seed receptacle of any of clauses 27 or 28, the identifier comprises at least one of a label, a bar code, a QR code, near-field communication (NFC) tag, or a radio-frequency identification (RFID) tag.

Clause 30. A seed receptacle can include:
an upper portion having an exterior shape and an interior shape;
a lower portion forming a cavity, wherein the lower portion comprises:
a wall, and
a first engagement portion configured to engage with a second engagement portion of a plant-growing container.

Clause 31. The seed receptacle of clause 30, wherein the wall is porous.

Clause 32. The seed receptacle of any of clauses 30 to 31, wherein the wall comprises a plurality of apertures.

Clause 33. The seed receptacle of any of clauses 30 to 32, wherein the wall comprises a plurality of slits.

Clause 34. The seed receptacle of any of clauses 30 to 33, wherein the cavity is configured to store a plant medium can include a seed.

Clause 35. The seed receptacle of clause 34, wherein the wall restricts rotational movement of the plant medium within the cavity.

Clause 36. The seed receptacle of clause 35, wherein the cavity is configured to hold the plant medium, thereby providing an anchor point for a plant-growing from the seed of the plant medium.

Clause 37. The seed receptacle of any of clauses 30 to 36, wherein the lower portion further comprises a lower member coupled to a bottom of the wall, wherein the lower member floor and the wall form the cavity.

Clause 38. The seed receptacle of any of clauses 30 to 37, wherein the interior shape of the upper portion is different from the exterior shape of the upper portion.

Clause 39. The seed receptacle of any of clauses 30 to 38, wherein the interior shape of the upper portion is complementary to the exterior shape of the upper portion.

Clause 40. The seed receptacle of any of clauses 30 to 39, wherein the first engagement portion comprises a protrusion, wherein the second engagement portion comprises a cavity configured to receive the protrusion.

Clause 41. The seed receptacle of any of clauses 30 to 40, wherein the second engagement portion comprises a protrusion, wherein the first engagement portion comprises a cavity configured to receive the protrusion.

Clause 42. The seed receptacle of any of clauses 30 to 41, wherein at least one of the first engagement portion or the second engagement portion comprises at least one of a hook and loop fastener, a clamp, a clasp, a buckle, a button, a hook, a screw, or a wire.

Clause 43. The seed receptacle of any of clauses 30 to 42, wherein the first engagement portion is configured to clip into or onto the second engagement portion.

Clause 44. The seed receptacle of any of clauses 30 to 43, wherein the second engagement portion is configured to clip into or onto the first engagement portion.

Clause 45. The seed receptacle of any of clauses 30 to 44, wherein the first engagement portion is located on an exterior of the wall.

Clause 46. The seed receptacle of any of clauses 30 to 45, wherein the first engagement portion is located on an interior of the wall.

Clause 47. The seed receptacle of any of clauses 30 to 46, wherein the first engagement portion is configured to protrude through a portion of the plant-growing container when the seed receptacle is coupled with the plant-growing container.

Clause 48. The seed receptacle of any of clauses 30 to 47, wherein a portion of the plant-growing container is configured to protrude through a portion of the seed receptacle when the seed receptacle is coupled with the plant-growing container.

Clause 49. The seed receptacle of any of clauses 30 to 48, wherein the interior shape of the upper portion is one of a circle, an oval, a triangle, a square, a rectangle, a trapezoid, a rhombus, a parallelogram, or a polygon.

Clause 50. The seed receptacle of any of clauses 30 to 49, wherein the exterior shape of the upper portion is a circle, an oval, a triangle, a square, a rectangle, a trapezoid, a rhombus, a parallelogram, or a polygon.

Clause 51. The seed receptacle of any of clauses 30 to 50, wherein the upper portion of the seed receptacle is configured to be even with a portion of the plant-growing container when the seed receptacle is coupled with the plant-growing container.

Clause 52. The seed receptacle of any of clauses 30 to 51, wherein the first engagement portion is configured to exert an outward pressure on an interior of the plant-growing container.

Clause 53. The seed receptacle of any of clauses 30 to 52, wherein the second engagement portion is configured to exert an inward pressure on an exterior of the seed receptacle.

Clause 54. The seed receptacle of any of clauses 30 to 53, wherein engagement of the first engagement portion with the second engagement portion restricts rotational movement of the seed receptacle within the plant-growing container.

Clause 55. The seed receptacle of any of clauses 30 to 54, wherein engagement of the first engagement portion with the second engagement portion restricts rotational movement of the seed receptacle within the plant-growing container.

Clause 56. The seed receptacle of any of clauses 30 to 55, further can include an identifier.

Clause 57. The seed receptacle of clause 56, wherein the identifier is configured to identify a type of plant of the seed.

Clause 58. The seed receptacle of any of clauses 56 or 57, the identifier comprises at least one of a label, a bar code, a QR code, near-field communication (NFC) tag, or a radio-frequency identification (RFID) tag.

Clause 59. A plant-growing system can include the seed receptacle and plant-growing container of any of clauses 1 to 58.

Clause 60. A method using the seed receptacle of any of clauses 1 to 58.

Clause 61. A method of manufacturing the seed receptacle of any of clauses 1 to 58.

Example Embodiments

Various example embodiments of methods, systems, and apparatuses relating to a plant-growing system can be found in the following clauses:

Clause 1. A system can include:
a base can include a chamber;
a lid configured to provide a cover for at least a portion of the chamber; and
an elongate member extending through an aperture of the lid, the elongate member can include a first end on a chamber-facing side of the lid and a second end on a non-chamber-facing second side of the lid, wherein the first end is configured to couple to a pump, wherein the second end comprises a handle, wherein movement of the handle moves the pump relative to the chamber.

Clause 2. The system of clause 1, wherein an elevation of the handle raises the pump relative to the chamber.

Clause 3. The system of any of clauses 1 or 2, wherein a lowering of the handle lowers the pump relative to the chamber.

Clause 4. The system of any of clauses 1 to 3, wherein a longitude axis of the elongate member is parallel to a vertical axis.

Clause 5. The system of any of clauses 1 to 4, wherein in a first configuration of the elongate member, the handle of the elongate member is located in a recess of the non-chamber-facing side of the lid and the pump is located in the chamber.

Clause 6. The system of any of clauses 1 to 5, wherein in a second configuration of the elongate member, the handle of the elongate member is located in an elevated location relative to the lid and the pump is located in a recess of the chamber-facing side of the lid.

Clause 7. The system of any of clauses 1 to 6, wherein the lid comprises a first engagement portion, wherein the first engagement portion is configured to engage with a second engagement portion of a planting column.

Clause 8. The system of clause 7, wherein first engagement portion comprises an aperture.

Clause 9. The system of any of clauses 7 or 8, further can include the pump, wherein the pump is configured to pump fluid from the chamber to the plant column.

Clause 10. The system of any of clauses 1 to 9, wherein the lid comprises a first engagement portion, wherein the first engagement portion is configured to engage with a second engagement portion of the base.

Clause 11. A method using the system of any of clauses 1 to 9.

Clause 12. A method of manufacturing the system of any of clauses 1 to 9.

Example Embodiments

Various example embodiments of methods, systems, and apparatuses relating to a plant-growing system can be found in the following clauses:

Clause 1. A plant-growing system, can include:
a chamber;
a plurality of modules forming at least a portion of a planting column, wherein the planting column is coupled to the chamber, wherein each module of the plurality of modules comprises a port configured to receive a removable plant-growing container that includes a reservoir; and
a pump configured to circulate fluid through the plant-growing system, wherein at least some of the fluid is supplied to the planting column and wherein at least some of the fluid is captured in the reservoir of at least one of the plurality of modules.

Clause 2. The system of clause 1, wherein the plurality of modules comprises at least an uppermost module and a lower module, wherein the uppermost module is coupled to the lower module.

Clause 3. The system of clause 2, wherein each module in the plurality of modules comprises a lower engagement portion and an upper engagement portion, wherein the lower engagement portion of the uppermost module is configured to engage with the upper engagement portion of the lower module, and wherein the lower engagement portion comprises one or more engagement features and the upper engagement portion comprises one or more engagement features.

Clause 4. The system of any of clauses 2 or 3, wherein the uppermost module and the lower module are substantially identical or identical.

Clause 5. The system of any of clauses 2 to 4, wherein the planting column further comprises a cap coupled to the uppermost module.

Clause 6. The system of any of clauses 2 to 5, wherein the cap comprises a lower engagement portion, wherein the lower engagement portion of the cap is configured to engage with the upper engagement portion of the uppermost module.

Clause 7. The system of any of clauses 5 or 6, wherein the cap comprises one or more engagement features that are identical or substantially identical to the engagement features of the lower engagement portion of the uppermost module.

Clause 8. The system of any of clauses 2 to 7, wherein the pump is configured to pump the fluid to the uppermost module in the planting column.

Clause 9. The system of any of clauses 2 to 8, wherein at least some of the fluid is captured by the reservoir of the uppermost module.

Clause 10. The system of any of clauses 2 to 9, wherein at least some of the fluid is captured by the reservoir of the lower module.

Clause 11. The system any of clauses 2 to 10, wherein at least some of the fluid flows from the uppermost module to the lower module.

Clause 12. The system of any of clauses 1 to 11, wherein the plurality of modules is a first plurality of the modules, wherein the planting column is a first planting column, wherein the plant-growing system further comprises a second plurality of modules forming at least a portion of a second planting column, wherein the second planting column is coupled to the chamber, wherein each module of the second plurality of modules comprises a port configured to receive a removable plant-growing container that includes a reservoir, wherein at least some of the fluid is supplied to the second planting column.

Clause 13. The system of any of clauses 1 to 12, further can include conduit extending from the pump to at least part of the planting column, wherein to pump the fluid from the chamber to the planting column, the pump is configured to pump the fluid through the conduit.

Clause 14. The system of any of clauses 13, wherein the conduit extends to at least one of the plurality of modules, wherein to pump the fluid from the chamber to at least one of the plurality of modules, the pump is configured to pump the fluid through the conduit.

Clause 15. The system of any of clauses 1 to 14, wherein the planting column is vertical or substantially vertical.

Clause 16. The system of any of clauses 1 to 15, wherein the plurality of modules comprises at least ten modules.

Clause 17. The system of any of clauses 1 to 16, further can include one or more light sources configured to emit light.

Clause 18. The system of any of clauses 1 to 17, further can include one or more image capture devices configured to capture one or more images.

Clause 19. The system of any of clauses 1 to 18, wherein the port of the uppermost module of the plurality of modules is not aligned with the port of the lower module of the plurality of modules.

Clause 20. The system of any of clauses 1 to 19, wherein the port of the uppermost module of the plurality of modules is aligned with the port of the lower module of the plurality of modules.

Clause 21. A plant-growing system, can include:
a chamber;
a plurality of modules forming at least a portion of a planting column, wherein the planting column is coupled to the chamber, wherein each module of the plurality of modules comprises a port configured to receive a removable plant-growing container that includes a reservoir; and
a pump configured to circulate fluid through the plant-growing system, wherein at least some of the fluid is supplied to the planting column and wherein at least some of the fluid is captured in the reservoir of at least one of the plurality of modules.

Clause 22. The plant-growing system of clause 21, wherein the plurality of modules comprises a first module and a second module, wherein the first module is coupled to the second module.

Clause 23. The plant-growing system of clause 22, wherein each of the plurality of modules comprises a lower engagement portion and an upper engagement portion, wherein the lower engagement portion of the first module is engaged with the upper engagement portion of the second module.

Clause 24. The plant-growing system of any of clauses 21 to 23, wherein the planting column further comprises a cap coupled to the first module.

Clause 25. The plant-growing system of clause 24, wherein the cap comprises a lower engagement portion, wherein the lower engagement portion of the cap is engaged with the upper engagement portion of the first module.

Clause 26. The plant-growing system of any of clauses 21 to 25, wherein to pump the fluid from the chamber to the planting column, the pump is configured to pump the fluid to the first module.

Clause 27. The plant-growing system of any of clauses 21 to 26, wherein at least some of the fluid is captured by the reservoir of the first module.

Clause 28. The plant-growing system of any of clauses 22 to 27, wherein at least some of the fluid is captured by the reservoir of the second module.

Clause 29. The plant-growing system of any of clauses 22 to 28, wherein at least some of the fluid flows from the first module to the second module.

Clause 30. The plant-growing system of any of clauses 21 to 29, wherein the plurality of modules is a first plurality of the modules, wherein the planting column is a first planting column, wherein the plant-growing system further comprises a second plurality of modules forming at least a portion of a second planting column, wherein the second planting column is coupled to the chamber, wherein each module of the second plurality of modules comprises a port configured to receive a removable plant-growing container that includes a reservoir, wherein at least some of the fluid is supplied to the second planting column.

Clause 31. The plant-growing system of any of clauses 21 to 30, further can include conduit extending from the pump to at least part of the planting column, wherein to pump the fluid from the chamber to the planting column, the pump is configured to pump the fluid through the conduit.

Clause 32. The plant-growing system of any of clauses 31, wherein the conduit extends to at least one of the plurality of modules, wherein to pump the fluid from the chamber to at least one of the plurality of modules, the pump is configured to pump the fluid through the conduit.

Clause 33. The plant-growing system of any of clauses 21 to 32, wherein the planting column is vertical.

Clause 34. The plant-growing system of any of clauses 21 to 33, wherein the plurality of 1 modules comprises at least ten modules.

Clause 35. The plant-growing system of any of clauses 21 to 34, further can include one or more light sources configured to emit light.

Clause 36. The plant-growing system of any of clauses 21 to 35, further can include one or more image capture devices configured to capture one or more images.

Clause 37. The plant-growing system of any of clauses 21 to 36, wherein the port of the first module of the plurality of modules is not aligned with the port of the second module of the plurality of modules.

Clause 38. The plant-growing system of any of clauses 21 to 37, wherein the port of the first module of the plurality of modules is aligned with the port of the second module of the plurality of modules.

Clause 39. The plant-growing system of any of clauses 1 to 38, further can include one or more modules as illustrated in the figures and/or described herein.

Clause 40. The plant-growing system of any of clauses 1 to 39, further can include one or more plant-growing containers as illustrated in the figures and/or described herein.

Clause 41. The plant-growing system of any of clauses 1 to 40, further can include one or more seed receptacles as illustrated in the figures and/or described herein.

Clause 42. The plant-growing system of any of clauses 1 to 41, further can include a lid as illustrated in the figures and/or described herein.

Clause 43. A method using the plant-growing system of any of clauses 1 to 42.

Clause 44. A method of manufacturing the plant-growing system of any of clauses 1 to 42.

Example Embodiments

Various example embodiments of methods, systems, and apparatuses relating to a plant-growing system can be found in the following clauses:

Clause 1. A plant-growing system, the can include:
a chamber configured to hold fluid;
a plurality of modules forming at least a portion of a planting column, wherein the planting column is coupled to the chamber, wherein each module of the plurality of modules comprises a planting port configured to include a plant;
a pump configured to pump the fluid from the chamber to the planting column;
a light source configured to emit light; and
one or more processors configured to control the pump according to a pump schedule and control the light source according to a lighting schedule, the one or more processor further configured to:
receive sensor data corresponding to the plant-growing system, wherein the sensor data comprises at least one of temperature data, pH data, humidity data, water level data, optical data, or electrical conductivity data;
receive imaging data, wherein the imaging data comprises an image of at least a portion of a first plant residing in a first module of the plurality of modules; and
estimate a harvest date for the first plant based at least in part on the pump schedule, lighting schedule, the sensor data, and the imaging data.

Clause 2. The system of clause 1, wherein the harvest date corresponds to an estimated date by which the plant will be ready to harvest.

Clause 3. The system of clause 2, wherein a plant is ready to harvest when it is safe to consume.

Clause 4. The system of any of clauses 2 or 3, wherein a plant is ready to harvest when it is ripe.

Clause 5. The system of any of clauses 2 to 4, wherein a plant is ready to harvest when at least a portion of one or more leaves of the plant change color.

Clause 6. The system of any of clauses 2 to 5, wherein a plant is ready to harvest when at least a portion of the plant satisfies a threshold size.

Clause 7. The system of any of clauses 1 to 6, wherein the pump schedule indicates at least one of a frequency at which the pump should operate, a duration of time over which the pump should operate, or a speed at which the pump should operate.

Clause 8. The system of any of clauses 1 to 7, wherein the lighting schedule indicates at least one of a frequency at which the light source should operate, a duration of time over which the light source should operate, or an intensity at which the light source should operate.

Clause 9. The system of any of clauses 1 to 8, wherein the one or more processors are further configured to adjust at least a portion of at least one of the pump schedule or the lighting schedule.

Clause 10. The system of any of clauses 1 to 9, wherein the one or more processors are further configured to adjust at least a portion of at least one of the pump schedule or the lighting schedule based at least in part on the estimated harvest date.

Clause 11. The system of any of clauses 1 to 10, wherein the one or more processors are further configured to adjust at least a portion of at least one of the pump schedule or the lighting schedule based at least in part on input from a user.

Clause 12. The system of clause 11, wherein the input from the user indicates that the user will not be available within a threshold time of the estimated harvest date.

Clause 13. The system of clause, wherein the input from the user indicates that the user will be on vacation at the time of the estimated harvest date.

Clause 14. The system of any of clauses 10 to 13, wherein adjusting the at least a portion of at least one of the pump schedule or the lighting schedule, causes estimated harvest date to change.

Clause 15. The system of any of clauses 10 to 13, further can include estimating a second harvest date based at least in part on the adjustments to the at least one of the pump schedule or the lighting schedule.

Clause 16. The system of clause 15, wherein the second harvest data is later in time than the harvest date.

Clause 17. The system of any of clauses 10 to 16, wherein adjusting the at least a portion of at least one of the pump schedule or the lighting schedule comprises at least one of adjusting a frequency at which the light source will operate, adjusting a duration of time over which the light source will operate, adjusting an intensity at which the light source will operate, adjusting a frequency at which the pump will operate, adjusting a duration of time over which the pump will operate, or adjusting a speed at which the pump will operate.

Clause 18. The system of any of clauses 10 to 17, wherein adjusting the at least a portion of at least one of the pump schedule or the lighting schedule comprises at least one of reducing a frequency at which the light source will operate, reducing a duration of time over which the light source will operate, reducing an intensity at which the light source will operate, reducing a frequency at which the pump will operate, reducing a duration of time over which the pump will operate, or reducing a speed at which the pump will operate.

Clause 19. The system of any of clauses 1 to 18, further can include at least one of a module, a plant-growing container, or a seed receptacle as shown in the figures and/or described herein.

Clause 20. A method can include:
receiving sensor data corresponding to the plant-growing system, wherein the sensor data comprises at least one of temperature data, pH data, humidity data, water level data, optical data, or electrical conductivity data;
receiving imaging data, wherein the imaging data comprises an image of at least a portion of a first plant residing in a first module of the plurality of modules; and
estimating a harvest date for the first plant based at least in part on the pump schedule, lighting schedule, the sensor data, and the imaging data.

Clause 21. The method of clause 21, wherein the harvest date is a first harvest date, wherein the method further comprises adjusting at least one of a pump schedule or a lighting schedule, and estimating a second harvest date at least in part on said adjusting.

Clause 22. A method using the system of any of clauses 1 to 19.

Clause 23. A method of manufacturing the system of any of clauses 1 to 19.

Example Embodiments

Various example embodiments of methods, systems, and apparatuses relating to a plant-growing system can be found in the following clauses:

Clause 1. A module as illustrated in the figures and/or described herein.

Clause 2. A plant-growing container as illustrated in the figures and/or described herein.

Clause 3. A seed receptacle as illustrated in the figures and/or described herein.

Clause 4. A plant-growing system can include one or more of the module, the plant-growing container, or the seed receptacle of any of clauses 1-3.

Clause 5. A plant-growing system as illustrated in the figures and/or described herein.

Clause 6. A method of using one or more of the module, the plant-growing container, the seed receptacle, or the plant-growing system of any of clauses 1-5.

Clause 7. A method of manufacturing one or more of the module, the plant-growing container, the seed receptacle, or the plant-growing system of any of clauses 1-5.

Example Embodiments

Various example embodiments of methods, systems, and apparatuses relating to a plant-growing system can be found in the following clauses:

Clause 1. A plant-growing container can include:
a lower portion and a wall extending upwardly from the lower portion, the wall can include a first aperture;
an orifice formed by an upper portion of the wall and configured to receive a removable seed receptacle; and
a reservoir provided by a lower portion of the wall;
wherein the container is configured to be removably inserted into a port of a module of a plant-growing system;
wherein the reservoir is configured to receive a first volume of fluid from a fluid that is circulated through the plant-growing system.

Clause 2. The plant-growing container of clause 1, wherein, during circulation of the fluid through the plant-growing system, the reservoir is configured to receive the first volume of fluid via the first aperture.

Clause 3. The plant-growing container of clause 2, wherein during circulation of the fluid through the plant-growing system, the first aperture is also configured to allow fluid to exit the plant-growing container through the first aperture in response to the reservoir receiving a first threshold amount of fluid that is greater than the first volume of fluid.

Clause 4. The plant-growing container of clause 3, wherein the wall further comprises a second aperture, wherein the second aperture is configured to reduce an amount of fluid in the container to a second threshold amount of fluid.

Clause 5. The plant-growing container of clause 4, wherein during circulation of the fluid through the plant-growing system, at least some of the fluid exits the plant-growing container through the second aperture responsive to the reservoir holding greater than the second threshold amount of fluid.

Clause 6. The plant-growing container of any of clauses 4 or 5, wherein the second threshold amount of fluid is a smaller volume than the first threshold amount of fluid.

Clause 7. The plant-growing container of any of clauses 1 to 6, wherein the container is configured to be removably inserted into the port at an angle.

Clause 8. The plant-growing container of any of clauses 1 to 7, further can include an engagement portion configured to mate with an engagement portion of at least one of the removable seed receptacle or a module.

Clause 9. A module of a plant-growing system, the module can include:
a wall defining a portion of an internal space within the module;
a shelf extending inwardly from the wall and can include a first aperture, wherein the shelf is configured to receive a fluid during circulation of the fluid through the plant-growing system and wherein the aperture is positioned in the shelf so that at least a portion of the fluid passes through the first aperture;
a port extending radially outward from the wall at an angle relative to a vertical axis of the wall, wherein the port comprises an orifice configured to receive a plant-growing container, the plant-growing container can include a reservoir;
wherein the port is configured to engage the plant-growing container so that at least a portion of the plant-growing container protrudes into the internal space of the module;
an upper engagement portion configured to engage with one or more of a lower engagement portion of a second module and/or an engagement portion of a cap; and
a lower engagement portion configured to engage with one or more of an upper engagement portion of a third module and/or a base connector of a fluid storage and distribution system.

Clause 10. The module of clause 9, wherein the shelf comprises a contoured portion configured to direct fluid on the shelf toward the first aperture.

Clause 11. The module of any of clauses 9 or 10, wherein the first aperture is positioned within the shelf such that when fluid flows through the first aperture, the fluid is received by the plant-growing container through a hole in the plant-growing container.

Clause 12. The module of any of clauses 9 to 11, wherein the port is configured to direct the reservoir of the plant-growing container at a position below the aperture such that the reservoir collects fluid that passes through the first aperture.

Clause 13. The module of any of clauses 9 to 12, wherein the port comprises an engagement portion configured to engage with a coinciding engagement portion of the plant-growing container.

Clause 14. The module of clause 13, wherein engagement of the engagement portion of the port with the engagement portion of the plant-growing container restricts rotational movement of the plant-growing container within the orifice.

Clause 15. The module of any of clauses 9 to 14, wherein the upper engagement portion of the module is identical to the upper engagement portion of the third module.

Clause 16. The module of any of clauses 9 to 15, wherein the lower engagement portion of the module is identical to the lower engagement portion of the second module.

Clause 17. The module of any of clauses 9 to 16, wherein the wall extends circumferentially around the internal space of the module and provides an upwardly facing aperture defined by the upper engagement portion and a downwardly facing aperture defined by the lower engagement portion.

Clause 18. A seed receptacle can include:
an upper portion having an exterior shape and an interior shape; and
a lower portion can include:
 a wall defining a cavity within the seed receptacle, and
an engagement portion configured to engage with an engagement portion of a plant-growing container;
wherein the wall of the lower portion defines the interior shape of the upper portion.

Clause 19. The seed receptacle of clause 18, wherein the wall is porous.

Clause 20. The seed receptacle of any of clauses 18 or 19, wherein the cavity is configured to store a plant medium can include a seed.

Clause 21. The seed receptacle of clause 20, wherein the wall restricts rotational movement of the plant medium within the cavity.

Clause 22. The seed receptacle of any of clauses 18 to 21, wherein the interior shape of the upper portion is different from the exterior shape of the upper portion.

Clause 23. The seed receptacle of any of clauses 18 to 22, wherein the engagement portion of the seed receptacle comprises a protrusion and the engagement portion of the plant-growing container comprises a cavity configured to receive the protrusion.

Clause 24. The seed receptacle of any of clauses 18 to 23, wherein the engagement portion of the seed receptacle is configured to protrude through a portion of the plant-growing container when the seed receptacle is coupled with the plant-growing container.

Clause 25. The seed receptacle of any of clauses 18 to 24, wherein the upper portion of the seed receptacle is configured to align and/or be level with a portion of the plant-growing container when the seed receptacle is coupled with the plant-growing container.

Clause 26. The seed receptacle of any of clauses 18 to 25, wherein the engagement portion of the seed receptacle is configured to exert an outward pressure on an interior of the plant-growing container.

Clause 27. The seed receptacle of any of clauses 18 to 26, wherein the engagement portion of the plant-growing container is configured to exert an inward pressure on an exterior of the seed receptacle.

Clause 28. The seed receptacle of any of clauses 18 to 27, wherein engagement of the engagement portion of the seed receptacle with the engagement portion of the plant-growing container restricts rotational movement of the seed receptacle within the plant-growing container.

Clause 29. A fluid distribution system can include:
a base can include a chamber;
a lid configured to cover at least a portion of the chamber; and
an elongate member extending through an aperture of the lid, the elongate member can include a first end on a chamber-facing side of the lid and a second end on a non-chamber-facing second side of the lid, wherein the first end is configured to couple to a pump, wherein the second end comprises a handle, wherein movement of the handle moves the pump relative to the chamber.

Clause 30. The fluid distribution system of clause 29, wherein an elevation of the handle raises the pump relative to the chamber.

Clause 31. The fluid distribution system of any of clauses 29 or 30, wherein a longitude axis of the elongate member is parallel to a vertical axis.

Clause 32. The fluid distribution system of any of clauses 29 to 31, wherein in a first configuration of the elongate member, the handle of the elongate member is located in a recess of the non-chamber-facing side of the lid and the pump is located in the chamber.

Clause 33. The fluid distribution system of any of clauses 29 to 32, wherein in a second configuration of the elongate member, the handle of the elongate member is located in an elevated location relative to the lid and the pump is located in a recess of the chamber-facing side of the lid.

Clause 34. The fluid distribution system of any of clauses 29 to 33, wherein the lid comprises a first engagement portion, wherein the first engagement portion is configured to engage with a second engagement portion of a planting column.

Clause 35. The fluid distribution system of any of clauses 29 to 34, further can include the pump, wherein the pump is configured to pump fluid from the chamber to the plant column.

Clause 36. The fluid distribution system of any of clauses 29 to 35, wherein the lid comprises a first engagement portion, wherein the first engagement portion is configured to engage with a second engagement portion of the base.

Clause 37. A plant-growing system, can include:
a chamber configured to hold a fluid;
at least an uppermost module and a lower module, wherein the uppermost module is coupled to the lower module forming at least a portion of a planting column, wherein the planting column is coupled to a lid of the chamber, wherein each of the uppermost module and the lower module comprises a port configured to receive a removable plant-growing container that includes a reservoir; and a pump configured to circulate the fluid through the plant-growing system, wherein at least some of the fluid is supplied to the planting column and wherein at least some of the fluid is captured in the reservoir of at least one of the plurality of modules.

Clause 38. The system of clause 37, wherein the uppermost module comprises a lower engagement portion and an upper engagement portion, wherein the lower engagement portion of the uppermost module is configured to engage with an upper engagement portion of the lower module, and wherein the lower engagement portion of the uppermost module comprises one or more engagement features and the upper engagement portion of the lower module comprises one or more coinciding engagement features.

Clause 39. The system of any of clauses 37 or 38, wherein the planting column further comprises a cap coupled to the uppermost module.

Clause 40. The system of any of clauses 37 to 39, wherein the pump is configured to pump the fluid to the uppermost module in the planting column.

Clause 41. The system of any of clauses 37 to 40, further can include a first removable plant-growing container and a second removable plant-growing container provided in the uppermost module and the lower module, respectively.

Clause 42. The system of clause 41, wherein a first volume of fluid from the fluid is captured by a reservoir of the first removable plant-growing container.

Clause 43. The system of clause 42, wherein a second volume of fluid from the fluid is captured by a reservoir of the second removable plant-growing container.

Clause 44. The system of any of clauses 37 to 43, wherein at least some of the fluid flows from the uppermost module to the lower module.

Clause 45. The system of any of clauses 37 to 44, wherein the uppermost module and the lower module are part of a first plurality of modules, wherein the planting column is a first planting column, wherein the plant-growing system further comprises a second plurality of modules forming at least a portion of a second planting column, wherein the second planting column is coupled to the chamber, wherein each module of the second plurality of modules comprises a port configured to receive a removable plant-growing container that includes a reservoir, wherein at least some of the fluid is supplied to the second planting column.

Clause 46. A plant-growing system, the can include:
a chamber configured to hold fluid;
a plurality of modules forming at least a portion of a planting column, wherein the planting column is coupled to the chamber, wherein each module of the plurality of modules comprises a planting port configured to include a plant;
a pump configured to pump the fluid from the chamber to the planting column;
a light source configured to emit light; and
one or more processors configured to control the pump according to a pump schedule and control the light source according to a lighting schedule, the one or more processor further configured to:
receive sensor data corresponding to the plant-growing system, wherein the sensor data comprises at least one of temperature data, pH data, humidity data, water level data, optical data, or electrical conductivity data;
receive imaging data, wherein the imaging data comprises an image of at least a portion of a first plant residing in a first module of the plurality of modules; and
estimate a harvest date for the first plant based at least in part on the pump schedule, lighting schedule, the sensor data, and the imaging data.

Clause 47. The system of clause 46, wherein the harvest date corresponds to at least one of a date by which the plant will be ready to harvest, a date by which the plant will be safe to consume, a date by will the plant will be ripe, a date by which at least a portion of one or more leaves of the plant change color, or a date by which at least a portion of the plant satisfies a threshold size.

Clause 48. The system of any of clauses 46 or 47, wherein the pump schedule indicates at least one of a frequency at which the pump should operate, a duration of time over which the pump should operate, or a speed at which the pump should operate.

Clause 49. The system of any of clauses 46 to 48, wherein the lighting schedule indicates at least one of a frequency at which the light source should operate, a duration of time over which the light source should operate, or an intensity at which the light source should operate.

Clause 50. The system of any of clauses 46 to 49, wherein the one or more processors are further configured to adjust at least a portion of at least one of the pump schedule or the lighting schedule.

Clause 51. A plant-growing system can include one or more of the module, the plant-growing container, or the seed receptacle of any of clauses 1-50.

Clause 52. A method of using one or more of the module, the plant-growing container, the seed receptacle, or the plant-growing system of any of clauses 1-51.

Clause 53. A method of manufacturing one or more of the module, the plant-growing container, the seed receptacle, or the plant-growing system of any of clauses 1-51.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "include," "can include," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Depending on the embodiment, certain operations, acts, events, or functions of any of the algorithms described elsewhere herein can be performed in a different sequence, can be added, merged, or left out altogether (non-limiting example: not all are necessary for the practice of the algorithms). Moreover, in certain embodiments, operations, acts, functions, or events can be performed concurrently, non-limiting examples: through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described elsewhere herein. A processor device can be a microprocessor, but in the alternative, the processor device can be a controller, microcontroller, or combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, non-limiting examples: a combination of a DSP and a microprocessor, a plurality of microprocessors, one or more microprocessors in conjunction with a DSP core, or any other such configuration. Although described elsewhere herein primarily with respect to digital technology, a processor device may also include primarily analog components. For example, some or all of the signal processing algorithms described elsewhere herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems and/or computing devices.

Virtualization technologies allow a single physical computing device to host one or more instances of a virtual machine, which virtual machine instance appears to a user as an independent computing device. With virtualization, the host computing device can create, maintain, delete, or otherwise manage virtual machines instances in a dynamic manner. In turn, users can request computing resources, including single computing devices or a configuration of networked computing devices, and be provided with virtual machine instances that provide the requested computing resources.

An instance of a virtual machine may be configured to provide specific functionality. For example, a virtual machine instance may be associated with different combinations of software applications and operating systems or operating system configurations to enable a virtual machine to provide different desired functionalities, or to provide similar functionalities more efficiently.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

Disjunctive language such as the phrase "at least one of X, Y, or Z," unless specifically stated otherwise, is otherwise understood with the context as used in general to present that an item, term, etc., may be either X, Y, or Z, or any combination thereof (non-limiting examples: X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described elsewhere herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

Any terms generally associated with circles, such as "radius" or "radial" or "diameter" or "circumference" or "circumferential" or any derivatives or similar types of terms are intended to be used to designate any corresponding structure in any type of geometry, not just circular structures. For example, "radial" as applied to another geometric structure should be understood to refer to a direction or distance between a location corresponding to a general geometric center of such structure to a perimeter of such structure; "diameter" as applied to another geometric structure should be understood to refer to a cross sectional width of such structure; and "circumference" as applied to another geometric structure should be understood to refer to a perimeter region. Nothing in this specification or drawings should be interpreted to limit these terms to only circles or circular structures.

What is claimed is:

1. A plant-growing container comprising:
   a base;
   a rim defining an orifice that is opposite the base, wherein the orifice is configured to receive a removable seed receptacle; and
   a wall extending from the base to the rim, the wall forming a first aperture and a second aperture, wherein a first edge of the first aperture is proximate the base relative to other edges of the first aperture and a first edge of the second aperture is proximate the base relative to other edges of the second aperture,
   wherein the base and the wall form a reservoir,
   wherein in an upright orientation in which the base is parallel to a ground surface, the base and a first portion of the wall located between the base and the first edge of the first aperture define first dimensions for the reservoir such that the reservoir is configured to hold a first volume of fluid,
   wherein the plant-growing container is configured to be removably inserted in an upward orientation into a port of a module of a plant-growing system, wherein in the upward orientation a center of the first aperture is oriented vertically upward and a center of the second aperture is oriented laterally relative to the center of the first aperture,
   wherein in the upward orientation, the base, a second edge of the second aperture that is different from the first edge of the second aperture, and a second portion of the wall opposite the first aperture define second dimensions for the reservoir such that the reservoir of the plant-growing container is configured to hold a second volume of fluid that is less than or equal to the first volume of fluid, wherein the second dimensions are different from the first dimensions.

2. The plant-growing container of claim 1, wherein the first aperture is larger than the second aperture.

3. The plant-growing container of claim 1, further comprising a first engagement portion on an interior surface of the wall, the first engagement portion configured to mate with a second engagement portion of the removable seed receptacle.

4. The plant-growing container of claim 3, wherein the first engagement portion of the plant-growing container comprises a protrusion, wherein the second engagement portion of the removable seed receptacle comprises at least one of a cavity, an aperture, or a groove, and wherein the first engagement portion of the removable seed receptacle is configured to receive the protrusion.

5. The plant-growing container of claim 3, wherein the second engagement portion of the removable seed receptacle is configured to clip into or onto the first engagement portion of the plant-growing container.

6. The plant-growing container of claim 3, wherein the second engagement portion of the removable seed receptacle protrudes through a portion of the plant-growing container when the plant-growing container receives the removable seed receptacle.

7. The plant-growing container of claim 3, wherein the second engagement portion of the removable seed receptacle exerts an outward pressure on an interior of the plant-growing container when the plant-growing container receives the removable seed receptacle.

8. The plant-growing container of claim 1, further comprising a third engagement portion on an exterior surface of the wall, the third engagement portion configured to mate with a fourth engagement portion of the module.

9. The plant-growing container of claim 1, wherein the removable seed receptacle is configured to house a plant, wherein the plant-growing container is configured to confine at least some roots of the plant while the removable seed receptacle is located in the plant-growing container.

10. The plant-growing container of claim 1, wherein during a circulation of a fluid through the plant-growing system, the reservoir is configured to receive a portion of fluid that passes through the first aperture.

11. The plant-growing container of claim 1, wherein during a circulation of a fluid through the plant-growing system, the first aperture is configured to allow at least some of the portion of fluid to exit the plant-growing container through the first aperture in response to the reservoir receiving a first threshold amount of fluid.

12. The plant-growing container of claim 1, wherein the second aperture is configured to reduce an amount of fluid in the plant-growing container to a second threshold amount of fluid.

13. The plant-growing container of claim 12, wherein during a circulation of the fluid through the plant-growing system, at least some of the fluid exits the plant-growing container through the second aperture responsive to the reservoir holding greater than the second threshold amount of fluid.

14. The plant-growing container of claim 1, wherein the plant-growing container is a substantially cylindrical structure.

15. The plant-growing container of claim 1, wherein the second aperture is horizontally aligned with a bottom edge of the first aperture when the plant-growing container is in the upright orientation such that excess fluid exits the plant-growing container through the second aperture when the plant-growing container is in either the upright orientation or the upward orientation.

* * * * *